US012773362B2

(12) United States Patent

Tedeschi et al.

(10) Patent No.: US 12,773,362 B2
(45) Date of Patent: Oct. 27, 2026

(54) INFLATABLE BEDPAN WITH OUTER-EDGE CINCH-CLOSURE WASTE BAG SYSTEM

(71) Applicants: Nadezhda Tedeschi, Willoughby, OH (US); Sherry Tedeschi, Willoughby, OH (US)

(72) Inventors: Nadezhda Tedeschi, Willoughby, OH (US); Sherry Tedeschi, Willoughby, OH (US)

( * ) Notice: Subject to any disclaimer, the term of this patent is extended or adjusted under 35 U.S.C. 154(b) by 0 days.

(21) Appl. No.: 19/576,534

(22) Filed: Mar. 24, 2026

(65) Prior Publication Data

US 2026/0294718 A1 Oct. 1, 2026

Related U.S. Application Data

(60) Provisional application No. 63/777,551, filed on Mar. 25, 2025.

(51) Int. Cl.
*A61G 9/00* (2006.01)

(52) U.S. Cl.
CPC .................................... *A61G 9/003* (2013.01)

(58) Field of Classification Search
CPC .......... A61G 9/00; A61G 9/003; A47K 11/04; A47K 11/045; A47K 11/06
See application file for complete search history.

(56) References Cited

U.S. PATENT DOCUMENTS

| | | | | |
|---|---|---|---|---|
| 435,058 A * | 8/1890 | Freund | A61G 9/003 4/456 |
| 2,260,437 A * | 10/1941 | Chambers | A47K 13/00 4/456 |
| 3,061,840 A * | 11/1962 | Presseisen | A61G 9/003 4/456 |
| 3,383,712 A * | 5/1968 | Grant | A61G 9/003 4/452 |
| 3,428,967 A * | 2/1969 | Hughes | A47K 11/04 4/484 |
| 2014/0082832 A1* | 3/2014 | Marshall | A61G 9/003 4/452 |

FOREIGN PATENT DOCUMENTS

| | | | | |
|---|---|---|---|---|
| GB | 2246705 | * 2/1992 | A47K 11/045 |
| KR | 200459459 | * 3/2012 | A47K 11/12 |

* cited by examiner

*Primary Examiner* — David P Angwin
*Assistant Examiner* — Nicholas A Ros
(74) *Attorney, Agent, or Firm* — H. Brock Kolls

(57) ABSTRACT

The present invention relates to bedside toileting and waste-management systems and, more particularly, to an inflatable bedpan configured to improve comfort, stability on bedding, and hygienic waste containment. In an exemplary embodiment, the inflatable bedpan includes a seat ring above a support ring and a receptacle region having a leak-resistant bottom receptacle surface. A two-bag arrangement includes an outer containment bag and a removable inner containment bag positioned within the outer containment bag. The inner containment bag includes a perimeter channel containing a cinch string that exits through one or more egress openings, with portions of the cinch string fed through cinch holes of the outer containment bag so that free ends are accessible from outside the outer containment bag. The inner containment bag can be cinched closed and removed for disposal without inserting a hand through a waste-receiving opening, while the outer containment bag can remain installed.

20 Claims, 15 Drawing Sheets

A

B

INFLATABLE BEDPAN WITH OUTER-EDGE CINCH-CLOSURE WASTE BAG SYSTEM

CROSS-REFERENCE TO RELATED APPLICATIONS

This application contains subject matter that is related to the subject matter of the following co-pending application. The below-listed application is hereby incorporated herein by reference in its entirety:

This is a U.S. non-provisional application that claims the benefit of a U.S. provisional application, Ser. No. 63/777,551, inventor Nadezhda Tedeschi et al., entitled "INFLATABLE BEDPAN", filed Mar. 25, 2025.

TECHNICAL FIELD OF THE INVENTION

This invention relates to patient care and toileting systems, and particularly to inflatable bedpan systems configured to support a user during toileting on a bed, wheelchair, or other support surface while providing hygienic containment and disposal of human waste. In exemplary embodiments, the invention further relates to multi-layer containment bag assemblies and cinch-based closure architectures that enable an inner containment bag to be cinched closed from an outwardly facing inter-ring access region located between a seat ring and a support ring of an inflatable bedpan at an outer perimeter of the inflatable bedpan, as well as to associated methods of use for reducing caregiver handling complexity and contamination risk during installation, inflation and deflation, use, closure, and disposal.

BACKGROUND OF THE INVENTION

Before our invention, bedside toileting for patients with reduced mobility commonly relied on rigid bedpans and other prior approaches that frequently created avoidable discomfort, handling complexity, and sanitation burdens for patients, caregivers, and clinical environments. Many rigid bedpans present hard rims and flat bases that concentrate load at relatively small contact areas, which can increase pressure points and soreness, particularly for frail or post-operative patients, patients with sensitive skin, and patients who cannot reposition easily. The rigidity of these devices can also amplify discomfort when bedding compresses unevenly, because the bedpan does not conform to the support surface and can instead press into soft tissue.

Positioning rigid bedpans beneath a user can be especially challenging in real-world care settings. Prior approaches often require a caregiver to lift the user's pelvis or to perform a forceful roll-and-slide maneuver, which can increase caregiver strain and can disturb medical lines, dressings, or adjacent bedding arrangements. In other cases, the user is asked to arch, bridge, or lift their hips to create clearance while the bedpan is slid into position. For many users, particularly those with limited strength, pain, injury, or post-surgical restrictions, such exertion can be difficult or unsafe, and repeated attempts can increase fatigue and frustration. Even small misalignment during insertion can require repositioning, which can compound discomfort and prolong the toileting process.

After use, prior approaches commonly require handling and disposal of a bedpan containing waste and subsequent cleaning of the bedpan itself. This can be time-consuming and unpleasant, and it can create opportunities for contamination if waste splashes, smears, or contacts surfaces during transport to a toilet, hopper, or sink. In institutional environments, the bedpan must often be carried through a room or corridor to a disposal and cleaning station, increasing the chance of drips or accidental contact with environmental surfaces. In home environments, the user or caregiver may lack access to dedicated sanitation fixtures, making disposal more difficult and increasing reliance on improvised cleaning practices.

Cleaning requirements present further shortcomings. Prior approaches frequently involve washing and disinfecting hard-to-reach recesses, rims, and seams where residue can adhere, and inadequate cleaning can lead to odor retention and hygiene concerns. Even when cleaning is performed properly, the process consumes caregiver time and can delay subsequent toileting events, particularly when multiple patients require care or when the same patient requires repeated use in a short interval. The need to repeatedly handle a soiled receptacle can also increase caregiver exposure to contaminants, especially when gloves, time pressure, and limited visibility contribute to hurried handling. Additionally, prior approaches provide limited ability to tailor comfort, stability, and positioning to different patient sizes and bedding conditions, which can lead to inconsistent performance across settings and can increase the likelihood of user discomfort or shifting during use.

The present invention addresses these and other shortcomings by providing an inflatable bedpan waste-management system configured to support a user during toileting and configured to permit cinch-closure of an inner containment bag from an outwardly facing inter-ring access region located between a seat ring and a support ring at an outer perimeter of an inflatable bedpan. For these reasons and shortcomings, as well as other reasons and shortcomings, there is a long-felt need that gives rise to the present invention.

SUMMARY OF THE INVENTION

The shortcomings of the prior art are overcome, and additional advantages are provided through the provision of an inflatable bedpan waste-management system configured to support a user during toileting and configured to permit cinch-closure of an inner containment bag from an inter-ring access region located between a seat ring and a support ring of an inflatable bedpan at an outer perimeter of the inflatable bedpan. In an exemplary embodiment, the system includes an inflatable bedpan comprising the seat ring and the support ring, wherein the inflatable bedpan defines a waste-receiving opening that can be defined by at least one of the seat ring and the support ring. In an exemplary embodiment, the inter-ring access region can be located along an outer perimeter of and between the seat ring and the support ring, wherein the inter-ring access region is outwardly facing and accessible from outside the inflatable bedpan. In an exemplary embodiment, an outer containment bag can be configured to be installed on the inflatable bedpan and can include an upper perimeter portion configured to be positioned over the seat ring or over the support ring, and the outer containment bag can further include a plurality of cinch holes formed through the outer containment bag at one or more central locations spaced from the upper perimeter portion, wherein the cinch holes are positioned to align with the inter-ring access region when the outer containment bag is installed on the inflatable bedpan. In an exemplary embodiment, an inner containment bag can be configured to be positioned within the outer containment bag to receive human waste through the waste-receiving opening. In an exemplary embodiment, a cinch string can be threaded through the cinch holes of the outer containment bag to present one or more graspable portions of the cinch string on an exterior side of the outer containment bag, wherein the inner containment bag can be cinched closed by pulling the cinch string and wherein the graspable portions can be accessible from the inter-ring access region while the inner containment bag remains positioned within the outer containment bag. In an exemplary embodiment, after being cinched closed, the inner containment bag can be removed from the outer containment bag for disposal Additional shortcomings of the prior art are overcome, and additional advantages are provided through the provision of an inflatable bedpan waste-management system configured to be installed on an inflatable bedpan that supports a user during toileting and configured to permit cinch-closure of an inner containment bag from an inter-ring access region located between a seat ring and a support ring of the inflatable bedpan at an outer perimeter of the inflatable bedpan. In an exemplary embodiment, the system includes an outer containment bag having an upper perimeter portion configured to be positioned over the seat ring or over the support ring of the inflatable bedpan, and the outer containment bag further includes a plurality of cinch holes formed through the outer containment bag at one or more intermediate locations between the upper perimeter portion and a bottom of the outer containment bag. In an exemplary embodiment, the system further includes the inner containment bag configured to be positioned within the outer containment bag. In an exemplary embodiment, a cinch string can be configured to be threaded through the cinch holes to present one or more graspable portions of the cinch string on an exterior side of the outer containment bag when the inner containment bag is positioned within the outer containment bag. In an exemplary embodiment, the system can be specially adapted such that, when the outer containment bag is installed on the inflatable bedpan and the inner containment bag is positioned within the outer containment bag, the graspable portions are presented adjacent to the inter-ring access region and are accessible from the inter-ring access region, wherein the inter-ring access region is outwardly facing and accessible from outside the inflatable bedpan to enable cinch-closure while reducing the need to reach into a waste-receiving opening.

Additional shortcomings of the prior art are overcome, and additional advantages are provided through the provision of an inflatable bedpan waste-management system configured to support a user during toileting and configured to permit cinch-closure of an inner containment bag from an inter-ring access region located between a seat ring and a support ring of an inflatable bedpan at an outer perimeter of the inflatable bedpan. In an exemplary embodiment, the system includes an inflatable bedpan comprising the seat ring and the support ring, wherein the inflatable bedpan defines a waste-receiving opening that can be defined by at least one of the seat ring and the support ring. In an exemplary embodiment, the inflatable bedpan further includes a seat air valve in fluid communication with the seat ring and a base air valve in fluid communication with the support ring to enable independent inflation control and staged deployment. In an exemplary embodiment, an outer containment bag can be removably installed on the inflatable bedpan and can include a plurality of cinch holes, and an inner containment bag can be positioned within the outer containment bag to receive human waste through the waste-receiving opening. In an exemplary embodiment, a cinch string can be threaded through the cinch holes to present one or more graspable portions on an exterior side of the outer containment bag, wherein the inter-ring access region is outwardly facing and accessible from outside the inflatable bedpan to permit cinch-closure after use. In an exemplary embodiment, the outer containment bag can remain installed on the inflatable bedpan after the inner containment bag is cinched closed and removed for disposal, thereby facilitating repeatable use cycles. In an exemplary embodiment, the inflatable bedpan can be transitioned between a semi-inflated state and an inflated state via the seat air valve and the base air valve, and can be collapsed by venting an inflation fluid through at least one of the valves for storage.

Additional features and advantages are realized through the techniques of the present invention. Other embodiments and aspects of the invention are described in detail herein and are considered a part of the claimed invention. For a better understanding of the invention, with advantages and features, refer to the description and the drawings.

BRIEF DESCRIPTION OF THE FIGURES

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings, in which:

Figure 1:
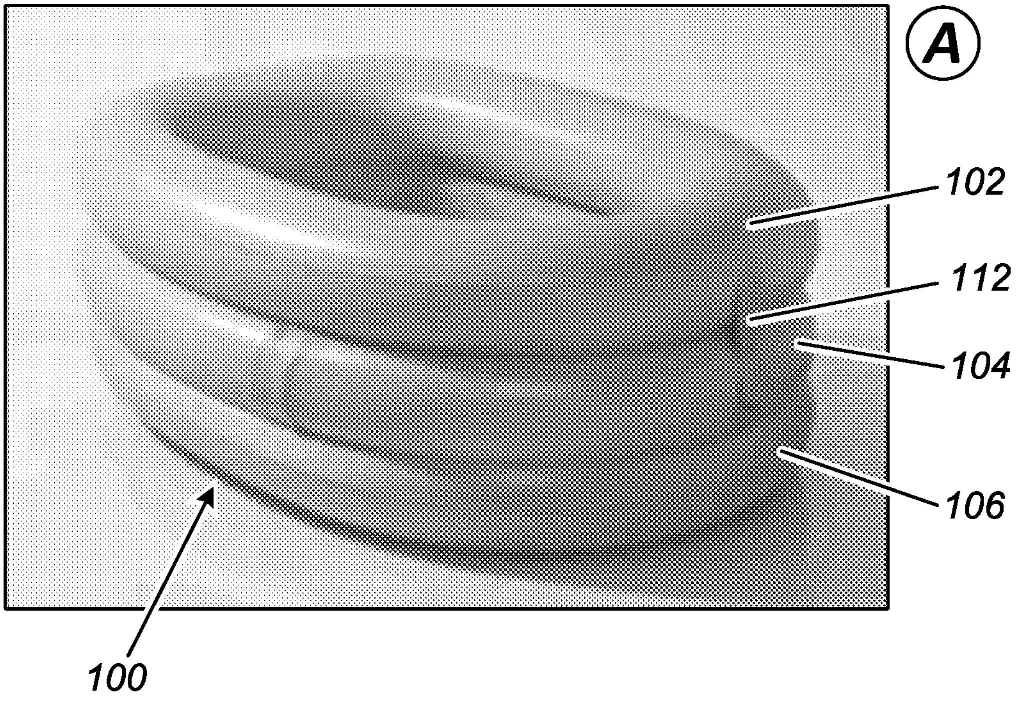
FIG. 1 illustrates one example of, in reference 'A' a top-front-left perspective view of the inflatable bedpan, and in reference 'B', a top-back-right perspective view of the inflatable bedpan.
Figure 1:
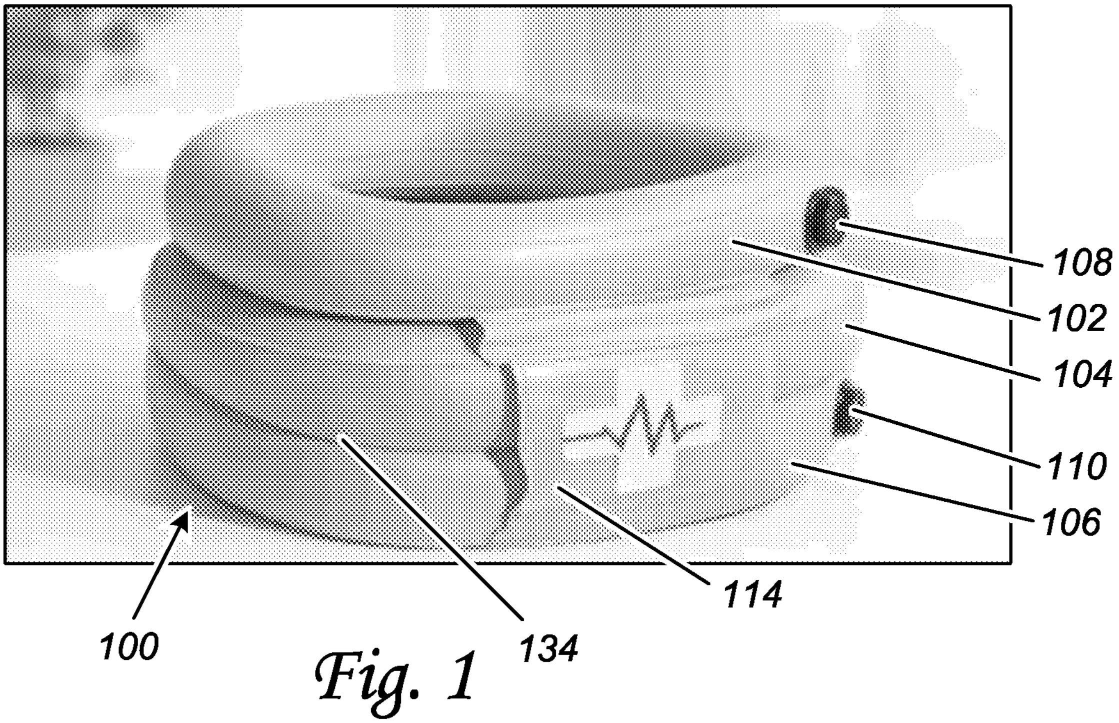

The detailed description explains the preferred embodiments of the invention, together with advantages and features, by way of example, with reference to the drawings.

DETAILED DESCRIPTION OF THE INVENTION

Many patients who are temporarily or chronically bed-bound require toileting solutions that can be positioned beneath the patient with minimal movement and that can capture waste in a clean, controlled manner. Conventional rigid bedpans can be uncomfortable, can require significant patient lifting or rolling, and can cause pressure points when placed on bedding. Even when disposable liners are used, the handling of a soiled liner can expose a caregiver to contamination, particularly when the closure feature must be accessed from inside the waste-receiving opening or when the liner shifts during use. In addition, bedpan systems that rely on a single disposable bag often allow leakage pathways at the bottom or along side walls, and the bag may collapse or migrate in a way that makes removal messy or unreliable.

The present invention addresses these shortcomings with an inflatable bedpan waste-management system that provides stable support, improved patient positioning, and a controlled "external-access" closure architecture for a removable waste bag. In one exemplary embodiment, an inflatable bedpan includes an inflatable seat ring positioned above an inflatable support ring, with a receptacle ring coupled thereto and including a leak-proof bottom receptacle surface configured to contain waste within the bedpan volume.

The bedpan may be partially inflated for placement beneath a user and subsequently inflated to a desired support level, such as via a seat air valve and a base air valve.

In some embodiments, the seat ring is hinged relative to the support ring by a seat retainer hinge and secured by a tether closure strap, enabling the seat ring to be lifted for liner installation and returned to a closed position for use.

A particularly differentiating aspect of the system is a two-bag containment arrangement that enables cinch-closure of an inner containment bag from outside an outer containment bag. In one embodiment, an outer containment bag is positioned over the seat ring and/or the support ring, and an inner containment bag is positioned within the outer containment bag to receive waste through the waste-receiving opening.

The inner containment bag includes a perimeter channel containing a cinch string, with the cinch string emerging through one or more cinch string egress openings. With the inner containment bag installed inside the outer containment bag, portions of the cinch string proximate the egress openings are passed through cinch holes in the outer containment bag so that one or more free ends of the cinch string are accessible to and graspable by a user or caregiver from outside the outer containment bag. In this manner, after use, the caregiver can cinch closed the inner containment bag without needing to reach into the waste-receiving opening, and the cinched inner containment bag can be removed and discarded while the outer containment bag may remain installed for a subsequent use cycle, depending on the embodiment.

In some embodiments, the seat ring further includes patient-positioning geometry that improves stability and comfort during use. For example, a lower crown proximate a top front edge and a higher crown proximate a top back edge can define a declining slope and a concave contour on the top surface of the seat ring, which can aid in positioning and retaining the user during use.

Additionally, the outer containment bag may include a tapered lower portion sized and shaped to direct the inner containment bag and its contents toward a central region of the bottom receptacle surface, reducing contact with side walls and helping to reduce leakage risk and messy removal.

Definitions

In the present invention, the term "user" is intended to mean a person positioned on or adjacent to an inflatable bedpan system for toileting, and can include a patient, consumer, resident, or other individual receiving care.

In the present invention, the term "caregiver" is intended to mean a person assisting the user, and can include an attendant, nurse, technician, family member, or other helper.

In the present invention, the term "support surface" is intended to mean a surface on which a user is positioned or supported during toileting, and can include a hospital bed, home bed, stretcher, gurney, exam table, wheelchair seat, commode chair seat, recliner surface, couch, floor mat, or other support surface.

In the present invention, the term "inflatable" is intended to mean having one or more inflation chambers that can be filled with an inflation fluid to adjust shape, height, firmness, or compliance, wherein the inflation fluid can be air, another gas, or a liquid.

In the present invention, the term "inflated state" is intended to mean a state in which an inflatable chamber is pressurized to provide a target operating shape and load-bearing support.

In the present invention, the term "semi-inflated state" is intended to mean a state in which an inflatable chamber is pressurized less than the inflated state to reduce profile height and insertion resistance during placement while still maintaining at least partial structural form.

In the present invention, the term "collapsed" is intended to mean a deflated configuration in which one or more inflatable chambers have been vented through one or more valves such that the inflatable bedpan can be folded, rolled, stacked, or otherwise compacted for storage.

In the present invention, the term "venting" is intended to mean permitting an inflation fluid to exit an inflatable chamber through a valve to reduce pressure and transition the inflatable bedpan toward a semi-inflated state or a collapsed state.

In the present invention, the term "seat ring" is intended to mean an inflatable support structure configured to contact or support the user and configured to define or surround a waste-receiving opening in one or more use configurations.

In the present invention, the term "support ring" is intended to mean an inflatable structure positioned below the seat ring and configured to provide stability, lift, and contact footprint relative to a support surface.

In the present invention, the term "waste-receiving opening" is intended to mean an opening through which waste can pass into a containment region, and can be defined by the seat ring, the support ring, both rings cooperatively, or another portion of the inflatable bedpan, depending on the embodiment and use configuration.

In the present invention, the term "outer perimeter" is intended to mean an exterior boundary region of the inflatable bedpan proximate an outside edge of the seat ring and/or the support ring, including regions reachable from outside the waste-receiving opening.

In the present invention, the term "outwardly facing" is intended to mean oriented toward an exterior of the inflatable bedpan such that a feature is accessible from outside the inflatable bedpan without reaching into the waste-receiving opening.

In the present invention, the term "inter-ring access region" is intended to mean a spatial region located between the seat ring and the support ring at the outer perimeter of the inflatable bedpan that is outwardly facing and that can remain accessible from outside the waste-receiving opening for grasping and pulling one or more graspable portions of a cinch string.

In the present invention, the term "outer containment bag" is intended to mean a bag configured to be installed on an inflatable bedpan as an intermediate barrier layer and configured to receive or support an inner containment bag during use.

In the present invention, the term "inner containment bag" is intended to mean a bag configured to be positioned within the outer containment bag and configured to receive waste and be closed for disposal, wherein the inner containment bag can be removable from the outer containment bag after being closed.

In the present invention, the term "cinch string" is intended to mean an elongate tension member that, when pulled, constricts an opening region of a containment bag, and can include a cord, ribbon, filament, braided line, strap, or equivalent.

In the present invention, the term "graspable portion" is intended to mean a portion of a cinch string configured to be grasped and pulled, including a terminal end, a loop, a bight, or another enlarged, reinforced, or otherwise formed pull feature, and does not require that the cinch string have separate terminal ends.

In the present invention, the term "cinch hole" is intended to mean an opening through a containment bag wall configured to allow a cinch string to pass through to an exterior side of the containment bag.

In the present invention, the term "central location" with respect to cinch holes of an outer containment bag is intended to mean a location closer to a vertical center line and/or a horizontal center line of the outer containment bag than to an upper perimeter portion of the outer containment bag.

In the present invention, the term "intermediate location" with respect to cinch holes of an outer containment bag is intended to mean a location between an upper perimeter portion and a bottom of the outer containment bag, and not on the upper perimeter portion itself.

In the present invention, the term "perimeter channel" is intended to mean a sleeve, hem, tunnel, or folded region extending along an upper perimeter portion of a containment bag and configured to receive and guide a cinch string.

In the present invention, the term "cinch string egress opening" is intended to mean an opening that allows a cinch string to exit a perimeter channel at a controlled location.

In the present invention, the term "top non-sealable opening" is intended to mean an opening of a bag intended to remain open during use for installation and waste reception, without requiring sealing of that opening during normal operation.

In the present invention, the term "top sealable opening" is intended to mean an opening of a bag configured to be constricted, cinched, tied, or otherwise closed after use to retain waste for disposal.

In the present invention, the term "receptacle ring" is intended to mean a structure positioned below the support ring that helps define a lower receptacle region for supporting one or more containment bags.

In the present invention, the term "bottom receptacle surface" is intended to mean a lower boundary surface configured to support a containment volume and inhibit leakage, and can be formed by a film, sheet, coating, or other barrier layer coupled to a receptacle ring.

In the present invention, the term "receptacle region" is intended to mean a lower containment region of the inflatable bedpan positioned below the waste-receiving opening and configured to support a containment bag and inhibit leakage, including a region at least partially defined by a receptacle ring and a bottom receptacle surface.

In the present invention, the term "leak-resistant" is intended to mean sufficiently resistant to leakage to inhibit escape of liquids under intended use and handling conditions, including typical repositioning and disposal handling intervals, without requiring absolute impermeability under all conditions.

In the present invention, the term "effective diameter" is intended to mean a diameter of a best-fit circle or an equivalent-diameter measure used to characterize a non-circular opening or boundary by an area-equivalent or perimeter-equivalent circle.

In the present invention, the term "higher crown" is intended to mean a raised, rounded region on a top surface of the seat ring positioned higher than an adjacent crown region.

In the present invention, the term "lower crown" is intended to mean a raised, rounded region on a top surface of the seat ring positioned lower than an adjacent crown region.

In the present invention, the term "declining slope" is intended to mean a downwardly varying height profile extending from a higher crown toward a lower crown along a top surface of the seat ring.

In the present invention, the term "concave curvature" is intended to mean a curvature on a top surface of the seat ring that defines a shallow cradle-like profile for assisting user positioning.

In the present invention, the term "installed" is intended to mean positioned and retained in a usable configuration relative to another component, whether by compression, friction, wrapping, folding, tension, fastening, or another retaining mechanism.

In the present invention, the term "removably installed" is intended to mean installed such that a component can be removed and replaced without destroying the component and without requiring disassembly of the inflatable bedpan beyond ordinary lifting or repositioning steps.

In the present invention, the term "compression capture" is intended to mean retention produced by clamping, pinching, or compressing a portion of a bag or sheet between two structures, including between the seat ring and the support ring.

In the present invention, the term "barrier layer" is intended to mean a layer positioned between waste and another component to inhibit soiling, contamination transfer, or direct contact, and can include a bag wall, film layer, laminate, or coated layer.

In the present invention, the term "waste" is intended to mean bodily excreta including urine, feces, or other biological material, and may include associated liquids and solids.

In the present invention, the term "pulling action" is intended to mean application of a force to a cinch string in one direction or opposing directions to constrict an opening of a containment bag.

In the present invention, the term "accessible" is intended to mean reachable and usable by a user or caregiver without requiring insertion of a hand through the waste-receiving opening and without requiring the user to dismount from the inflatable bedpan, unless expressly stated otherwise.

Turning now to the drawings in greater detail, it will be seen that in FIG. 1, there is illustrated one example of, in reference 'A', a top-front-left perspective view of the inflatable bedpan 100, and in reference 'B', a top-back-right perspective view of the inflatable bedpan 100. In an exemplary embodiment, an inflatable bedpan 100 can be configured to support a user on bedding while defining a controlled waste-receiving volume, and while further supporting a bag-based waste-management workflow described elsewhere in this specification. In an exemplary embodiment, the inflatable bedpan 100 can include a seat ring 102 disposed at an upper region of the inflatable bedpan 100, a support ring 104 disposed below the seat ring 102, and a receptacle ring 106 disposed below the support ring 104. The seat ring 102 can provide a compliant, pressure-distributing contact interface for the user, and the support ring 104 can provide lift, lateral stability, and a structural "stand-off" that helps maintain an internal clearance volume beneath the seat ring 102 so that waste can be received without collapsing the bedpan volume onto the bedding. The receptacle ring 106 can cooperate with the support ring 104 to form a basin-like lower region that can help resist outward bulging and can constrain the waste-receiving volume into a predictable shape, which can reduce spillage and "bag sag" that can occur in certain prior approaches where a liner is supported primarily by friction around a rim and where the lower portion of the liner can contact bedding and wick or smear.

In an exemplary embodiment, the seat ring 102 can define a waste-receiving opening having an effective diameter in a range of about 120 mm to about 260 mm, in a more preferred range of about 150 mm to about 220 mm, and in an exemplary embodiment of about 190 mm. In an exemplary embodiment, the seat ring 102 can have a ring cross-sectional thickness, measured as an effective tube diameter, in a range of about 20 mm to about 80 mm, in a more preferred range of about 30 mm to about 65 mm, and in an exemplary embodiment of about 45 mm. In an exemplary embodiment, the support ring 104 can have a ring cross-sectional thickness, measured as an effective tube diameter, in a range of about 25 mm to about 100 mm, in a more preferred range of about 40 mm to about 85 mm, and in an exemplary embodiment of about 60 mm. In an exemplary embodiment, an overall inflated height of the inflatable bedpan 100, measured from a bottom region of the receptacle ring 106 to a top region of the seat ring 102, can be in a range of about 40 mm to about 140 mm, in a more preferred range of about 60 mm to about 110 mm, and in an exemplary embodiment of about 85 mm. These exemplary dimensional relationships can be selected so that the seat ring 102 can distribute load across bedding, the support ring 104 can resist roll-over when the user shifts weight, and the receptacle ring 106 can retain an internal volume with sufficient depth to reduce contact between waste and bedding during use, which can provide a practical improvement over prior approaches that use rigid bedpans that concentrate pressure or soft liners that collapse.

In an exemplary embodiment, the inflatable bedpan 100 can be configured for staged inflation so that placement beneath a user can be performed in a semi-inflated condition and then adjusted to a desired firmness after positioning. As shown in reference 'B', the seat ring 102 can include a seat air valve 108 that can be in fluid communication with an interior chamber of the seat ring 102, and the support ring 104 can include a base air valve 110 that can be in fluid communication with an interior chamber of the support ring 104. In an exemplary embodiment, providing separate valves 108 and 110 can enable independent adjustment of the seat ring 102 and the support ring 104 so that, for example, the seat ring 102 can be maintained at a softer compliance for comfort while the support ring 104 can be inflated to a higher firmness for stability. This independent adjustability can reduce the need for multiple bedpan sizes and can improve bedside handling reliability as compared to prior approaches that provide a single inflation chamber or a single rigid geometry that cannot be tuned to bedding thickness and patient comfort needs.

In an exemplary embodiment, and as shown in reference 'A', the inflatable bedpan 100 can include a tether closure strap 112. The tether closure strap 112 can be coupled between the seat ring 102 and the support ring 104, and can be configured to limit relative separation of the seat ring 102 from the support ring 104 during use, transport, and handling. In an exemplary embodiment, the tether closure strap 112 can function as a positional restraint that helps maintain a consistent spatial relationship between the seat ring 102 and the support ring 104 even when the inflatable bedpan 100 is partially inflated, when the user shifts laterally, or when a caregiver repositions bedding. This can reduce the likelihood that the seat ring 102 shifts relative to the support ring 104 in a way that would otherwise disturb an installed bag arrangement, and can thereby support a cleaner cinch-closure workflow in which a caregiver can rely on predictable access to cinch components without needing repeated re-seating of a liner.

In an exemplary embodiment, and as shown in reference 'B', the inflatable bedpan 100 can include a seat retainer hinge 114 configured to allow controlled relative movement of the seat ring 102 with respect to the support ring 104. The seat retainer hinge 114 can be formed as a flexible hinge region, such as a locally thinned or folded portion of material, a welded seam hinge, a bonded hinge strip, or another compliant hinge structure integrated into the inflatable body. In an exemplary embodiment, the seat retainer hinge 114 can allow the seat ring 102 to be selectively lifted relative to the support ring 104 to facilitate installation of an outer containment bag and/or an inner containment bag, and then returned to a closed position for use, while the tether closure strap 112 can resist over-rotation and can retain the seat ring 102 in a desired positional range. This controlled hinge-and-restraint behavior can be a concrete technical improvement over prior approaches in which a bag is stretched over a rim without guided articulation and where the liner can slip or fold unpredictably, increasing leakage risk and complicating disposal.

In an exemplary embodiment, the inflatable bedpan 100 can include a strengthening seal 134 positioned at an interface between the receptacle ring 106 and an adjacent structure, such as the support ring 104, as shown in reference "B." The strengthening seal 134 can be implemented as a welded seam, a bonded reinforcement strip, a multi-pass heat weld, a localized thickness increase, or another structural reinforcement feature that can increase shape retention at the junction between inflatable regions. In an exemplary embodiment, the strengthening seal 134 can help the receptacle ring 106 maintain a defined basin geometry under load, can reduce lateral deformation when a user shifts weight, and can reduce torsional roll of the inflatable bedpan 100 on bedding. By constraining deformation in a controlled way, the strengthening seal 134 can also support improved containment reliability for bag-based waste capture, because a more predictable basin geometry can reduce contact between a waste-containing inner bag and surrounding bedding and can reduce "edge collapse" pathways that can occur when soft structures deform into the waste-receiving volume.

In an exemplary embodiment, the receptacle ring 106 can define, support, or be coupled with a bottom receptacle surface that can be leak-proof, such as by using welded seams, bonded seams, multilayer films, or coated barrier layers, so that liquids can be retained within the waste-receiving region during use and handling. In an exemplary embodiment, the receptacle ring 106 and associated bottom receptacle surface can be configured such that, when the support ring 104 is inflated via the base air valve 110, the receptacle ring 106 can be selectively inflatable or can become tensioned into a defined contour that resists pooling against side walls. This can provide a practical advantage over prior approaches that rely on a single bag draped into a bedpan or onto bedding, where the lowest point of the bag can migrate laterally and contact a side wall, increasing the risk of leakage or messy removal.

The inflatable bedpan 100, as illustrated in FIG. 1, can therefore provide a tangible, structural solution to bedside toileting that improves patient comfort, improves stability on bedding, and supports repeatable waste containment and disposal workflows. The improvements described herein are rooted in specific mechanical features and interactions, including the cooperative geometry of the seat ring 102, the support ring 104, and the receptacle ring 106, the independent inflation control via the seat air valve 108 and the base air valve 110, the controlled articulation provided by the seat retainer hinge 114, the positional restraint provided by the tether closure strap 112, and the shape-retaining reinforcement provided by the strengthening seal 134. These concrete physical components and operational relationships can provide real-world reductions in caregiver handling complexity and contamination risk compared to prior approaches, and can thereby form a practical technological improvement rather than an abstract concept.

In an exemplary embodiment, the inflatable bedpan 100 can be configured to be selectively inflated from a collapsed, low-profile storage configuration to an inflated operating configuration by introducing an inflation fluid into one or more inflatable chambers via the seat air valve 108 and/or the base air valve 110. In an exemplary embodiment, the inflation fluid can be ambient air, medical-grade air, another gas, or a liquid, and can be introduced using a variety of inflation sources depending on the care setting. For example, inflation can be performed using a hand-operated bulb pump, a hand pump, a foot pump, an electric pump, a battery-powered pump, a syringe-type inflator, a portable compressor, or a facility-provided compressed-air source. In an exemplary embodiment, the seat air valve 108 can be operated to inflate the seat ring 102 to a comfort-oriented compliance, and the base air valve 110 can be operated to inflate the support ring 104 to a stability-oriented compliance, thereby enabling staged inflation in which the inflatable bedpan 100 can be at least partially inflated for positioning beneath the user 202 and subsequently inflated to a desired operating profile after placement.

In an exemplary embodiment, the seat air valve 108 and/or the base air valve 110 can be implemented as a one-way inflation valve, a check valve, a pinch valve, a flap valve, a screw valve, or another valve structure that can inhibit backflow during inflation. In some embodiments, one or more of the valves 108, 110 can include a releasable plug, a threaded cap, a spring-biased valve core, or a push-to-release feature that permits a caregiver to quickly transition between inflation, pressure-holding, and deflation states. In an exemplary embodiment, the inflatable bedpan 100 can be inflated from a semi-inflated state to an inflated state by incremental addition of inflation fluid, enabling the caregiver to tune height and firmness while observing user positioning and bedding compliance. In some embodiments, one or more of the valves 108, 110 can be configured to interface with standardized pump nozzles and/or compressed-air fittings to reduce setup time and to improve repeatability across different environments.

In an exemplary embodiment, the inflatable bedpan 100 can be configured to be deflated and collapsed when not in use by allowing the inflation fluid to escape through the seat air valve 108 and/or the base air valve 110. In an exemplary embodiment, deflation can be performed by opening a release feature of the valve, removing a plug, depressing a valve core, unthreading a cap, or otherwise placing the valve in a venting configuration such that internal pressure in the seat ring 102 and/or the support ring 104 decreases. In an exemplary embodiment, as the inflation fluid exits, the seat ring 102 and/or the support ring 104 can flatten and conform to a low-profile shape, allowing the inflatable bedpan 100 to be folded, rolled, stacked, or otherwise compacted for storage, transport, or disposal, depending on the embodiment. In some embodiments, the inflatable bedpan 100 can be collapsed to a thickness in a range of about 5 mm to about 60 mm, in a more preferred range of about 10 mm to about 40 mm, and in an exemplary embodiment of about 20 mm, enabling storage in a bedside drawer, supply cart, or portable care kit.

In an exemplary embodiment, the inflation and deflation functionality can be coordinated with the waste-management workflow to improve hygiene and reduce caregiver handling. For example, staged inflation through the seat air valve 108 and/or the base air valve 110 can allow the inflatable bedpan 100 to be partially inflated so that it can be positioned beneath the user 202 with reduced insertion resistance against bedding, after which additional inflation can be provided to stabilize the support ring 104 and maintain a desired clearance volume for waste containment. In an exemplary embodiment, after a use cycle, the inflatable bedpan 100 can be at least partially deflated to reduce height and facilitate removal from beneath the user 202, particularly when the user 202 has limited ability to lift or reposition. In this manner, inflation and deflation can be physical, mechanical operations that cooperate with the placement, use, and removal steps to reduce strain on the caregiver and reduce exertion by the user 202 compared to prior approaches that require lifting or arching to slide a rigid bedpan into position.

In an exemplary embodiment, one or more safety and reliability features can be provided for the inflation system. For example, a pressure-limiting structure can be incorporated into one or more of the valves 108, 110, into a pump interface, or into a chamber wall to inhibit over-inflation and to maintain a comfortable and stable operating profile. In some embodiments, the inflatable bedpan 100 can include separate inflation chambers for the seat ring 102 and the support ring 104, while in other embodiments, the inflatable bedpan 100 can include a coupled inflation path that allows the seat ring 102 and the support ring 104 to be inflated from a common inflation source while still permitting differential pressure control via valve operation. In an exemplary embodiment, these inflation and deflation features provide a concrete mechanical adjustability and portability advantage, enabling the inflatable bedpan 100 to be quickly deployed, tuned, and collapsed in real-world bedside settings.

Figure 2:
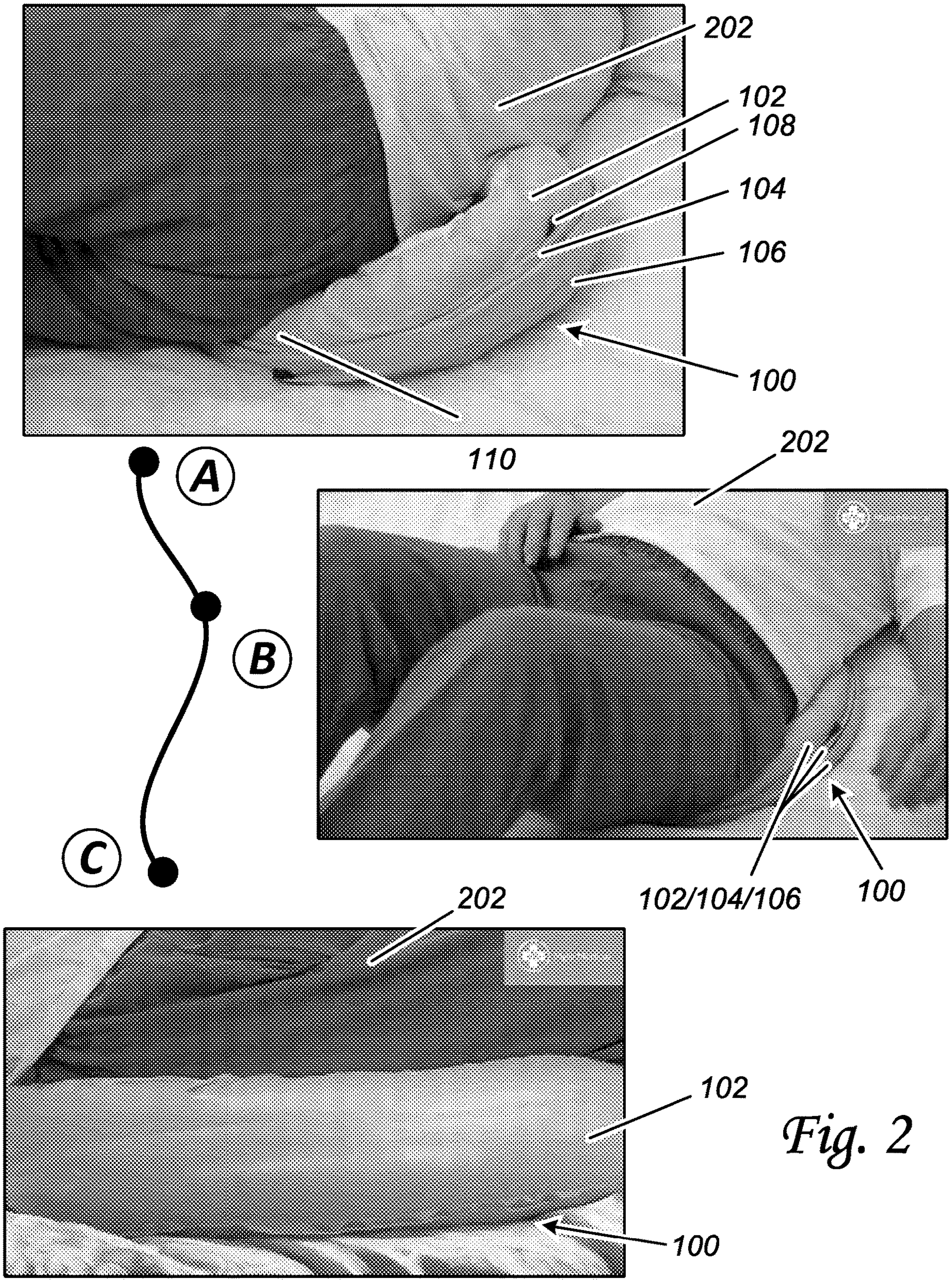
FIG. 2 illustrates one example of a method of using an inflatable bedpan. In reference 'A', the user is turned on their side, and the inflatable bed pan is positioned, in an inflated or semi-inflated state, adjacent to the user. In reference 'B', the user rotates to a lying position on their back with the inflatable bed pan, in the inflated or semi-inflated state, positioned under the user. In reference 'C', the user goes to the bathroom in the inflatable bedpan.

Referring to FIG. 2, there is illustrated one example of a method of using an inflatable bedpan 100. In reference 'A', the user 202 can be turned on their side, and the inflatable bedpan 100 can be positioned, in an inflated or semi-inflated state, adjacent to the user 202. In reference 'B', the user 202 can rotate to a lying position on their back with the inflatable bedpan 100, in the inflated or semi-inflated state, positioned under the user 202. In reference "C", the user 202 can go to the bathroom in the inflatable bedpan 100.

In an exemplary embodiment, FIG. 2 illustrates a practical, bedside positioning workflow in which the inflatable bedpan 100 can be placed beneath a user 202 with reduced lifting force and improved positional repeatability relative to prior approaches that rely on rigid bedpans that must be shoved under a user or that create pressure points when the user's weight is shifted. In an exemplary embodiment, reference 'A' illustrates the user 202 in a side-lying posture while the inflatable bedpan 100 is positioned adjacent to the user 202. The inflatable bedpan 100 can include the seat ring 102, the support ring 104, and the receptacle ring 106, which can cooperate to define a staged support profile that can be partially compliant during placement and subsequently more supportive during use. In an exemplary embodiment, the seat ring 102 can be inflated through the seat air valve 108, and the support ring 104 can be inflated through the base air valve 110, so that a caregiver can independently tune upper comfort and lower stability. For example, the seat ring 102 can be inflated to a lower pressure profile to remain compliant against the user's skin and bedding, while the support ring 104 can be inflated to a higher pressure profile to resist lateral roll and maintain a waste-receiving clearance volume above the receptacle ring 106.

In an exemplary embodiment, the "semi-inflated state" used during placement can correspond to a condition in which the seat ring 102 and/or the support ring 104 is inflated to a reduced effective height that facilitates sliding the inflatable bedpan 100 between the user 202 and the bedding. By way of example, an overall inflated height of the inflatable bedpan 100, measured from a bottom region of the receptacle ring 106 to a top region of the seat ring 102, can be in a broad operative range of about 40 mm to about 140 mm, in a more preferred range of about 60 mm to about 110 mm, and in an exemplary embodiment of about 85 mm during use, and the semi-inflated state can be selected at a lower portion of that range to reduce insertion resistance against bedding. In this manner, the inflatable bedpan 100 can be advanced into position with reduced shear forces at the user-bedding interface, which can reduce discomfort and reduce risk of skin irritation as compared to prior approaches that involve dragging a rigid bedpan edge under a user.

In an exemplary embodiment, reference 'B' illustrates a transition in which the user 202 can rotate toward a supine position while the inflatable bedpan 100 remains positioned beneath the user 202. In this transition, the ring architecture can provide a stabilizing mechanical effect. The support ring 104 can provide a laterally broad base that increases frictional engagement with bedding and can reduce rotation or "kick-out" of the bedpan during the roll. The receptacle ring 106 can provide a lower containment geometry that helps maintain a defined basin region beneath the user 202 even as the bedding deforms. The seat ring 102 can provide a compliant contact region that can distribute load, reduce localized pressure, and guide the user 202 toward a centered seating region. In some embodiments, the seat ring 102, the support ring 104, and the receptacle ring 106 can cooperatively resist collapse by redistributing load through the inflated walls so that the waste-receiving opening remains accessible and does not pinch closed under body weight, which can be a failure mode in certain prior approaches where a soft liner collapses into itself or where a rigid bedpan is misaligned and creates an uncomfortable edge.

In an exemplary embodiment, the staged inflation enabled by the seat air valve 108 and the base air valve 110 can further improve repeatability of the placement workflow. For example, once the inflatable bedpan 100 is positioned under the user 202, a caregiver can add inflation through the base air valve 110 to raise and stabilize the support ring 104, and can optionally adjust the seat ring 102 through the seat air valve 108 to achieve a desired comfort contour. The ability to independently tune these regions can also enable use across different bedding thicknesses and patient sizes without requiring a different rigid bedpan geometry, thereby providing a concrete technical improvement in bedside toileting hardware rather than an abstract process. This is particularly relevant in clinical environments where repeatable setup and predictable containment can reduce cleanup time and reduce contamination exposure.

In an exemplary embodiment, reference "C" illustrates the user 202 supported on the inflatable bedpan 100 during use, with the seat ring 102 providing an upper support interface while the lower structures maintain containment clearance. In this state, the support ring 104 can maintain a defined vertical lift that separates the waste-receiving region from the bedding, and the receptacle ring 106 can maintain a stable basin region beneath the user 202. Although not required in all embodiments, the receptacle ring 106 can include, define, or support a leak-proof bottom receptacle surface such that liquids can be retained without wicking into bedding, which can be an operational advantage compared to prior approaches where a bag or liner contacts bedding at the lowest point and can smear or leak during removal. In an exemplary embodiment, the illustrated workflow can be used in combination with the dual-bag containment arrangement described elsewhere in this specification, such that waste can be captured in a removable inner containment bag while a separate outer containment bag protects the inflatable bedpan 100, thereby enabling a controlled disposal workflow and reducing the likelihood of contamination during closure and removal.

In an exemplary embodiment, the inflatable bedpan 100 can be inflated by introducing an inflation fluid through the seat air valve 108 and/or the base air valve 110 using one or more inflation sources. In some embodiments, the inflation source can include a hand-operated bulb pump, a hand pump, a foot pump, an electric pump, a battery-powered pump, a syringe-type inflator, a portable compressor, or a facility-provided compressed-air source, and the inflation fluid can include ambient air, medical-grade air, another gas, or a liquid. In an exemplary embodiment, the seat air valve 108 and/or the base air valve 110 can be configured to interface with a pump nozzle, hose fitting, tapered connector, threaded connector, or other coupling geometry, and can include a one-way valve feature that inhibits backflow during inflation. In this manner, the inflatable bedpan 100 can be deployed in a variety of care environments, including home care and clinical settings, without requiring a single proprietary pump type.

In an exemplary embodiment, staged inflation can be performed by partially inflating the seat ring 102 and/or the support ring 104 to place the inflatable bedpan 100 in a semi-inflated state for positioning beneath the user 202, and then further inflating the seat ring 102 and/or the support ring 104 to reach an inflated state for use. In an exemplary embodiment, after use, the inflatable bedpan 100 can be collapsed by venting the inflation fluid through at least one of the seat air valve 108 and the base air valve 110, such as by opening a release feature, removing a plug, depressing a valve core, unthreading a cap, or otherwise placing the valve in a venting configuration. In some embodiments, venting can be controlled to partially deflate the inflatable bedpan 100 for removal from beneath the user 202 while maintaining sufficient structure to avoid uncontrolled folding, and venting can then continue to reach a collapsed configuration suitable for folding, rolling, stacking, or compact storage.

Accordingly, FIG. 2 demonstrates how the inflatable bedpan 100 can be used through a sequence of practical physical steps, supported by specific structural features and cooperative mechanical behavior of the seat ring 102, the support ring 104, and the receptacle ring 106, and supported by inflation control through the seat air valve 108 and the base air valve 110.

In operation, in an exemplary embodiment, user 202 can use an inflatable bedpan waste-management system while positioned on a bed, a wheelchair, or another support surface, wherein the inflatable bedpan waste-management system can be configured to permit cinch-closure of an inner containment bag 124 from an inter-ring access region located between a seat ring 102 and a support ring 104 of an inflatable bedpan 100 at an outer perimeter of the inflatable bedpan 100. In an exemplary embodiment, the inflatable bedpan 100 can include the seat ring 102 and the support ring 104, the inflatable bedpan 100 defining a waste-receiving opening, wherein the waste-receiving opening can be defined by at least one of the seat ring 102 and the support ring 104, such that the seat ring 102 can provide a compliant support interface for the user 202 and the support ring 104 can provide lift and lateral stability relative to the support surface. In an exemplary embodiment, the inter-ring access region can be defined as a spatial region located along an outer perimeter of and between the seat ring 102 and the support ring 104, wherein the inter-ring access region is outwardly facing and accessible from outside the inflatable bedpan 100 during use, and the inter-ring access region can be sized to allow a caregiver 204 or the user 202 to access and pull one or more graspable portions of a cinch string 120 without inserting a hand through the waste-receiving opening. In some embodiments, a vertical separation between the seat ring 102 and the support ring 104 defining the inter-ring access region can be in a range of about 5 mm to about 60 mm, in a more preferred range of about 10 mm to about 40 mm, and in an exemplary embodiment of about 20 mm, although other separations can be used depending on a desired accessibility, inflation state, and support-surface compliance.

In an exemplary embodiment, the inflatable bedpan waste-management system can include an outer containment bag 122 comprising an upper perimeter portion configured to be positioned over the seat ring 102 or over the support ring 104. In an exemplary embodiment, the upper perimeter portion can be configured to drape over and conform to an outer contour of the seat ring 102 or the support ring 104 so that the outer containment bag 122 can form a protective barrier layer between the inflatable bedpan 100 and waste contents. In some embodiments, the upper perimeter portion can be retained by frictional engagement, by a geometric wrap, by a compressive capture between the seat ring 102 and the support ring 104, by a fold-over lip, by an elastic band, by a tether, or by another mechanical retention approach that maintains the outer containment bag 122 in a stable installed position during user movement. In an exemplary embodiment, the outer containment bag 122 can further include a plurality of cinch holes 126 formed through the outer containment bag 122 at one or more central locations spaced from the upper perimeter portion, wherein the plurality of cinch holes 126 can be positioned to align with the inter-ring access region when the outer containment bag 122 is installed on the inflatable bedpan 100. In some embodiments, an effective diameter of each cinch hole 126 can be in a range of about 2 mm to about 12 mm, in a more preferred range of about 3 mm to about 8 mm, and in an exemplary embodiment of about 5 mm, and a spacing between adjacent cinch holes 126 can be in a range of about 15 mm to about 120 mm, in a more preferred range of about 25 mm to about 80 mm, and in an exemplary embodiment of about 50 mm, such that the cinch holes 126 can receive cinch string segments while resisting tearing during pulling. In an exemplary embodiment, reinforcement can be provided around one or more cinch holes 126, such as by a thicker film region, a bonded reinforcement patch, a heat-welded band, a grommet structure, or a laminated reinforcement ring.

In an exemplary embodiment, the inflatable bedpan waste-management system can include an inner containment bag 124 configured to be positioned within the outer containment bag 122 to receive human waste through the waste-receiving opening of the inflatable bedpan 100. In an exemplary embodiment, the inner containment bag 124 can include a top sealable opening 130 configured to remain open during use and configured to be cinched closed after receipt of waste. In some embodiments, the inner containment bag 124 can define an inner bag effective diameter 308 at an upper opening region in a range of about 450 mm to about 900 mm, in a more preferred range of about 550 mm to about 800 mm, and in an exemplary embodiment of about 700 mm, and can define an inner bag height 312 in a range of about 300 mm to about 800 mm, in a more preferred range of about 400 mm to about 650 mm, and in an exemplary embodiment of about 525 mm, such that the inner containment bag 124 can drape into a receptacle region of the inflatable bedpan 100 while maintaining sufficient volume for containment. In an exemplary embodiment, after being cinched closed, the inner containment bag 124 can be removable from the outer containment bag 122 for disposal.

In an exemplary embodiment, the inflatable bedpan waste-management system can include a cinch string 120 associated with the inner containment bag 124 and configured to be threaded through the plurality of cinch holes 126 of the outer containment bag 122 to present one or more graspable portions of the cinch string 120 on an exterior side of the outer containment bag 122. In an exemplary embodiment, the cinch string 120 can be arranged so that pulling the cinch string 120 cinches closed the top sealable opening 130 of the inner containment bag 124. In an exemplary embodiment, the one or more graspable portions can be accessible from the inter-ring access region while the inner containment bag 124 remains positioned within the outer containment bag 122. In an exemplary embodiment, the cinch string 120 can be a cord, ribbon, filament, braided line, strap, or other elongate tension member, and can have a diameter in a range of about 0.8 mm to about 6 mm, in a more preferred range of about 1.5 mm to about 4 mm, and in an exemplary embodiment of about 2.5 mm, such that a user 202 or caregiver 204 can apply pulling forces reliably with gloved hands. In some embodiments, the length of a graspable portion accessible from outside the outer containment bag 122 can be in a range of about 75 mm to about 450 mm, in a more preferred range of about 120 mm to about 300 mm, and in an exemplary embodiment of about 200 mm, thereby providing sufficient grasp length while reducing the likelihood of entanglement.

In an exemplary embodiment, the inflatable bedpan 100 can include a seat air valve 108 in fluid communication with the seat ring 102 and a base air valve 110 in fluid communication with the support ring 104. In an exemplary embodiment, the seat air valve 108 and the base air valve 110 can allow independent inflation control so that the seat ring 102 can be adjusted to a comfort-oriented compliance while the support ring 104 can be adjusted to a stability-oriented firmness. In some embodiments, an effective port diameter of the seat air valve 108 and/or the base air valve 110 can be in a range of about 8 mm to about 30 mm, in a more preferred range of about 10 mm to about 22 mm, and in an exemplary embodiment of about 16 mm. In some embodiments, an overall inflated height of the inflatable bedpan 100 can be in a range of about 40 mm to about 140 mm, in a more preferred range of about 60 mm to about 110 mm, and in an exemplary embodiment of about 85 mm, thereby enabling staged placement in a semi-inflated condition and subsequent inflation to a stable operating condition after positioning under the user 202.

In an exemplary embodiment, the inner containment bag 124 can include one or more cinch string egress openings 136 configured to guide the cinch string 120 to present one or more graspable portions of the cinch string 120 at the inter-ring access region. In an exemplary embodiment, the one or more cinch string egress openings 136 can be placed proximate an upper perimeter portion of the inner containment bag 124, such as within or adjacent to a seal edge 316. In some embodiments, an effective width of each cinch string egress opening 136 can be in a range of about 2 mm to about 20 mm, in a more preferred range of about 3 mm to about 12 mm, and in an exemplary embodiment of about 6 mm, and a spacing distance 304 between adjacent cinch string egress openings 136 can be in a range of about 15 mm to about 120 mm, in a more preferred range of about 25 mm to about 80 mm, and in an exemplary embodiment of about 50 mm, such that the cinch string 120 can emerge at predictable locations for hand-off through the cinch holes 126 of the outer containment bag 122. In an exemplary embodiment, this guided egress arrangement can improve closure repeatability and reduce contamination risk by allowing the user 202 or caregiver 204 to pull the cinch string 120 from outside the outer containment bag 122 rather than reaching into the waste-receiving opening.

In an exemplary embodiment, the upper perimeter portion of the outer containment bag 122 can be configured to be repositioned between a first installed configuration positioned over the seat ring 102 and a second installed configuration positioned over the support ring 104. In an exemplary embodiment, this repositionability can allow a caregiver 204 to select an installation mode based on whether the seat ring 102 is lifted relative to the support ring 104 during setup. In an exemplary embodiment, in the second installed configuration, the upper perimeter portion can be configured to be compressively captured between the seat ring 102 and the support ring 104 when the seat ring 102 is lowered toward the support ring 104, thereby retaining the outer containment bag 122 during pulling of the cinch string 120. In other embodiments, the upper perimeter portion of the outer containment bag 122 can be positioned over the seat ring 102 to provide direct retention and to align the top non-sealable opening 128 with the waste-receiving opening.

In an exemplary embodiment, after the inner containment bag 124 is cinched closed, the inner containment bag 124 can be removable upward through a top opening of the outer containment bag 122 for disposal while the outer containment bag 122 remains installed on the inflatable bedpan 100 with the plurality of cinch holes 126 retained in position along the outer perimeter of the inflatable bedpan 100 for a subsequent inner containment bag installation. In an exemplary embodiment, keeping the outer containment bag 122 installed can maintain a barrier layer that reduces direct contact between waste and the inflatable bedpan 100 during a use cycle and can reduce cleaning steps between repeated use cycles in a care session.

In an exemplary embodiment, the plurality of cinch holes 126 can comprise at least two cinch holes positioned on opposing lateral sides of the outer containment bag 122 such that opposing graspable portions of the cinch string 120 are presented on opposing sides of the outer containment bag 122 and extend through the inter-ring access region between the seat ring 102 and the support ring 104 at the outer perimeter of the inflatable bedpan 100 for opposing-direction pulls from the inter-ring access region. In an exemplary embodiment, this opposing-direction pull configuration can promote a more symmetric constriction of the top sealable opening 130 and can reduce uneven puckering that can leave leakage gaps.

In an exemplary embodiment, the seat ring 102 can include a higher crown 118 and a lower crown 116, wherein the higher crown 118 is taller than the lower crown 116 to create a declining slope 408 therebetween. In an exemplary embodiment, the higher crown 118 and lower crown 116 can collectively define a concave curvature 412 on a top surface of the seat ring 102 configured to at least partially cradle a posterior region of the user 202 during use. In some embodiments, a crown height differential between the higher crown 118 and the lower crown 116 can be in a range of about 2 mm to about 40 mm, in a more preferred range of about 5 mm to about 25 mm, and in an exemplary embodiment of about 12 mm. In some embodiments, the declining slope 408 can define an angle 410 in a range of about 2 degrees to about 20 degrees, in a more preferred range of about 4 degrees to about 12 degrees, and in an exemplary embodiment of about 8 degrees. In an exemplary embodiment, a slope reference line 334 can represent the slope relationship between the higher crown 118 and the lower crown 116 and the top surface of the seat ring 102. In an exemplary embodiment, this crown-and-slope geometry can improve positional stability of the user 202 by biasing the user 202 toward a more centered posture during use, thereby reducing misalignment between the user 202 and the waste-receiving opening.

In an exemplary embodiment, the inflatable bedpan 100 can further comprise a receptacle ring 106 positioned below the support ring 104 and comprising a bottom receptacle surface 132 configured to support the inner containment bag 124 and inhibit leakage from a receptacle region. In an exemplary embodiment, the bottom receptacle surface 132 can be formed as a continuous barrier layer coupled around a perimeter of the receptacle ring 106, thereby inhibiting liquid leakage into the support surface during use and handling.

In an exemplary embodiment, user 202 can perform a method of using the inflatable bedpan waste-management system by positioning the inflatable bedpan 100 adjacent to the user 202 while the inflatable bedpan 100 is in an inflated state or a semi-inflated state. In an exemplary embodiment, the inflatable bedpan 100 can be partially inflated to the semi-inflated state prior to positioning adjacent to the user 202, which can reduce insertion resistance against the support surface and can reduce the need for the user 202 to arch or lift the pelvis during placement. In some embodiments, the semi-inflated state can correspond to an overall inflated height of the inflatable bedpan 100 in a range of about 20 percent to about 80 percent of a fully inflated operating height, in a more preferred range of about 30 percent to about 70 percent, and in an exemplary embodiment of about 50 percent, although other partial inflation levels can be used.

In an exemplary embodiment, the method can further include positioning the outer containment bag 122 such that the upper perimeter portion of the outer containment bag 122 is positioned over the seat ring 102 or the support ring 104, and positioning the inner containment bag 124 within the outer containment bag 122. In an exemplary embodiment, the method can include arranging the cinch string 120 such that one or more graspable portions of the cinch string 120 are accessible from the inter-ring access region. In an exemplary embodiment, after the user 202 deposits human waste into the inner containment bag 124 through the waste-receiving opening, the method can include pulling the cinch string 120 to cinch closed the inner containment bag 124, and removing the cinched closed inner containment bag 124 from the inflatable bedpan 100 for disposal.

In an exemplary embodiment, the method can further include pulling opposing graspable portions of the cinch string 120 from the inter-ring access region in opposing directions, thereby cinching closed the inner containment bag 124 without inserting a hand into the waste-receiving opening and while maintaining the outer containment bag 122 as a barrier layer between waste and the user 202 or caregiver 204. In this manner, the described system and method can provide a practical technological improvement in bedside waste management by enabling external-access closure and selective removal of a waste-containing inner containment bag 124, reducing contamination risk, and reducing handling complexity through specific physical components and spatially defined interactions rather than through an abstract concept.

Figure 3:
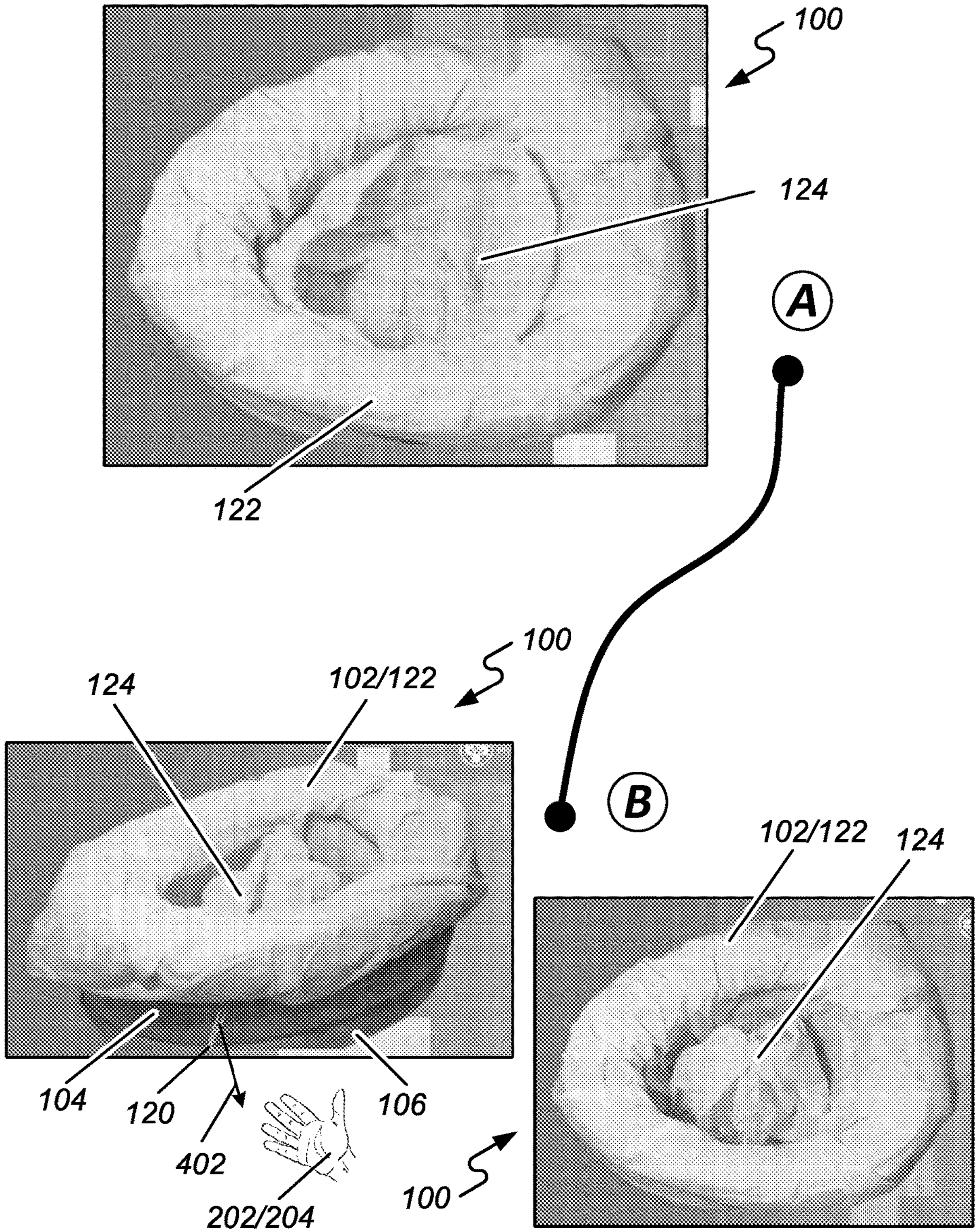
FIG. 3 illustrates a method of managing the human waste contents from the user. In reference 'A', the outer containment bag is positioned, in the open position, over either the seat ring or the support ring, and the inner containment bag, in the open position, is positioned within the outer containment bag with the one or more cinch strings threaded through the cinch holes in the outer containment bag accessible be either the user or a caregiver assisting the user. In reference 'B, after the user goes to the bathroom, with the human waste captured in the open inner containment bag, the cinch strings are pulled by the user or the caregiver, cinching the inner containment bag closed. The inner containment bag can then be discarded.

Referring to FIG. 3, there is illustrated one example of a method of managing human waste contents from a user 202, including an outer containment bag 122 and an inner containment bag 124 used with the inflatable bedpan 100, and further including a cinch-based closure that can be actuated by the user 202 and/or a caregiver 204 from outside the inflatable bedpan 100.

In an exemplary embodiment, an inflatable bedpan 100 can be configured to cooperate with a two-bag containment architecture that can improve cleanliness, handling reliability, and closure controllability relative to prior approaches that rely on a single draped liner or a drawstring bag that must be grasped from within a waste-receiving opening. In an exemplary embodiment, the inflatable bedpan 100 can include a support ring 104 and a receptacle ring 106 that together can define a stable support-and-basin geometry that resists collapse into bedding and maintains a predictable cavity into which containment bags can be positioned. In this manner, the bag system can be installed in a repeatable orientation and can remain supported by a physical structure, rather than being dependent solely on friction at a rim or on the stiffness of the bag material.

In an exemplary embodiment, reference 'A' illustrates a first installed configuration in which the outer containment bag 122 can be positioned in an open position over the inflatable bedpan 100 such that the outer containment bag 122 forms an intermediate barrier layer between the inflatable bedpan 100 and waste contents. In this configuration, the outer containment bag 122 can be positioned such that an upper region of the outer containment bag 122 is supported by a ring structure of the inflatable bedpan 100, and a lower region of the outer containment bag 122 can hang into the basin region supported by the support ring 104 and the receptacle ring 106. The inner containment bag 124 can then be positioned, also in an open position, within the outer containment bag 122. In the illustrated embodiment, the inner containment bag 124 can be arranged so that a mouth region of the inner containment bag 124 remains accessible for receiving waste, while a lower region of the inner containment bag 124 is supported by the outer containment bag 122 and the basin geometry of the inflatable bedpan 100, thereby reducing sagging, folding, and uncontrolled contact with bedding that can occur in certain prior approaches. This layered arrangement can provide a concrete, physical cleanliness advantage, because the outer containment bag 122 can reduce direct contact between waste and the inflatable bedpan 100 during use and during removal of the inner containment bag 124.

In an exemplary embodiment, and as further illustrated in reference 'B', the inner containment bag 124 can include a cinch string 120 that can be routed along an upper perimeter region of the inner containment bag 124, such as within a perimeter channel of the inner containment bag 124, so that pulling the cinch string 120 can reduce a mouth perimeter of the inner containment bag 124 to close the inner containment bag 124. Reference 'B' further illustrates a key handling differentiator in which portions of the cinch string 120 can be passed outward through the outer containment bag 122 such that the cinch string 120 is accessible to the user 202 and/or the caregiver 204 from outside the bag assembly and outside the inflatable bedpan 100. In other words, the cinch string 120 can be arranged so that a pulling force can be applied from an exterior side of the outer containment bag 122 while the inner containment bag 124 remains nested inside the outer containment bag 122. This exterior-access closure arrangement can provide a practical improvement over prior approaches in which a caregiver must reach into or near a waste-receiving opening to grasp a liner edge or drawstring, because the illustrated configuration can allow cinching to be performed with reduced risk of contacting waste and with reduced risk of splashing, smearing, or glove contamination.

In an exemplary embodiment, reference 'B' additionally illustrates a pulling action 402 applied to the cinch string 120 by the user 202 and/or the caregiver 204. The pulling action 402 can be applied as a single-handed pull, a two-handed pull, or alternating pulls on different portions of the cinch string 120, depending on the embodiment and depending on how the cinch string 120 is routed. When the pulling action 402 is applied, the cinch string 120 can translate within the upper perimeter region of the inner containment bag 124 such that the mouth region of the inner containment bag 124 constricts and closes. Because the cinch string 120 can be accessible from outside the outer containment bag 122, the cinching action can be performed while maintaining the outer containment bag 122 as a barrier layer between the caregiver 204 and the inner containment bag 124, thereby providing a concrete technical improvement in contamination control and disposal workflow consistency.

In an exemplary embodiment, the illustrated configuration can further improve the mechanical reliability of closure because the outer containment bag 122 can provide a controlled constraint surface against which the inner containment bag 124 can cinch. For example, as the cinch string 120 is pulled, the outer containment bag 122 can resist twisting or "rolling" of the inner containment bag 124 mouth region, which can otherwise cause uneven cinching and leakage gaps in certain prior approaches where a single bag collapses or rotates freely. Additionally, because the inflatable bedpan 100 supports the outer containment bag 122 around a ring region, the cinch string 120 can be pulled without causing the entire bag assembly to lift out of position, which can occur when a drawstring is pulled on a loosely supported liner. This cooperation between the inflatable bedpan 100, the outer containment bag 122, the inner containment bag 124, and the cinch string 120 can therefore provide a repeatable, engineered closure action rather than a user-dependent "best effort" closure.

In an exemplary embodiment, once the inner containment bag 124 is cinched closed as shown in reference 'B', the inner containment bag 124 can be removed and discarded while the outer containment bag 122 can remain positioned on the inflatable bedpan 100, depending on the use cycle and caregiver preference. The ability to remove only the inner containment bag 124 while leaving the outer containment bag 122 in place can reduce turnaround time between uses and can reduce handling steps that otherwise increase contamination risk. In this manner, FIG. 3 illustrates a physically implemented waste-management mechanism that achieves improved containment, improved closure control, and improved caregiver hygiene through specific structures and structural cooperation, which provides a tangible technological improvement over prior approaches rather than an abstract or purely administrative concept.

In an exemplary embodiment, the two-bag architecture shown in FIG. 3 can be combined with staged inflation and ring geometry of the inflatable bedpan 100 described elsewhere in this specification. For example, the support ring 104 and receptacle ring 106 can maintain a predictable basin volume that supports the bag set, and the outer containment bag 122 can be positioned over different ring regions depending on whether a ring is lifted or whether a caregiver 204 prefers a particular installation configuration, while still enabling the cinch string 120 to be actuated externally. This integrated relationship between physical structure and method steps can expand the practical operating envelope of the system and provide additional implementation flexibility for different care settings, patient mobility levels, and bedding types.

Figure 4:
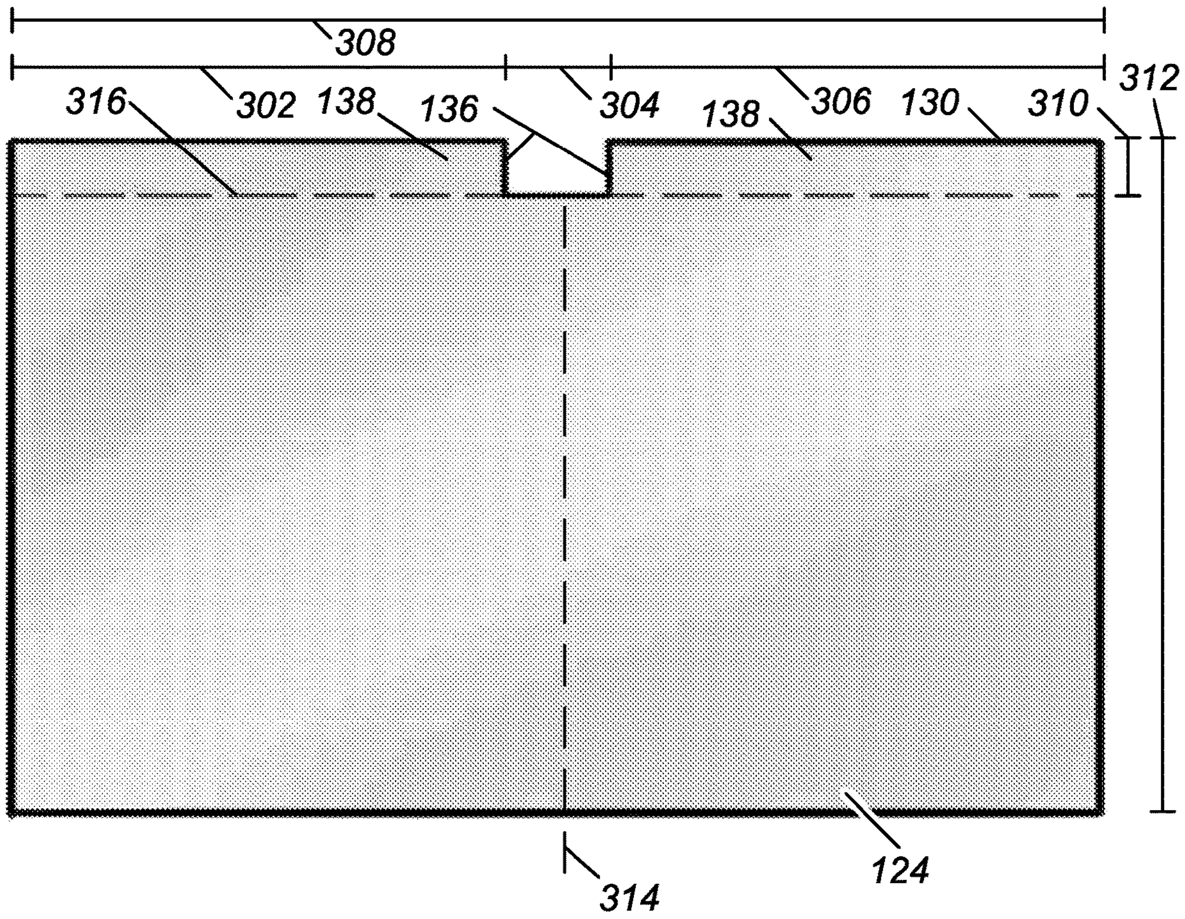
FIG. 4 illustrates one example of the inner containment bag.

Referring to FIG. 4, there is illustrated one example of the inner containment bag 124. In an exemplary embodiment, the inner containment bag 124 can be configured to be positioned within an outer containment bag and configured to receive, contain, and be sealed around waste for disposal, while enabling cinch-based closure from outside a surrounding bag layer. In an exemplary embodiment, the inner containment bag 124 can be formed as a flexible film body having a generally continuous sidewall region extending between a top region and a bottom region, with a closed lower perimeter that can support a waste load without requiring a rigid receptacle. The illustrated geometry can be intentionally symmetric about an inner containment bag vertical center reference 314, which can serve as a spatial datum for locating closure features, routing features, and hand-accessible pull points in a repeatable way across manufacturing lots and across patient care settings.

In an exemplary embodiment, the inner containment bag 124 can include a top sealable opening 130 configured to define a mouth of the inner containment bag 124 through which waste can be received during use. The top sealable opening 130 can be located immediately below a seal edge 316 that can form, define, or otherwise bound a perimeter channel 138 at an upper perimeter portion of the inner containment bag 124. The perimeter channel 138 can be implemented as a folded-over hem, a bonded sleeve, a welded tunnel, or a multi-layer laminated channel that cooperatively defines an elongate cavity extending along the upper perimeter portion. In an exemplary embodiment, a cinch string can be disposed within the perimeter channel 138 so that the cinch string can translate relative to the channel when pulled, thereby constricting the perimeter of the top sealable opening 130 to close the inner containment bag 124 in a mechanically repeatable manner rather than relying on a user to manually twist, fold, or tie a bag mouth.

In an exemplary embodiment, the perimeter channel 138 can include one or more cinch string egress openings 136 that provide controlled exit locations for portions of the cinch string. The cinch string egress openings 136 can be placed within the seal edge 316 region so that the cinch string egress openings 136 are supported by reinforced material, which can reduce tearing and can maintain consistent egress geometry during pulling. In an exemplary embodiment, locating the cinch string egress openings 136 within or adjacent to the perimeter channel 138 can also reduce frictional snagging and can constrain the directionality of the cinch string so that the cinch string constricts the top sealable opening 130 uniformly around the perimeter rather than creating asymmetric puckering that can leave leakage gaps.

In an exemplary embodiment, FIG. 4 illustrates spatial relationships that can be used to define and control the closure mechanics. A first lateral offset 302 can correspond to a width between a first vertical perimeter edge of the inner containment bag 124 and a first cinch string egress opening 136, and a second lateral offset 306 can correspond to a width between a second vertical perimeter edge of the inner containment bag 124 and a second cinch string egress opening 136. The first lateral offset 302 and the second lateral offset 306 can be selected to place the cinch string egress openings 136 sufficiently inboard from the vertical perimeter edges so that the cinch string does not cut into a corner region, and so that pulling loads are transmitted through the seal edge 316 and the perimeter channel 138 rather than concentrating at a thin edge. In some embodiments, the first lateral offset 302 and the second lateral offset 306 can each be in a broad operative range of about 25 mm to about 250 mm, in a more preferred range of about 60 mm to about 180 mm, and in an exemplary embodiment of about 150 mm, although other values can be used based on desired pull feel, bag size class, and manufacturing method.

In an exemplary embodiment, a spacing distance 304 can define a distance between adjacent cinch string egress openings 136. The spacing distance 304 can be selected so that one or more graspable portions of the cinch string 120 can be presented at a predictable location relative to the inner containment bag vertical center reference 314, which can facilitate a repeatable hand-off to an outer containment bag cinch-hole pattern when the inner containment bag 124 is nested inside the outer containment bag 122. In some embodiments, the spacing distance 304 can be in a broad operative range of about 15 mm to about 120 mm, in a more preferred range of about 25 mm to about 80 mm, and in an exemplary embodiment of about 50 mm. This spacing can be advantageous because it can allow a user 202 or caregiver 204 to access and pull the graspable portions without inserting a hand through the top sealable opening 130, and can reduce the likelihood that a graspable portion drops into a waste-receiving region during use.

In an exemplary embodiment, the perimeter channel 138 can have a vertical size 310 corresponding to an effective channel height measured from an upper boundary of the channel to a lower boundary of the channel. The vertical size 310 can be selected to provide a sufficient cross-sectional passage for the cinch string to translate with reduced friction and reduced binding, while also providing sufficient material thickness for reinforcement and seam integrity. In some embodiments, the vertical size 310 can be in a broad operative range of about 10 mm to about 60 mm, in a more preferred range of about 15 mm to about 40 mm, and in an exemplary embodiment of about 25 mm. Providing a channel height in these ranges can be technically significant because it can enable smoother cinch-closure under gloved pulling, can reduce "jerk" closure that may splash contents in some prior approaches, and can reduce tearing at the cinch string egress openings 136 by distributing stress across a larger reinforced band.

In an exemplary embodiment, the inner containment bag 124 can define an overall lateral size 308, which can be characterized as an inner bag effective diameter at the upper opening region, even when the bag is not perfectly circular in the flat pattern. The inner bag effective diameter 308 can be selected so that the inner containment bag 124 can drape and expand within an outer containment bag and within a receptacle region of an inflatable bedpan without excessive slack that would create folds and voids, and without excessive tension that would resist installation. In some embodiments, the inner bag effective diameter 308 can be in a broad operative range of about 450 mm to about 900 mm, in a more preferred range of about 550 mm to about 800 mm, and in an exemplary embodiment of about 700 mm. In an exemplary embodiment, the inner containment bag 124 can further define an overall height 312 measured from the seal edge 316 region to a bottom region of the inner containment bag 124. The overall height 312 can be selected to provide sufficient volume for waste containment while maintaining a bottom region that remains supported by a receptacle surface and avoids contacting bedding. In some embodiments, the overall height 312 can be in a broad operative range of about 300 mm to about 800 mm, in a more preferred range of about 400 mm to about 650 mm, and in an exemplary embodiment of about 525 mm.

In an exemplary embodiment, the combination of the perimeter channel 138, the cinch string egress openings 136, the controlled spacing 304, and the symmetry about the inner containment bag vertical center reference 314 can provide a practical technical effect that distinguishes from certain prior approaches in which drawstrings are simply stitched into a bag mouth without defined egress geometry, without controlled pull-point placement, and without a predictable coupling to an exterior access region. Here, the inner containment bag 124 can be configured so that the cinch-closure can be actuated from outside a surrounding bag layer by routing cinch string portions through an outer bag cinch-hole pattern, which can reduce contamination risk, can reduce handling steps, and can provide a repeatable, engineered closure action that is rooted in physical structure and physical interaction rather than an abstract instruction. In this manner, the inner containment bag 124 can serve as a concrete component of an integrated waste-management system that improves bedside toileting reliability and caregiver hygiene through specific spatially defined features and cooperative mechanical operation.

Figure 5:
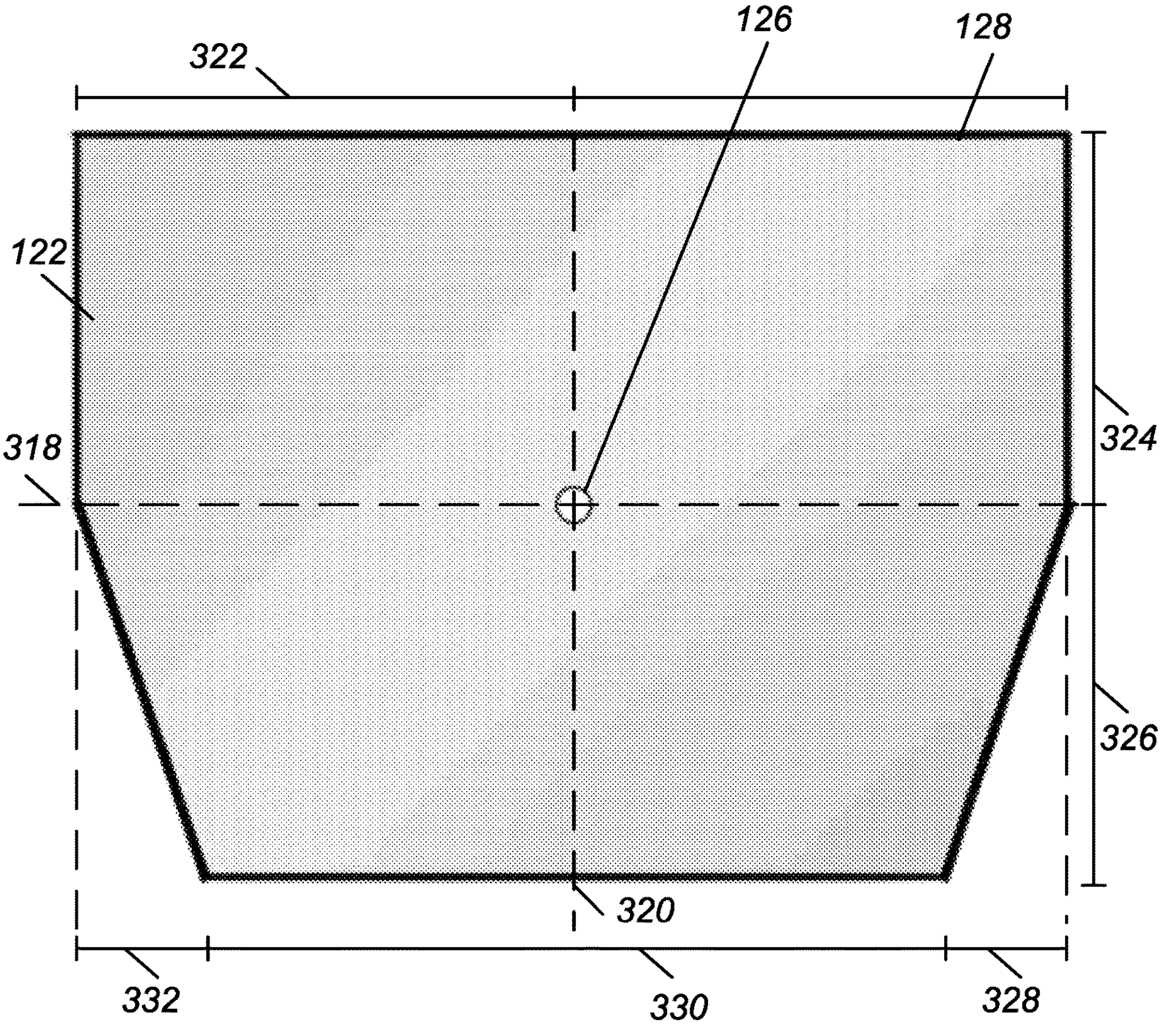
FIG. 5 illustrates one example of the outer containment bag.

Referring to FIG. 5, there is illustrated one example of the outer containment bag 122. In an exemplary embodiment, the outer containment bag 122 can be configured to be used as a protective, intermediate barrier layer between an inflatable bedpan and an inner containment bag, while also providing a controlled external-access interface that enables a cinch string to be pulled from outside the outer containment bag 122 to cinch closed the inner containment bag. In an exemplary embodiment, the outer containment bag 122 can be formed from a flexible sheet material, such as a polymer film or laminate, and can be manufactured as a sealed bag body having a top non-sealable opening 128 configured to remain open during installation and use so that the inner containment bag can be inserted and so that waste can be received through the opening region of the system.

In an exemplary embodiment, the outer containment bag 122 can include one or more cinch holes 126 formed through the outer containment bag 122. The cinch holes 126 can be positioned to cooperate with cinch string portions emerging from an inner containment bag 124 so that, when the inner containment bag 124 is nested inside the outer containment bag 122, portions of the cinch string 120 can be passed through the cinch holes 126 and thereby presented as pullable, graspable portions accessible from outside the outer containment bag 122. This spatial hand-off arrangement can be technically significant because it can enable cinch-closure of the inner containment bag 124 without requiring a user 202 or caregiver 204 to reach into a waste-receiving opening, which can reduce contamination risk and improve closure repeatability compared to prior approaches that rely on grabbing a drawstring from within a bag mouth or from a loosely supported liner edge.

In an exemplary embodiment, FIG. 5 further illustrates a spatial coordinate framework for the outer containment bag 122 that can support repeatable installation and repeatable alignment with the inner containment bag and with an inflatable bedpan. A horizontal center line reference 318 and a vertical center line reference 320 can define a geometric center reference of the outer containment bag 122 in a flattened state. The cinch hole 126 can be positioned proximate an intersection region between the horizontal center line reference 318 and the vertical center line reference 320 so that the cinch hole 126 serves as a consistent alignment feature relative to the central region of the outer containment bag 122. In some embodiments, this alignment can facilitate consistent positioning of cinch string pull points relative to the bedpan geometry, such as relative to a receptacle ring and bottom receptacle surface described elsewhere in this specification, thereby improving the likelihood that cinching forces are applied symmetrically and that the inner containment bag closes in a uniform manner.

In an exemplary embodiment, the outer containment bag 122 can define a top effective diameter 322 at or proximate the top non-sealable opening 128. The top effective diameter 322 can be selected to accommodate a target seat ring and support ring geometry while providing sufficient perimeter slack to allow draping of the outer containment bag 122 without overstretching. In some embodiments, the top effective diameter 322 can be in a broad operative range of about 450 mm to about 900 mm, in a more preferred range of about 550 mm to about 800 mm, and in an exemplary embodiment of about 700 mm. In an exemplary embodiment, the top non-sealable opening 128 can define an effective circumference corresponding to the top effective diameter 322, such that the opening 128 can be sized to be positioned over a seat ring and/or a support ring while maintaining a continuous opening perimeter that can resist tearing during installation and during cinch-string pulling operations.

In an exemplary embodiment, the outer containment bag 122 can include a top-half height 324 and a bottom-half height 326 defined relative to the horizontal center line reference 318. The top-half height 324 can correspond to a vertical distance from the horizontal center line reference 318 to the top non-sealable opening 128, and the bottom-half height 326 can correspond to a vertical distance from the horizontal center line reference 318 to the bottom of the outer containment bag 122. In some embodiments, the top-half height 324 can be in a broad operative range of about 150 mm to about 400 mm, in a more preferred range of about 200 mm to about 320 mm, and in an exemplary embodiment of about 262.5 mm. In some embodiments, the bottom-half height 326 can be in a broad operative range of about 150 mm to about 400 mm, in a more preferred range of about 200 mm to about 320 mm, and in an exemplary embodiment of about 262.5 mm. In an exemplary embodiment, a total vertical height of the outer containment bag 122 can be the sum of the top-half height 324 and the bottom-half height 326, which can be in a broad operative range of about 300 mm to about 750 mm, in a more preferred range of about 400 mm to about 650 mm, and in an exemplary embodiment of about 525 mm. These spatial proportions can be selected to provide sufficient depth for the outer containment bag 122 to hang into a receptacle region of an inflatable bedpan while maintaining an upper perimeter portion that can remain supported by a ring structure during use.

In an exemplary embodiment, the outer containment bag 122 can further include a tapered bottom geometry configured to bias the inner containment bag and its contents toward a central region of a bedpan receptacle surface. As illustrated, a first inset distance 328 and a second inset distance 332 can be defined at a bottom region of the outer containment bag 122, where the first inset distance 328 can represent an inward taper on a first lateral side and the second inset distance 332 can represent an inward taper on a second lateral side. In some embodiments, each of the first inset distance 328 and the second inset distance 332 can be in a broad operative range of about 20 mm to about 150 mm, in a more preferred range of about 50 mm to about 120 mm, and in an exemplary embodiment of about 87.5 mm. In an exemplary embodiment, the tapered geometry can define a bottom effective diameter 330 that is less than the top effective diameter 322. In some embodiments, the bottom effective diameter 330 can be in a broad operative range of about 350 mm to about 700 mm, in a more preferred range of about 420 mm to about 600 mm, and in an exemplary embodiment of about 525 mm.

In an exemplary embodiment, the taper defined by the first inset distance 328 and the second inset distance 332 can provide a controlled centering effect during use. For example, as waste accumulates within an inner containment bag positioned inside the outer containment bag 122, the tapered bottom geometry can reduce lateral migration of the loaded inner containment bag toward side walls of the inflatable bedpan, thereby reducing smear pathways and reducing the likelihood that a waste-containing region of the inner containment bag contacts a side wall region where folds and leaks are more likely to occur in certain prior approaches. In some embodiments, the taper can also improve the cinch-closure operation by biasing the inner containment bag into a centered, gravity-stabilized position prior to closure, which can reduce twisting of the mouth region and can improve uniform constriction when the cinch string is pulled from outside the outer containment bag 122 through the cinch holes 126.

Accordingly, FIG. 5 illustrates an engineered outer containment bag 122 whose geometric reference framework 318 and 320, opening sizing 128 and 322, height proportions 324 and 326, cinch hole positioning 126, and bottom taper features 328, 330, and 332 can cooperate to support repeatable installation, controlled cinch-string accessibility, improved containment cleanliness, and improved disposal workflow reliability. These features can provide practical, concrete improvements over prior approaches that rely on non-tapered, single-layer liners or uncontrolled drawstring access, and they can do so through specific physical structures and spatial relationships that improve real-world bedside toileting performance rather than through an abstract instruction or a purely administrative process.

Figure 6:
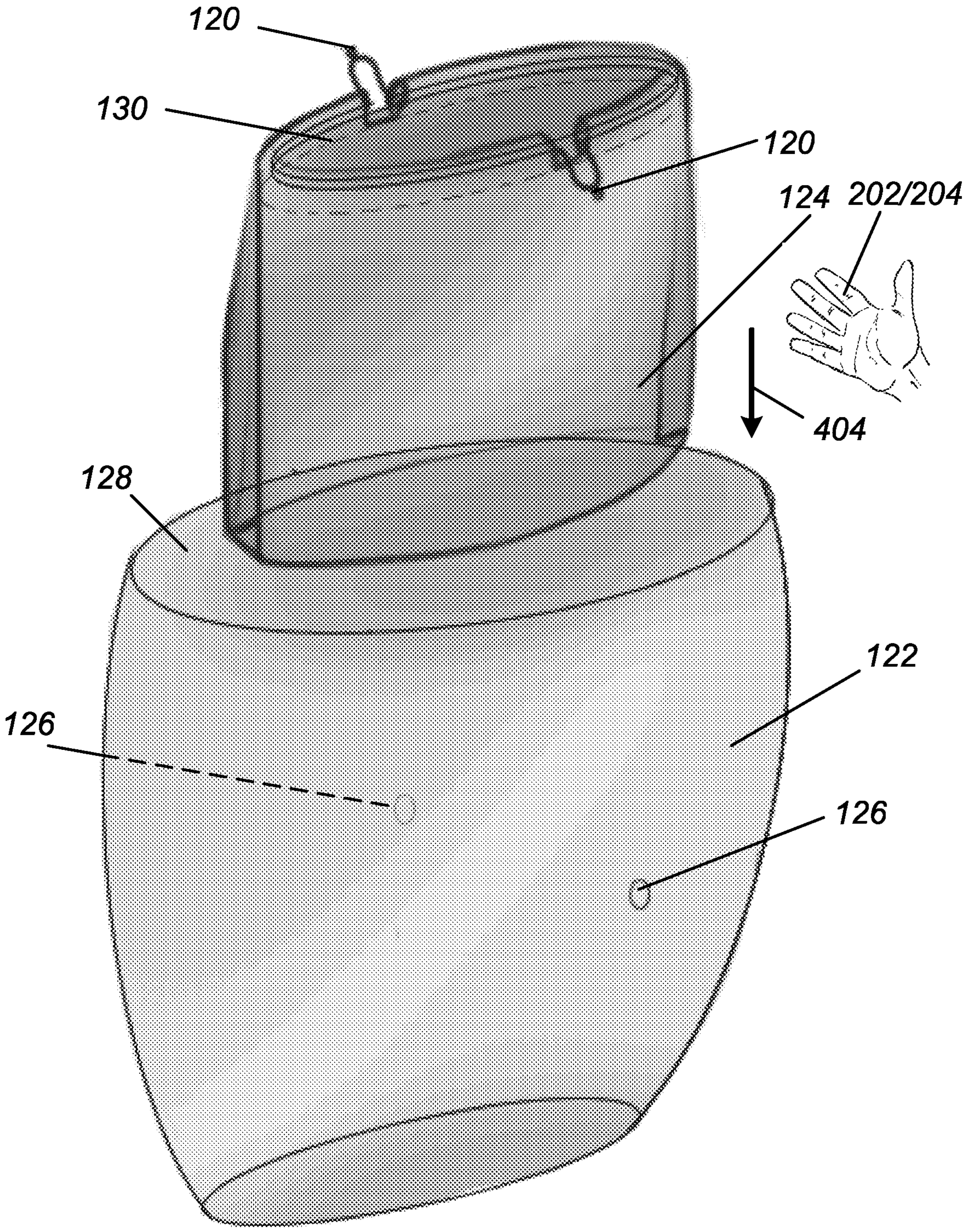
FIG. 6 illustrates one example of a user or caregiver inserting the inner containment bag into the outer containment bag in preparation for use of the inflatable bedpan 100.

Referring to FIG. 6, there is illustrated one example of a user 202 or a caregiver 204 inserting the inner containment bag 124 into the outer containment bag 122 in preparation for use of the inflatable bedpan 100. In an exemplary embodiment, an operational "nesting and hand-off" configuration in which the inner containment bag 124 can be introduced into the outer containment bag 122 in a controlled spatial orientation that enables subsequent cinch-closure of the inner containment bag 124 from outside the outer containment bag 122. In an exemplary embodiment, the outer containment bag 122 can be presented in an open state with a top non-sealable opening 128 defining an upper mouth region of the outer containment bag 122. The top non-sealable opening 128 can be sized and shaped to allow insertion of the inner containment bag 124 without folding or bunching that would otherwise disrupt the intended cinch-string routing and pull-point placement. In an exemplary embodiment, the outer containment bag 122 can include one or more cinch holes 126 formed through a wall region of the outer containment bag 122 proximate the top non-sealable opening 128, such as in an upper half of the outer containment bag 122, so that the cinch holes 126 are positioned to be reachable from outside the outer containment bag 122 during setup and during closure.

In an exemplary embodiment, the inner containment bag 124 can be positioned above the top non-sealable opening 128 and advanced downward in an insertion direction 404 into an interior volume of the outer containment bag 122. The insertion direction 404 can be selected so that a lower region of the inner containment bag 124 can drape into the lower region of the outer containment bag 122, while an upper portion of the inner containment bag 124 remains accessible for receiving waste during use. In the illustrated embodiment, the inner containment bag 124 can include a top sealable opening 130 configured to define a mouth of the inner containment bag 124 through which waste can be received prior to closure. The top sealable opening 130 can remain open during the insertion process so the inner containment bag 124 can conform to the interior shape of the outer containment bag 122 rather than trapping air or forming a collapsed pocket that interferes with installation.

In an exemplary embodiment, the inner containment bag 124 can include one or more cinch strings 120 arranged at an upper perimeter region of the inner containment bag 124, such as by being received within a perimeter channel of the inner containment bag 124 described elsewhere in this specification. FIG. 6 illustrates that portions of the cinch strings 120 can protrude upward and outward relative to the top sealable opening 130 during insertion, which can be advantageous because the cinch strings 120 can remain visually and tactilely identifiable by the user 202 or the caregiver 204 during setup. In an exemplary embodiment, maintaining the cinch strings 120 in an accessible position during insertion can reduce the likelihood that the cinch strings 120 are inadvertently captured beneath folds of the inner containment bag 124 or trapped between the inner containment bag 124 and the outer containment bag 122, conditions that can cause binding or uneven cinch-closure in certain prior approaches where a drawstring is not spatially constrained or where a liner is installed without an alignment procedure.

In an exemplary embodiment, as the inner containment bag 124 is lowered into the outer containment bag 122, portions of the cinch string 120 proximate the upper perimeter region of the inner containment bag 124 can be spatially aligned with the one or more cinch holes 126 of the outer containment bag 122. Stated differently, FIG. 6 depicts a physical hand-off relationship in which the cinch string 120, which originates on the inner containment bag 124, can be routed outward through the cinch holes 126 of the outer containment bag 122 such that one or more graspable portions of the cinch string 120 can be positioned on an exterior side of the outer containment bag 122. In an exemplary embodiment, the cinch holes 126 can be positioned at a height proximate the top non-sealable opening 128 so that when the inner containment bag 124 is fully inserted, the cinch string 120 can be pulled laterally outward through the cinch holes 126 without requiring the user 202 or the caregiver 204 to insert a hand into the top sealable opening 130 or into an interior waste-receiving region. This can provide a concrete cleanliness and usability advantage relative to certain prior approaches in which a caregiver must grasp a drawstring from within a liner mouth or near a soiled rim, increasing contamination risk and increasing variability in closure success.

In an exemplary embodiment, the insertion step shown in FIG. 6 can be performed before the outer containment bag 122 is installed on the inflatable bedpan 100, or after the outer containment bag 122 is installed on the inflatable bedpan 100, depending on caregiver preference and patient mobility. For example, in some use conditions, the outer containment bag 122 can be first positioned over a ring region of the inflatable bedpan 100 and supported by that ring geometry, after which the inner containment bag 124 can be inserted as shown in the insertion direction 404. In other use conditions, the inner containment bag 124 can be pre-nested within the outer containment bag 122 and then the combined bag set can be installed on the inflatable bedpan 100 as a unit. In an exemplary embodiment, the configuration of FIG. 6 can be particularly advantageous in either workflow because it establishes, prior to use, a predictable relationship between the cinch strings 120 and the cinch holes 126 so that closure can be executed by pulling from outside the outer containment bag 122 in a repeatable manner, thereby supporting a practical technological improvement in bedside waste containment and disposal rather than a purely conceptual or administrative process.

In an exemplary embodiment, the cooperative spatial arrangement among the top non-sealable opening 128 of the outer containment bag 122, the cinch holes 126 of the outer containment bag 122, the top sealable opening 130 of the inner containment bag 124, the cinch strings 120 of the inner containment bag 124, and the insertion direction 404 can enable a controlled external-access closure workflow. This engineered relationship can reduce setup errors, can reduce cinch-string binding, can reduce caregiver exposure during closure, and can increase the likelihood that the inner containment bag 124 closes uniformly when the cinch strings 120 are pulled from outside the outer containment bag 122, thereby improving containment reliability compared to prior approaches that rely on single-layer liners or uncontrolled drawstring access.

Figure 7:
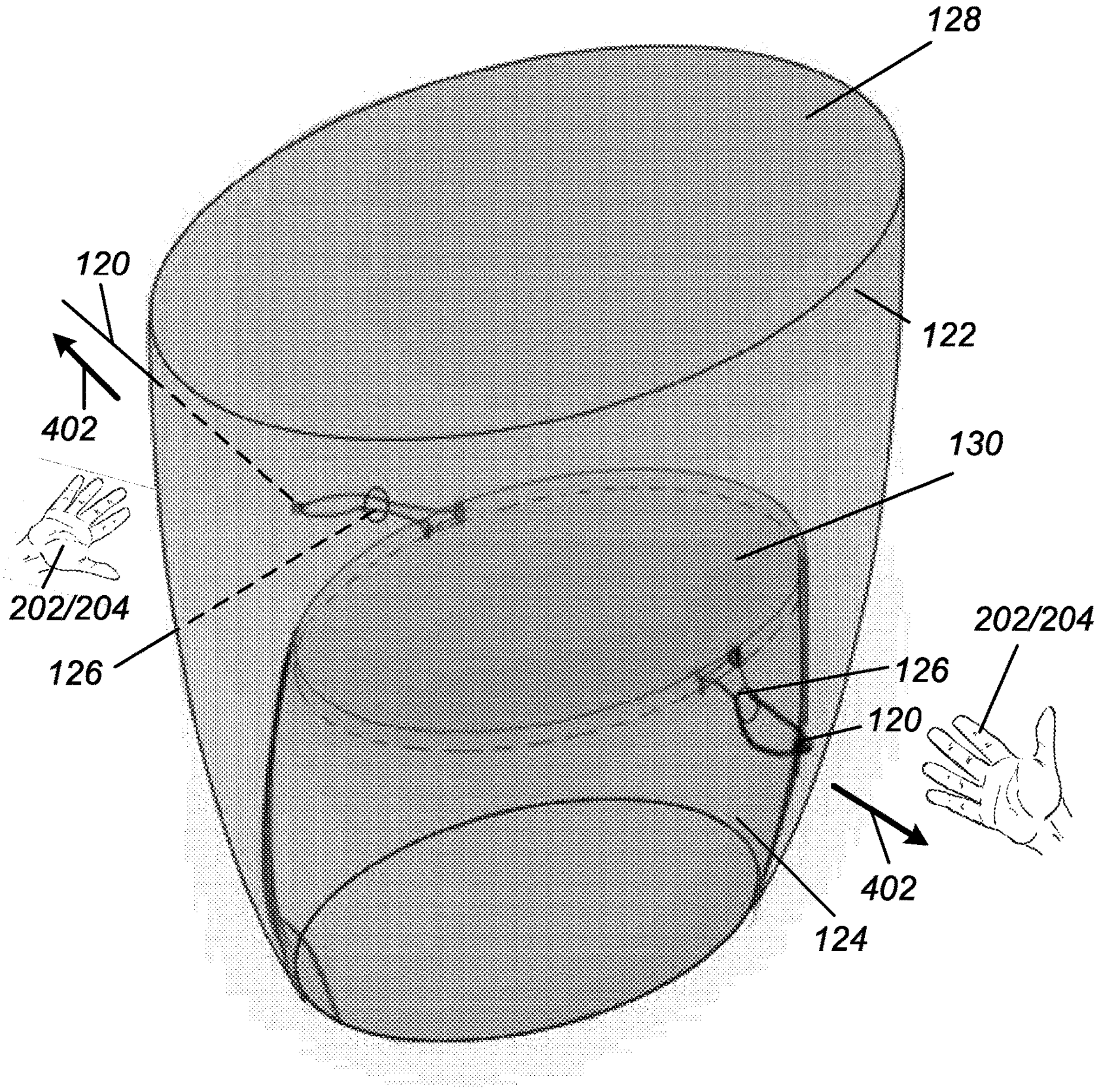
FIG. 7 illustrates one example of the inner containment bag after insertion into the outer containment bag in preparation for use of the inflatable bedpan 100.

Referring to FIG. 7, there is illustrated one example of the inner containment bag 124, after insertion into the outer containment bag 122 in preparation for use of the inflatable bedpan 100. In an exemplary embodiment, FIG. 7 illustrates a prepared, nested bag configuration in which the inner containment bag 124 can be positioned within the outer containment bag 122 prior to installation on the inflatable bedpan 100, and in which the cinch strings 120 of the inner containment bag 124 can be presented for exterior-access pulling through the cinch holes 126 of the outer containment bag 122. In an exemplary embodiment, the outer containment bag 122 can define a top non-sealable opening 128 that remains open during use to allow the inner containment bag 124 to receive waste through a corresponding opening region of the inflatable bedpan 100. The inner containment bag 124 can define a top sealable opening 130 that can be maintained in an open state during use and subsequently constricted for closure. The nested configuration shown in FIG. 7 can be established such that the inner containment bag 124 drapes into the interior volume of the outer containment bag 122 in a controlled way, thereby reducing folds, bunching, and uncontrolled twisting that can occur in certain prior approaches that rely on a single loose liner.

In an exemplary embodiment, the cinch string 120 can traverse within a perimeter channel of the inner containment bag 124 and can exit the perimeter channel through one or more cinch string egress openings of the inner containment bag 124, thereby providing controlled exit locations for the cinch string 120. Portions of the cinch string 120 proximate the cinch string egress openings 136 can then be fed through the cinch holes 126 of the outer containment bag 122 so that one or more graspable portions of the cinch string 120 are positioned on an exterior side of the outer containment bag 122. FIG. 7 illustrates that the graspable portions of the cinch string 120 can be presented on opposing lateral sides of the nested bag assembly, which can be technically significant because it can allow a user 202 or a caregiver 204 to grasp and apply pulling force in opposing directions to achieve a more symmetric cinch-closure. By providing graspable portions on opposing sides, the cinch string 120 can apply a more uniform circumferential constriction to the top sealable opening 130, reducing the likelihood of uneven puckering that can leave a leakage gap. This exterior-access routing can also reduce contamination risk compared to prior approaches in which a drawstring must be grasped from within or near a waste-receiving opening.

In an exemplary embodiment, after the nested bag assembly of FIG. 7 is prepared, the outer containment bag 122 can be installed onto the inflatable bedpan 100 by wrapping an upper perimeter portion of the outer containment bag 122 over a ring region of the inflatable bedpan 100. The ring region can include a seat ring 102 and a support ring 104, and the outer containment bag 122 can be positioned over the seat ring 102 and/or over the support ring 104, depending on a selected installation mode. For example, in one installed configuration, the outer containment bag 122 can be wrapped over the seat ring 102 so that the seat ring 102 compressively retains the upper perimeter portion of the outer containment bag 122 and supports the top non-sealable opening 128 in a stable, accessible position. In another installed configuration, the outer containment bag 122 can be wrapped over the support ring 104, such as when the seat ring 102 is lifted relative to the support ring 104 during installation, which can allow the outer containment bag 122 to be seated lower and then retained when the seat ring 102 is returned to a closed position. This installation flexibility can be advantageous because it allows the bag assembly to be reliably secured despite variations in caregiver workflow, patient mobility, and bedding thickness, and it can reduce slipping or misalignment compared to prior approaches that rely on stretching a liner over a rim without a controlled retention geometry.

In an exemplary embodiment, the nested configuration shown in FIG. 7 can support a closure workflow in which, after use, the user 202 or the caregiver 204 can cinch closed the inner containment bag 124 by pulling 402 the cinch string 120 from outside the outer containment bag 122. The pulling 402 can be performed by applying opposing-direction pulls to opposing graspable portions of the cinch string 120 on opposing sides of the outer containment bag 122. In this manner, closure forces can be applied externally, and the user 202 or the caregiver 204 can avoid inserting a hand through the top sealable opening 130 or into a waste-receiving region, thereby reducing contamination risk and improving closure consistency compared to prior approaches where a drawstring is accessed from inside a liner mouth. In an exemplary embodiment, because the cinch string 120 can be guided by the perimeter channel of the inner containment bag 124 and the egress opening locations can be controlled, the pulling 402 action can translate the cinch string 120 with reduced binding and can constrict the top sealable opening 130 in a predictable manner.

In an exemplary embodiment, after the inner containment bag 124 is cinched closed, the cinched inner containment bag 124 can be removed from the nested assembly for disposal while the outer containment bag 122 remains installed on the inflatable bedpan 100. The ability to remove the inner containment bag 124 without disturbing or removing the outer containment bag 122 can be technically advantageous because the outer containment bag 122 can continue to serve as a protective barrier layer for the inflatable bedpan 100, reducing the need to wipe or clean the inflatable bedpan 100 between uses and reducing caregiver handling steps. Additionally, the outer containment bag 122 can maintain its installed position on the seat ring 102 and/or the support ring 104, preserving alignment of the cinch holes 126 for a subsequent inner containment bag insertion if multiple use cycles occur in a care session. This combination of structural nesting, controlled string routing, and selective removal can provide a tangible, physical improvement in bedside toileting cleanliness and workflow reliability compared to prior approaches that require full liner removal or that expose the bedpan surfaces during disposal, and it can do so through specific physical components and their cooperative interaction rather than through an abstract concept.

In an exemplary embodiment, user 202 can use an inflatable bedpan waste-management system configured to be installed on an inflatable bedpan 100 that supports the user 202 during toileting, wherein the inflatable bedpan waste-management system can be configured to permit cinch-closure of an inner containment bag 124 from an inter-ring access region of the inflatable bedpan 100 located between a seat ring 102 and a support ring 104 at an outer perimeter of the inflatable bedpan 100. In an exemplary embodiment, an outer containment bag 122 can include an upper perimeter portion sized and shaped to be positioned over the seat ring 102 or over the support ring 104 of the inflatable bedpan 100 so that the outer containment bag 122 can form a protective barrier layer between the inflatable bedpan 100 and waste contents captured in the inner containment bag 124. In an exemplary embodiment, the outer containment bag 122 can further include a plurality of cinch holes 126 formed through the outer containment bag 122 at one or more intermediate locations between the upper perimeter portion and a bottom of the outer containment bag 122, and the cinch holes 126 can be positioned to be accessible from outside the outer containment bag 122 while the outer containment bag 122 is installed on the inflatable bedpan 100. In some embodiments, the cinch holes 126 can be centrally located at an intersection of a horizontal center line reference 318 and a vertical center line reference 320, thereby defining a repeatable spatial datum for aligning cinch access relative to the installed orientation of the outer containment bag 122. In some embodiments, the outer containment bag 122 can define a top non-sealable opening 128 that remains open during use to permit insertion of the inner containment bag 124 and to permit waste reception through a waste-receiving opening of the inflatable bedpan 100. In an exemplary embodiment, the inner containment bag 124 can be inserted through the top non-sealable opening 128 and positioned within the outer containment bag 122 so that the inner containment bag 124 can receive human waste while being supported by the bedpan geometry, including by a receptacle ring 106 and a bottom receptacle surface 132 in embodiments where such features are present, thereby reducing uncontrolled sagging and improving containment consistency relative to prior approaches that rely on handling and cleaning a waste-filled pan.

In operation, in an exemplary embodiment, the inflatable bedpan waste-management system can include a cinch string 120 configured to be threaded through the cinch holes 126 of the outer containment bag 122 to present one or more graspable portions of the cinch string 120 on an exterior side of the outer containment bag 122 when the inner containment bag 124 is positioned within the outer containment bag 122. In an exemplary embodiment, the inflatable bedpan waste-management system can be specially adapted such that, when the outer containment bag 122 is installed on the inflatable bedpan 100 and the inner containment bag 124 is positioned within the outer containment bag 122, the one or more graspable portions are presented adjacent to the inter-ring access region between the seat ring 102 and the support ring 104 at the outer perimeter of the inflatable bedpan 100 and are accessible from the inter-ring access region, wherein the inter-ring access region is outwardly facing and accessible from outside the inflatable bedpan 100. In an exemplary embodiment, the inter-ring access region can be formed at a spatial gap or interface region between the seat ring 102 and the support ring 104 that remains reachable from outside a waste-receiving opening, such that a pulling action applied to the cinch string 120 can be performed without inserting a hand into the waste-receiving opening. In some embodiments, a vertical separation defining the inter-ring access region can be in a broad range of about 5 mm to about 60 mm, in a more preferred range of about 10 mm to about 40 mm, and in an exemplary embodiment of about 20 mm, such that the graspable portions can be accessed by the user 202 or a caregiver 204 even when gloved. In an exemplary embodiment, after the inner containment bag 124 is nested within the outer containment bag 122, portions of the cinch string 120 can be routed outward so that opposing graspable portions can be presented at opposing sides of the outer containment bag 122, enabling an opposing-direction pull that can produce a more symmetric cinch-closure.

In an exemplary embodiment, the outer containment bag 122 can further comprise one or more cinch string egress openings configured to guide the one or more graspable portions of the cinch string 120 to the inter-ring access region. In an exemplary embodiment, such cinch string egress openings can be formed through a wall region of the outer containment bag 122, such as at a location proximate an intended access zone for the inter-ring access region, so that the cinch string 120 can transition from an interior region proximate the inner containment bag 124 to an exterior region where the cinch string 120 can be grasped. In other embodiments, and in a complementary configuration, the cinch string egress openings can be provided as cinch string egress openings 136 associated with the inner containment bag 124, such as in or adjacent to a seal edge 316 and a perimeter channel 138, and the cinch string 120 can emerge from the inner containment bag 124 at those cinch string egress openings 136, after which portions proximate the cinch string egress openings 136 can be passed through the cinch holes 126 of the outer containment bag 122 to provide the externally accessible graspable portions. In an exemplary embodiment, providing controlled egress locations can reduce cinch-string misrouting, reduce twisting of a bag mouth during closure, and increase repeatability of sealing compared to prior approaches, where waste remains in a rigid pan that must be carried and cleaned.

In an exemplary embodiment, the inner containment bag 124 can comprise a perimeter channel 138 extending along an upper perimeter portion of the inner containment bag 124 and one or more cinch string egress openings 136 in communication with the perimeter channel 138. In an exemplary embodiment, the cinch string 120 can traverse within the perimeter channel 138 and can exit the perimeter channel 138 through the one or more cinch string egress openings 136, thereby providing controlled exit locations for the cinch string 120. In an exemplary embodiment, portions of the cinch string 120 proximate the one or more cinch string egress openings 136 can be configured to be fed through the plurality of cinch holes 126 of the outer containment bag 122 to present the one or more graspable portions on the exterior side of the outer containment bag 122. In some embodiments, a vertical size 310 of the perimeter channel 138 can be in a broad range of about 10 mm to about 60 mm, in a more preferred range of about 15 mm to about 40 mm, and in an exemplary embodiment of about 25 mm, thereby providing sufficient passage to reduce binding during pulling while maintaining a reinforced band that resists tearing at egress regions.

In an exemplary embodiment, the inner containment bag 124 can optionally comprise an absorbent element configured to reduce free-liquid movement within the inner containment bag 124. In an exemplary embodiment, the absorbent element can be integrated into a bottom region of the inner containment bag 124, adhered to an interior wall region, or encapsulated between film layers, and can comprise a superabsorbent polymer, absorbent pulp, a hydrophilic sponge, a nonwoven absorbent pad, or another absorbent structure that can immobilize liquid and reduce splashing during closure and handling. In some embodiments, the absorbent element can be sized so that an absorbent mass is in a broad range of about 1 g to about 50 g, in a more preferred range of about 3 g to about 25 g, and in an exemplary embodiment of about 10 g, and can be selected to gel or retain liquid without substantially increasing bulk at the mouth region where cinching occurs. In an exemplary embodiment, reducing free-liquid movement can improve handling cleanliness when the cinch string 120 is pulled and when the cinched inner containment bag 124 is removed for disposal, thereby reducing reliance on transporting and cleaning a waste-filled rigid pan.

In an exemplary embodiment, user 202 or caregiver 204 can perform a method of using the inflatable bedpan waste-management system by positioning the outer containment bag 122 over the seat ring 102 or the support ring 104 of the inflatable bedpan 100, positioning the inner containment bag 124 within the outer containment bag 122, and threading the cinch string 120 through the plurality of cinch holes 126 to present one or more graspable portions of the cinch string 120 on an exterior side of the outer containment bag 122. In an exemplary embodiment, the method can further include positioning the outer containment bag 122 on the inflatable bedpan 100 such that the one or more graspable portions are accessible from the inter-ring access region, and pulling the cinch string 120 from the inter-ring access region to cinch closed the inner containment bag 124 for disposal. In an exemplary embodiment, the method steps can be performed in a manner that maintains the inter-ring access region as an outwardly facing exterior access zone, thereby allowing closure to be performed without inserting a hand into a waste-receiving opening and reducing contamination risk compared to prior approaches where waste remains in a rigid pan that must be carried and cleaned.

In an exemplary embodiment, the plurality of cinch holes 126 can comprise reinforced cinch holes, each reinforced cinch hole having a reinforcement region surrounding the cinch hole 126. In an exemplary embodiment, the reinforcement region can be formed as a localized film thickening, a bonded reinforcement patch, a heat-welded reinforcement band, a laminated layer, or a grommet-like structure that increases tear resistance when the cinch string 120 is pulled. In some embodiments, a reinforcement region can extend radially outward from a cinch hole 126 by a distance in a broad range of about 2 mm to about 30 mm, in a more preferred range of about 4 mm to about 20 mm, and in an exemplary embodiment of about 10 mm, thereby distributing pulling loads into the surrounding bag wall. In an exemplary embodiment, reinforcing the cinch holes 126 can reduce deformation or tearing of the outer containment bag 122 during cinch-closure, can preserve repeatable presentation of graspable portions at the inter-ring access region, and can maintain usability across a range of caregiver pulling forces and glove conditions, thereby improving real-world reliability and hygiene compared to prior approaches that depend on transporting and cleaning waste-filled pans.

An advantage of the present invention over prior approaches is that cinch-closure of the inner containment bag 124 can be performed while the user 202 remains positioned on the inflatable bedpan 100, rather than requiring the user 202 to dismount or be repositioned before closure. In an exemplary embodiment, after the user 202 deposits human waste into the inner containment bag 124 through the waste-receiving opening, the user 202 and/or the caregiver 204 can grasp one or more graspable portions of the cinch string 120 presented on an exterior side of the outer containment bag 122 and accessible from the inter-ring access region between the seat ring 102 and the support ring 104 at the outer perimeter of the inflatable bedpan 100, and can apply a pulling action 402, including opposing-direction pulls, to cinch closed the top sealable opening 130. In this manner, closure can be achieved externally without inserting a hand through the waste-receiving opening, and without disturbing the installed position of the outer containment bag 122. This can reduce odor by enabling prompt closure of the inner containment bag 124 after use, and can reduce the likelihood of spillage or smearing that can occur during lifting, tilting, or shifting of a waste-containing receptacle when attempting to reposition a user during closure. In an exemplary embodiment, because the cinch string 120 can traverse within the perimeter channel 138 and exit through cinch string egress openings 136 at controlled locations, the pulling action 402 can produce a predictable constriction of the opening region, improving closure consistency and reducing caregiver handling steps.

Figure 8:
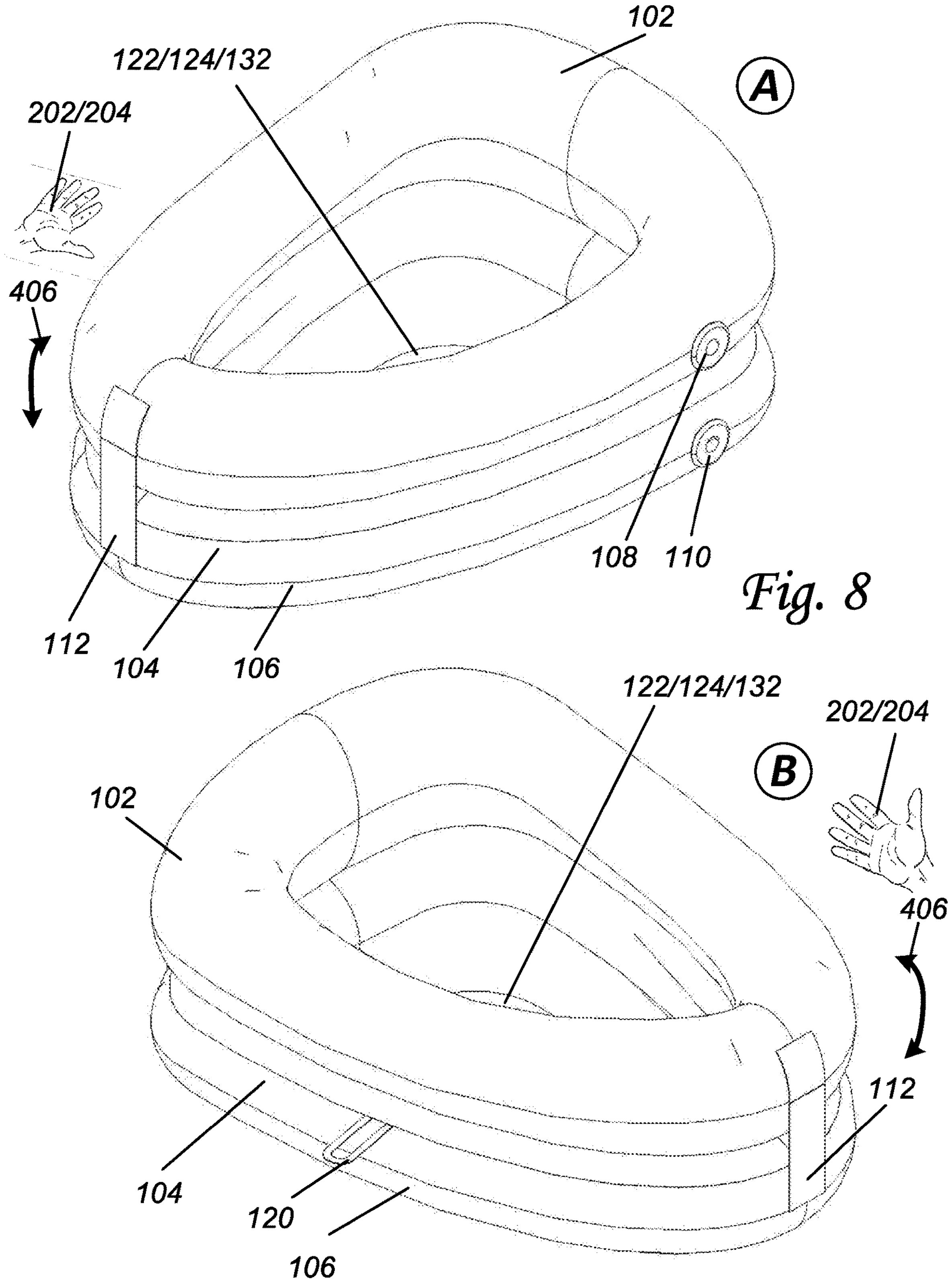
FIG. 8 illustrates one example of, in reference 'A', a top-front-right perspective view of the inflatable bedpan, and in reference 'B', a top-front-left perspective view of the inflatable bedpan.

Referring to FIG. 8, there is illustrated one example of, in reference ‘A’, a top-front-right perspective view of the inflatable bedpan 100, and in reference ‘B’, a top-front-left perspective view of the inflatable bedpan 100. In an exemplary embodiment, FIG. 8 illustrates the inflatable bedpan 100 in a representative “ready for use” configuration that can emphasize how the structural rings of the inflatable bedpan 100 can cooperate with a nested containment arrangement to provide stable bedside support and controlled waste capture. In an exemplary embodiment, the inflatable bedpan 100 can include the seat ring 102 disposed at an upper region, the support ring 104 disposed below the seat ring 102, and the receptacle ring 106 disposed below the support ring 104. The seat ring 102 can define a waste-receiving opening, and the support ring 104 and receptacle ring 106 can cooperate to maintain a basin-like clearance volume beneath the seat ring 102 so that waste can be received without collapsing against bedding. This multi-ring architecture can provide a concrete mechanical improvement over prior approaches that rely on a single rim or rigid pan geometry, because the inflatable bedpan 100 can distribute user load across bedding while maintaining a predictable containment volume.

In an exemplary embodiment, FIG. 8 further illustrates the relationship between the inflatable bedpan 100 and a nested containment configuration, indicated by the combined reference 122/124/132. In some embodiments, the combined reference 122/124/132 can represent a state in which an outer containment bag 122 and an inner containment bag 124 are positioned within the interior volume of the inflatable bedpan 100 and supported by a bottom receptacle surface 132. In this configuration, the outer containment bag 122 can act as a protective barrier layer between the inflatable bedpan 100 and the inner containment bag 124, and the inner containment bag 124 can act as the removable waste-capture component that can be cinched closed and discarded after use. By physically supporting the nested bags on the bottom receptacle surface 132 rather than allowing the bags to sag into bedding, the illustrated configuration can reduce smearing, wicking, and leakage risk that can occur in prior approaches where a liner collapses or drapes unpredictably.

In an exemplary embodiment, the inflatable bedpan 100 can be configured for independent inflation control. As shown in reference ‘A’, the seat ring 102 can include a seat air valve 108, and the support ring 104 can include a base air valve 110. Separate valves 108 and 110 can allow the seat ring 102 to be adjusted to a comfort-oriented compliance while the support ring 104 can be adjusted to a stability-oriented firmness, thereby providing a practical tuning mechanism for different user weights, bedding thicknesses, and care settings. This independent tuning can be especially useful during staged placement, where the inflatable bedpan 100 can be semi-inflated for sliding under a user and subsequently inflated to a target operating profile.

In an exemplary embodiment, FIG. 8 illustrates a tether closure strap 112 coupled along an exterior region of the inflatable bedpan 100. The tether closure strap 112 can be configured to cooperate with a seat-lift workflow, such as by limiting relative separation between the seat ring 102 and the support ring 104 during use, and by providing a controlled retention effect after a caregiver positions a bag assembly. In the illustrated views, motion indicators 406 can indicate an operational movement associated with the tether closure strap 112 and/or a ring relationship, such as movement involved in transitioning between an installation-ready configuration and a retained configuration for use. This controlled movement and retention can provide a repeatable setup experience relative to prior approaches, where a caregiver must stretch a liner over a rim without a guided retention structure, which can lead to inconsistent liner seating and inconsistent access to closure features.

In an exemplary embodiment, FIG. 8 further illustrates cinch-string accessibility in the installed state. As shown in reference ‘B’, a cinch string 120 can be presented along an exterior region proximate the support ring 104 and the receptacle ring 106. The cinch string 120 can be part of the inner containment bag 124 and can be routed such that portions of the cinch string 120 can be accessible from outside an outer containment bag 122, enabling a user 202 or a caregiver 204 to pull the cinch string 120 from an exterior side of the bag assembly. In an exemplary embodiment, the depiction of the hand 202/204 can represent that the cinch string 120 can be reachable for gloved handling and can be pulled without requiring insertion of a hand through the waste-receiving opening of the seat ring 102. This external-access closure capability can be a concrete hygiene and workflow improvement over prior approaches where a drawstring must be retrieved from inside a liner mouth or where closure requires folding and tying near the waste-receiving opening.

In an exemplary embodiment, the configuration of FIG. 8 can therefore represent a physically implemented system state in which the inflatable bedpan 100 provides stable support via the rings 102, 104, and 106, containment support via the bottom receptacle surface 132, and practical disposal readiness via the cinch string 120 presented for external access. These features can cooperate to improve comfort, reduce caregiver handling complexity, and reduce contamination risk through a specific arrangement of components that perform real-world bedside waste management, which is a concrete technological solution and not an abstract concept.

Figure 9:
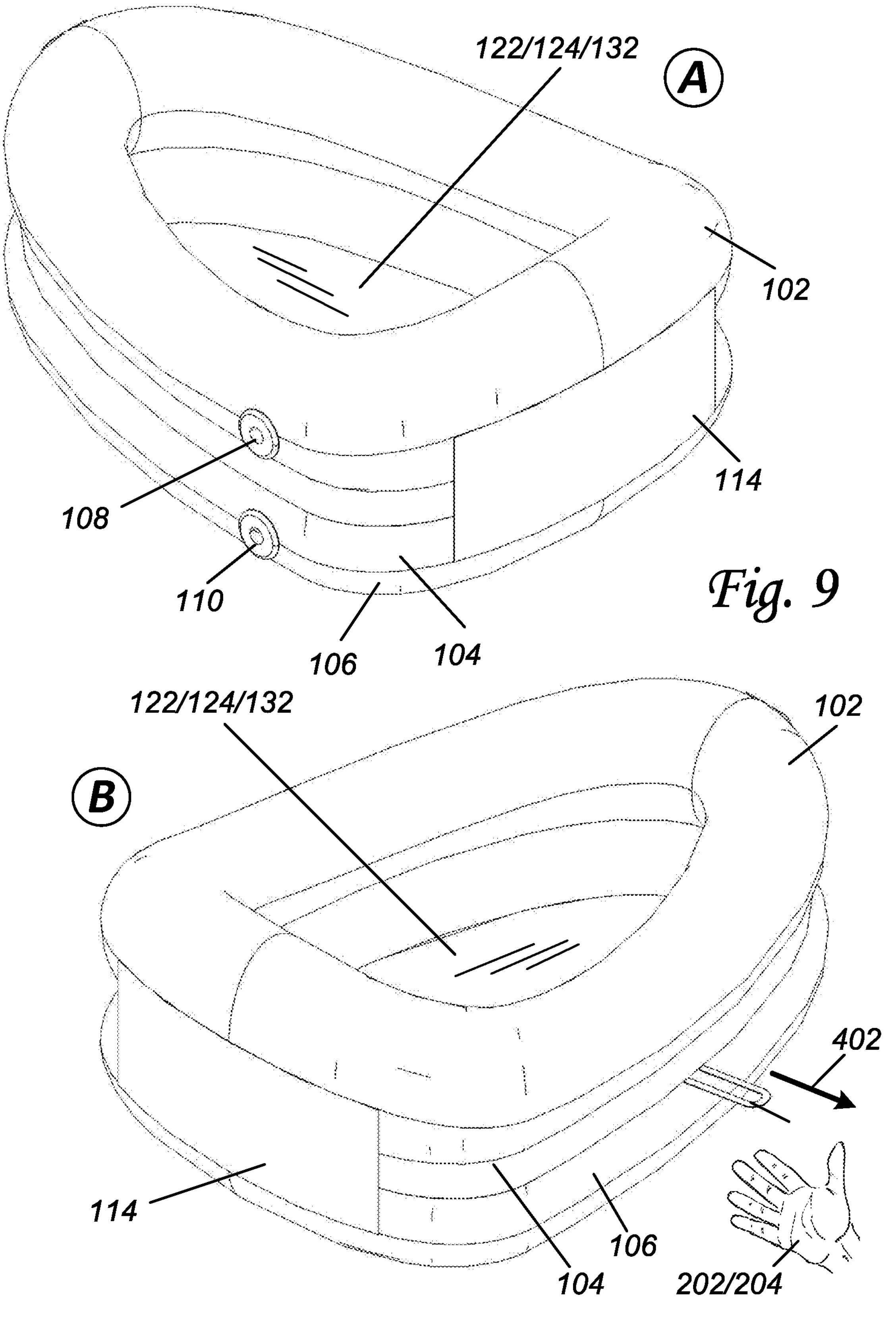
FIG. 9 illustrates one example of, in reference 'A', a top-back-right perspective view of the inflatable bedpan, and in reference 'B', a top-back-left perspective view of the inflatable bedpan.

Referring to FIG. 9, there is illustrated one example of, in reference 'A', a top-back-right perspective view of the inflatable bedpan 100, and in reference 'B', a top-back-left perspective view of the inflatable bedpan 100. In an exemplary embodiment, FIG. 9 illustrates an operational perspective of the inflatable bedpan 100 that can emphasize rear-side access, staged inflation control, and an exterior-access cinch-closure workflow that can be performed while a nested containment configuration remains supported within the bedpan. In an exemplary embodiment, the inflatable bedpan 100 can include a seat ring 102 positioned at an upper region of the inflatable bedpan 100, a support ring 104 positioned below the seat ring 102, and a receptacle ring 106 positioned below the support ring 104. The seat ring 102 can define a waste-receiving opening and can provide a compliant seating interface that distributes load across bedding, while the support ring 104 and receptacle ring 106 can cooperate to maintain a basin-like clearance volume beneath the seat ring 102 that resists collapse into bedding during user shifting.

In an exemplary embodiment, reference 'A' illustrates inflation components disposed along a rear-side region of the inflatable bedpan 100. A seat air valve 108 can be in fluid communication with the seat ring 102, and a base air valve 110 can be in fluid communication with the support ring 104. Positioning the valves 108 and 110 on a rear-side region can be technically advantageous because a caregiver can adjust inflation while standing alongside the bed without reaching into the waste-receiving opening or disturbing a nested bag assembly. Separate inflation control can further allow the seat ring 102 to be maintained at a comfort-oriented compliance while the support ring 104 is maintained at a stability-oriented firmness, which can improve repeatability of positioning on varied bedding thicknesses compared to certain prior approaches that provide either a rigid geometry or a single chamber that forces a tradeoff between comfort and stability.

In an exemplary embodiment, FIG. 9 further illustrates a seat retainer hinge 114 positioned along an exterior side region of the inflatable bedpan 100. The seat retainer hinge 114 can be configured to permit controlled relative movement between the seat ring 102 and the support ring 104, such as movement that can facilitate placement of a containment bag arrangement and subsequent return to a retained use position. The presence of the seat retainer hinge 114 can also support a consistent spatial gap or access region between the rings when configured for use, which can be beneficial for routing and accessing closure components as described herein.

In an exemplary embodiment, each of reference 'A' and reference 'B' depicts a nested containment configuration referenced as 122/124/132. The combined reference 122/124/132 can represent a state in which an outer containment bag 122 and an inner containment bag 124 are positioned within the interior of the inflatable bedpan 100 and supported by a bottom receptacle surface 132. Supporting the nested bags on the bottom receptacle surface 132 can reduce uncontrolled sagging of a waste-containing region toward bedding and can reduce smear pathways associated with prior approaches that allow a liner to contact bedding at the lowest point. The receptacle ring 106 can further stabilize the bag-supported basin geometry by providing a defined lower boundary that can resist outward bulging when contents accumulate.

In an exemplary embodiment, reference 'B' illustrates a cinch-closure operation in which a user 202 and/or a caregiver 204 can apply a pulling action 402 to a cinch string 120 that can be accessible from outside the outer containment bag 122. In the illustrated configuration, the cinch string 120 can originate on the inner containment bag 124, can traverse within a perimeter channel 138 of the inner containment bag 124, and can emerge through cinch string egress openings 136 of the inner containment bag 124. Portions of the cinch string 120 proximate to those cinch string egress openings 136 can then be fed through cinch holes 126 of the outer containment bag 122 so that one or more graspable portions of the cinch string 120 are presented on an exterior side of the outer containment bag 122. This structural routing can be technically significant because the pulling action 402 can be applied while the user 202 or caregiver 204 remains outside the nested bag assembly and outside the waste-receiving opening defined by the seat ring 102, thereby reducing contact risk and improving closure repeatability compared to prior approaches where a drawstring must be grasped from within a liner mouth or where closure is achieved by folding and tying a soiled edge.

In an exemplary embodiment, applying the pulling action 402 can cause the cinch string to translate within the inner-bag perimeter channel and constrict an upper opening region of the inner containment bag 124. Because the cinch string can be guided by the perimeter channel and because the pull point can be presented through the outer containment bag 122, the cinching action can be more uniform and less prone to twisting than approaches where the drawstring is free-floating or where the bag mouth is manually gathered. In some embodiments, the outer containment bag 122 can remain installed on the inflatable bedpan 100 while the inner containment bag 124 is cinched closed and removed for disposal, which can reduce caregiver handling steps and can maintain a protective barrier layer for subsequent use cycles.

Accordingly, FIG. 9 can illustrate how the inflatable bedpan 100 can provide a practical, physical, and repeatable bedside waste-management workflow through cooperative structure and method relationships. The independent inflation features 108 and 110 can support staged placement and tuning, the ring geometry 102, 104, and 106 can maintain a stable basin volume on bedding, the seat retainer hinge 114 can support controlled setup and retention, and the nested containment configuration 122/124/132 can enable external-access pulling 402 by a user 202 or caregiver 204 to cinch closed the inner containment bag 124 without reaching into the waste-receiving opening. These are concrete, mechanical improvements to bedside toileting hardware and handling, and they can reduce leakage risk, reduce contamination exposure, and improve setup repeatability relative to prior approaches.

Figure 10:
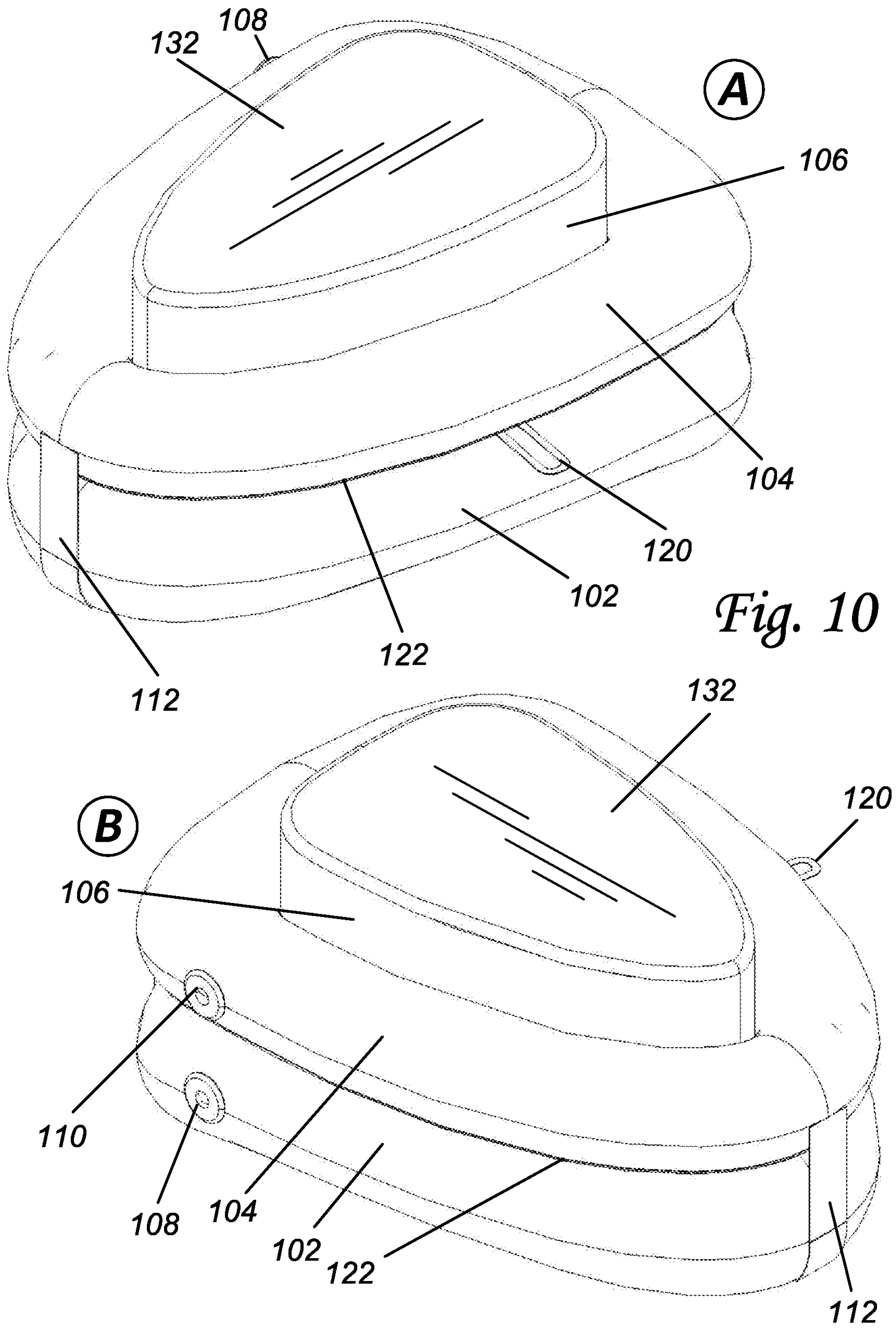
FIG. 10 illustrates one example of, in reference 'A', a bottom-front-left perspective view of the inflatable bedpan, and in reference 'B', a bottom-front-right perspective view of the inflatable bedpan.

Referring to FIG. 10, there is illustrated one example of, in reference 'A', a bottom-front-left perspective view of the inflatable bedpan 100, and in reference 'B', a bottom-front-right perspective view of the inflatable bedpan 100. In an exemplary embodiment, FIG. 10 illustrates the inflatable bedpan 100 in a bottom-perspective operational state that can emphasize how the inflatable bedpan 100 can physically support a containment workflow while maintaining stable contact with bedding and preserving an engineered waste-receiving basin geometry. In an exemplary embodiment, the inflatable bedpan 100 can include a seat ring 102 positioned at an upper region, a support ring 104 positioned below the seat ring 102, and a receptacle ring 106 positioned to define a lower basin region. In the illustrated views, a bottom receptacle surface 132 can be supported by and/or coupled with the receptacle ring 106 so that the receptacle ring 106 and the bottom receptacle surface 132 cooperatively define a leak-resistant lower boundary for a waste-receiving volume. This can be technically significant because, in use, the bottom receptacle surface 132 can provide a predictable lowest surface that remains within the bedpan structure rather than allowing a waste-containing bag to sag directly onto bedding, which can reduce smear pathways and wicking that can occur in certain prior approaches where a liner contacts bedding at the lowest point.

In an exemplary embodiment, FIG. 10 further illustrates that the outer containment bag 122 can be installed around the inflatable bedpan 100 in a manner that allows the outer containment bag 122 to remain as a protective barrier layer while still exposing and preserving access to operational features of the inflatable bedpan 100. For example, the outer containment bag 122 can be wrapped and retained along a lower perimeter region such that the outer containment bag 122 does not obscure the receptacle ring 106 geometry that supports the bottom receptacle surface 132, and does not interfere with inflation components. In this manner, the outer containment bag 122 can reduce direct contact between waste and the inflatable bedpan 100 during use and disposal cycles, while still allowing the inflatable bedpan 100 to be staged, inflated, and handled in a predictable way.

In an exemplary embodiment, the inflation architecture of the inflatable bedpan 100 can be further appreciated from the bottom-perspective views. As shown in reference 'B', a seat air valve 108 can be in fluid communication with the seat ring 102 and a base air valve 110 can be in fluid communication with the support ring 104. Locating the valves 108 and 110 on a lateral exterior region that remains accessible from a bottom-side perspective can enable a caregiver to tune compliance and stability after placement without reaching into a waste-receiving opening. In an exemplary embodiment, a valve port defined by the seat air valve 108 and/or the base air valve 110 can have an effective port diameter in a broad operative range of about 8 mm to about 30 mm, in a more preferred range of about 10 mm to about 22 mm, and in an exemplary embodiment of about 16 mm, which can facilitate inflation using common hand pumps while maintaining a compact profile that reduces snagging on bedding or clothing. In an exemplary embodiment, each valve 108 and 110 can be positioned with a lateral offset from a nearest exterior perimeter of the inflatable bedpan 100 in a broad operative range of about 10 mm to about 120 mm, in a more preferred range of about 20 mm to about 80 mm, and in an exemplary embodiment of about 45 mm, thereby positioning the valves where a caregiver can reach them while reducing the likelihood that a user's body weight bears directly on the valves.

In an exemplary embodiment, FIG. 10 also illustrates a tether closure strap 112 positioned along an exterior region of the inflatable bedpan 100. The tether closure strap 112 can be configured to constrain relative movement between the seat ring 102 and the support ring 104, such as during a seat-lift installation workflow or during patient shifting. For example, when the inflatable bedpan 100 is partially inflated for placement, the tether closure strap 112 can limit unintended separation between the rings that could otherwise disturb an installed bag arrangement. In some embodiments, the tether closure strap 112 can also serve as a handling aid for a caregiver, such as for repositioning the inflatable bedpan 100 without directly grasping surfaces proximate a waste-receiving region.

In an exemplary embodiment, FIG. 10 further illustrates a cinch string 120 accessible along an exterior side region while the outer containment bag 122 remains installed. The cinch string 120 can be associated with an inner containment bag nested within the outer containment bag 122, and the cinch string 120 can be routed so that portions of the cinch string 120 can be presented externally through cinch holes of the outer containment bag 122. Presenting the cinch string 120 externally can allow a user or caregiver to pull the cinch string 120 from outside the outer containment bag 122 to cinch closed the inner containment bag, which can reduce contamination risk and improve closure repeatability relative to prior approaches where a drawstring must be retrieved from within a liner mouth or where closure requires folding and tying near the waste-receiving opening. In an exemplary embodiment, the cinch string 120 can be configured so that opposing sides can be pulled to create a symmetric cinch action that constricts the inner bag opening in a more uniform manner, thereby improving sealing consistency.

Accordingly, FIG. 10 illustrates how the inflatable bedpan 100 can provide a cooperative, mechanically implemented bedside waste-management platform in which the rings 102, 104, and 106 maintain a stable basin geometry, the bottom receptacle surface 132 provides a leak-resistant lower boundary, the valves 108 and 110 support staged inflation and tuning, the tether closure strap 112 supports controlled positioning and retention, and the outer containment bag 122 and cinch string 120 support a repeatable external-access closure workflow. These features provide practical, real-world improvements in comfort, stability, and contamination control over prior approaches, and they do so through concrete structure and physical interactions that constitute a technological solution rather than an abstract concept.

Figure 11:
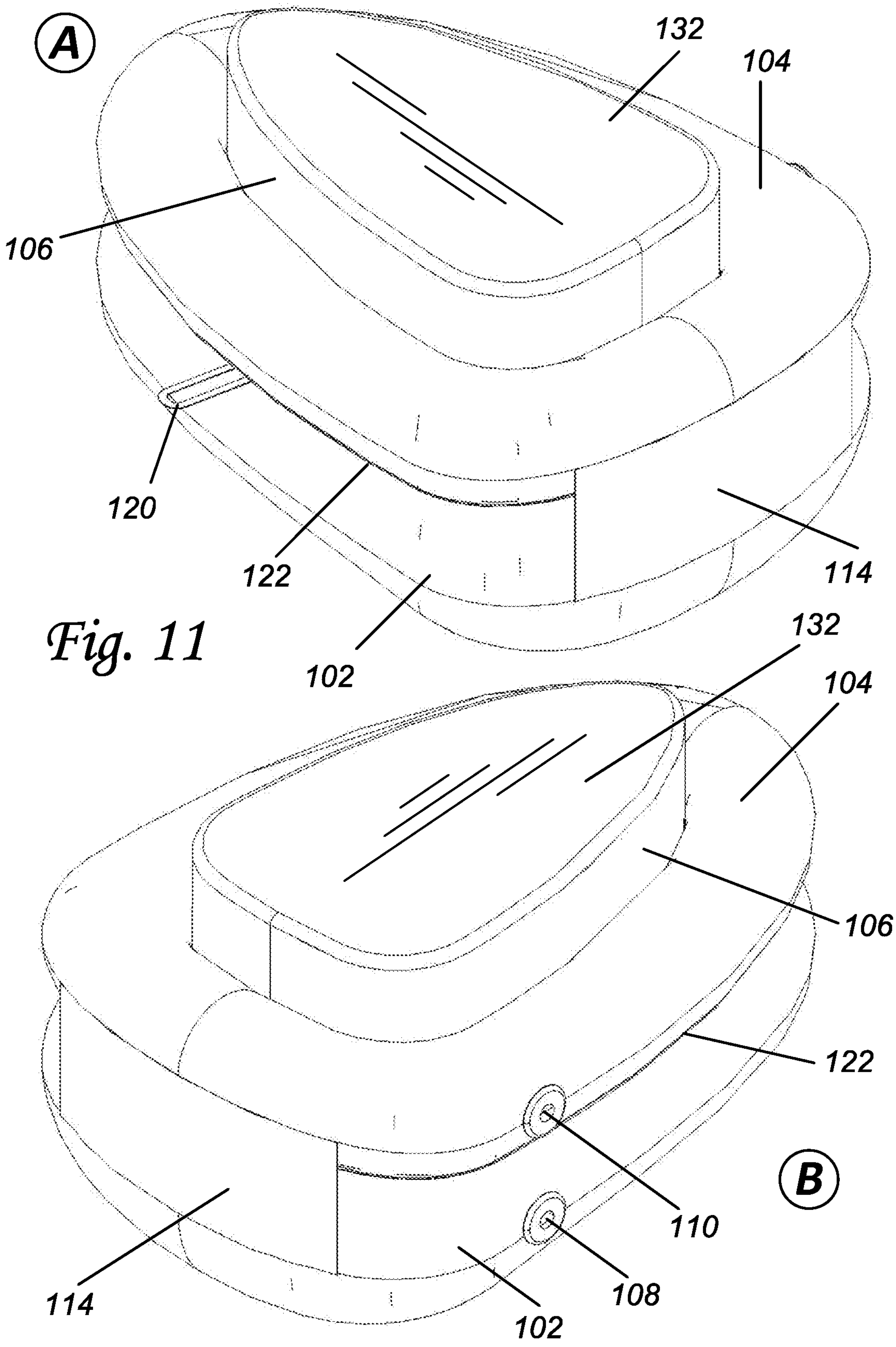
FIG. 11 illustrates one example of, in reference 'A', a bottom-back-left perspective view of the inflatable bedpan, and in reference 'B', a bottom-front-right perspective view of the inflatable bedpan.

Referring to FIG. 11, there is illustrated one example of, in reference 'A', a bottom-back-left perspective view of the inflatable bedpan 100, and in reference 'B', a bottom-front-right perspective view of the inflatable bedpan 100. In an exemplary embodiment, FIG. 11 illustrates the inflatable bedpan 100 in bottom-perspective views that can emphasize how the structural rings of the inflatable bedpan 100 can physically cooperate with an installed containment configuration to maintain a stable, leak-resistant basin geometry while also preserving external access to inflation and closure features. In an exemplary embodiment, the inflatable bedpan 100 can include a seat ring 102 positioned at an upper region, a support ring 104 positioned below the seat ring 102, and a receptacle ring 106 positioned to define and bound a lower receptacle region. The receptacle ring 106 can support, define, or be coupled with a bottom receptacle surface 132 that can form a leak-resistant lower boundary of the receptacle region, such that liquids can be retained within the receptacle region rather than migrating into bedding. In an exemplary embodiment, the bottom receptacle surface 132 can be formed as a continuous barrier layer coupled around a perimeter of the receptacle ring 106, such as by a welded seam, bonded seam, or multi-layer laminated interface, thereby reducing seam discontinuities that can act as leakage initiation points in certain prior approaches that rely on loosely supported liners or thin single-layer bags draped against bedding.

In an exemplary embodiment, reference 'A' illustrates that an outer containment bag 122 can be installed on the inflatable bedpan 100 such that the outer containment bag 122 can extend into the receptacle region and can be supported by the receptacle ring 106 and the bottom receptacle surface 132. The outer containment bag 122 can function as a protective barrier layer between the inflatable bedpan 100 and a removable inner containment bag used to capture waste. By providing a supported drape against a defined bottom receptacle surface 132, the outer containment bag 122 can be less prone to uncontrolled sagging, bunching, or collapse against bedding, which can otherwise create wicking or smear pathways in certain prior approaches. In an exemplary embodiment, FIG. 11 further illustrates that a cinch string 120 can remain accessible along an exterior side region while the outer containment bag 122 is installed. The cinch string 120 can originate from an inner containment bag nested within the outer containment bag 122, and the cinch string 120 can be presented externally, such as via a routing hand-off through cinch holes in the outer containment bag, so that closure actuation can be performed by pulling from outside the outer containment bag 122. This external accessibility can enable a user or caregiver to apply a closing force while remaining outside a waste-receiving region, reducing contamination exposure and improving closure repeatability compared to prior approaches where a drawstring is retrieved from within a bag mouth or where closure is performed by folding and tying near a soiled opening.

In an exemplary embodiment, the bottom-perspective views in FIG. 11 can further illustrate how the support ring 104 can provide a laterally stable base that contacts bedding and resists roll, while the receptacle ring 106 and bottom receptacle surface 132 maintain a defined basin-like geometry beneath the seat ring 102. This cooperative geometry can provide a practical mechanical advantage because it can help maintain a predictable "lowest point" inside the inflatable bedpan 100 at the bottom receptacle surface 132, rather than allowing the lowest point of a waste-containing bag to migrate laterally or contact bedding. In some embodiments, an overall footprint of the inflatable bedpan 100, measured as an effective major dimension across the support ring 104, can be in a broad operative range of about 350 mm to about 650 mm, in a more preferred range of about 420 mm to about 580 mm, and in an exemplary embodiment of about 500 mm, which can provide sufficient contact area to resist tipping while still allowing placement under a user on typical hospital bedding. In an exemplary embodiment, an overall inflated height of the inflatable bedpan 100, measured from a bottom region of the receptacle ring 106 to a top region of the seat ring 102, can be in a broad operative range of about 40 mm to about 140 mm, in a more preferred range of about 60 mm to about 110 mm, and in an exemplary embodiment of about 85 mm, enabling staged placement in a semi-inflated condition and subsequent inflation to a stable operating profile.

In an exemplary embodiment, reference 'B' illustrates the seat air valve 108 and the base air valve 110 positioned along an exterior side region so that inflation and firmness can be adjusted without disturbing the installed containment configuration. The seat air valve 108 can be in fluid communication with the seat ring 102 to control the compliance of the seating interface, and the base air valve 110 can be in fluid communication with the support ring 104 to control stability and lift. This independent tunability can be technically advantageous because it allows a caregiver to increase support ring firmness to resist roll while maintaining seat ring compliance for comfort, which can be difficult in prior approaches that rely on a single rigid geometry or a single inflation chamber.

In an exemplary embodiment, FIG. 11 further illustrates a seat retainer hinge 114 configured to permit controlled relative movement between the seat ring 102 and the support ring 104. The seat retainer hinge 114 can allow the seat ring 102 to be selectively lifted for installation or repositioning of the outer containment bag 122 and an inner containment bag, and then returned to a retained position for use. In this manner, the hinge 114 can support repeatable bag placement and can reduce the likelihood of bag misalignment or twisting that can compromise closure reliability. The combination of the hinge 114, the supported basin geometry defined by the receptacle ring 106 and bottom receptacle surface 132, and the external accessibility of the cinch string 120 can provide an integrated, mechanical waste-management workflow that improves cleanliness, stability, and caregiver handling relative to prior approaches, and does so through tangible physical components and their interactions rather than through an abstract idea.

Figure 12:
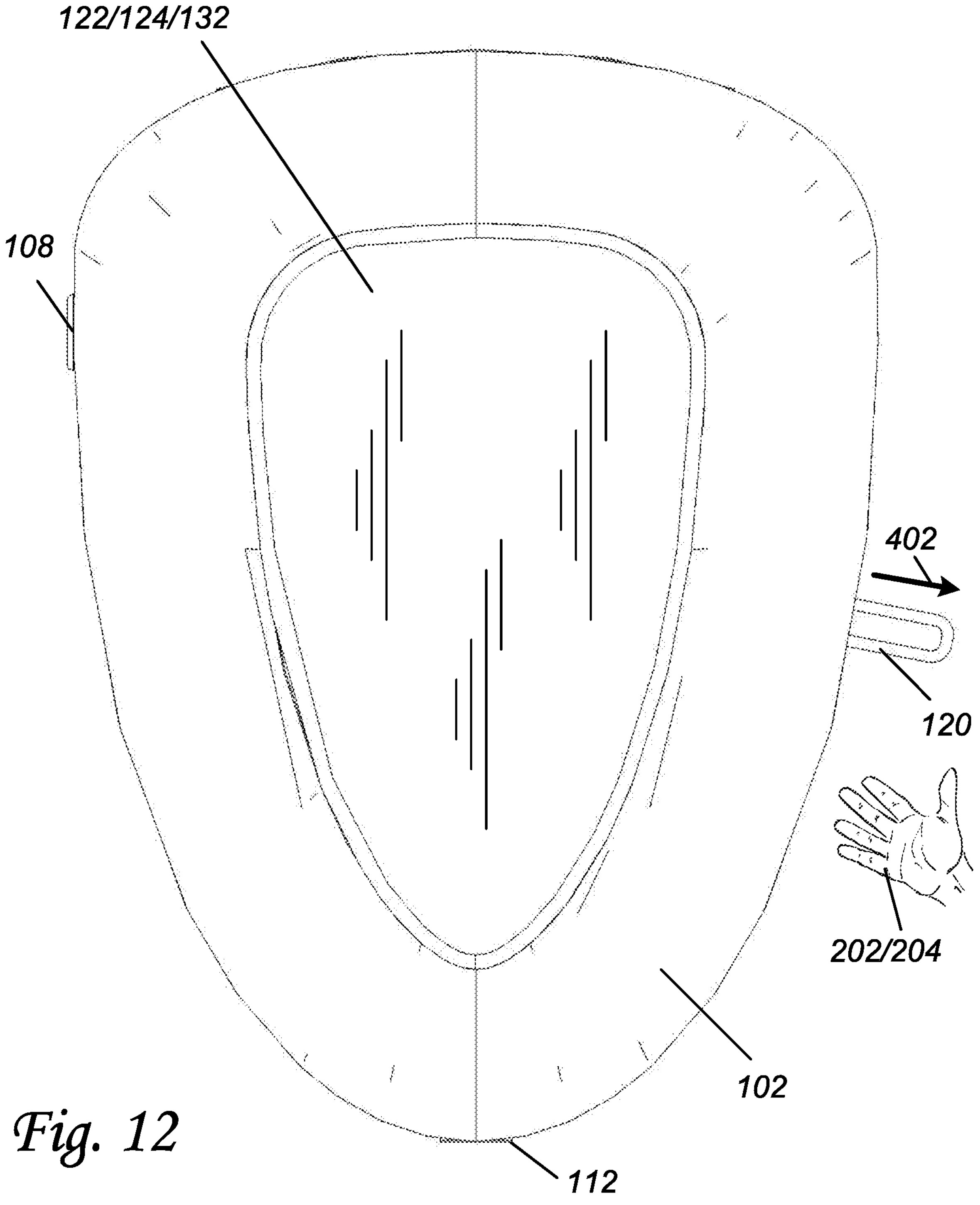
FIG. 12 illustrates one example of a bottom view of an inflatable bedpan.

Referring to FIG. 12, there is illustrated one example of a bottom view of an inflatable bedpan 100. In an exemplary embodiment, FIG. 12 illustrates a bottom-oriented view of an inflatable bedpan 100 that can highlight how a cinch-accessible nested containment configuration can be physically supported and actuated while the user-facing opening remains unobstructed. In an exemplary embodiment, a seat ring 102 can define an upper support perimeter of the inflatable bedpan 100 and can surround a waste-receiving opening through which waste can be directed into a nested containment configuration. In the illustrated view, the seat ring 102 can provide a broad, compliant contact footprint that can distribute pressure across bedding and can maintain the bedpan in a stable position relative to the user, which can reduce localized pressure points and shifting associated with certain prior approaches that rely on rigid pan rims or flat liners that collapse during use.

In an exemplary embodiment, the inflatable bedpan 100 can include a seat air valve 108 in fluid communication with the seat ring 102. The seat air valve 108 can allow inflation, deflation, and tuning of the compliance of the seat ring 102. In some embodiments, a valve port associated with the seat air valve 108 can have an effective port diameter in a broad operative range of about 8 mm to about 30 mm, in a more preferred range of about 10 mm to about 22 mm, and in an exemplary embodiment of about 16 mm, which can facilitate inflation using common pumps while maintaining a low-profile component that can reduce snagging on bedding or garments.

In an exemplary embodiment, FIG. 12 depicts a nested containment configuration referenced as 122/124/132, which can represent an outer containment bag 122 and an inner containment bag 124 positioned within the inflatable bedpan 100 and supported by a bottom receptacle surface 132. The bottom receptacle surface 132 can be leak-resistant and can serve as a defined support plane for the bags, which can be technically significant because the weight of collected contents can remain supported within the structure of the inflatable bedpan 100 rather than sagging into bedding. This can reduce smear pathways and wicking that can occur in certain prior approaches where the lowest point of a liner collapses and contacts bedding.

In an exemplary embodiment, FIG. 12 further illustrates how a cinch string 120 can be presented for exterior access during use. The cinch string 120 can originate from the inner containment bag 124 and can be routed so that one or more graspable portions of the cinch string 120 can be accessible from outside the outer containment bag 122. In the illustrated configuration, a user 202 or a caregiver 204 can apply a pulling action 402 to the cinch string 120 while remaining outside the nested bag assembly. This external-access pulling arrangement can be a practical hygiene improvement relative to certain prior approaches where a drawstring must be retrieved from within a bag mouth or where closure requires folding and tying near a waste-receiving opening. In an exemplary embodiment, the pulling action 402 can be applied in one direction or, in other embodiments, can be applied in opposing directions using opposing graspable portions so that the closure constriction can occur symmetrically around an upper opening region of the inner containment bag 124.

In an exemplary embodiment, the accessibility of the cinch string 120 from outside the outer containment bag 122 can allow the user 202 or caregiver 204 to cinch closed the inner containment bag 124 without inserting a hand through the waste-receiving opening defined by the seat ring 102. This can reduce the likelihood of contacting waste, can reduce splashing risk during closure, and can improve repeatability of sealing as compared to prior approaches in which the closure element is not constrained to a predictable exterior access location. Additionally, because the outer containment bag 122 can remain positioned as a protective barrier layer, the cinched inner containment bag 124 can be removed for disposal while leaving the outer containment bag 122 in place, depending on the use cycle, which can reduce caregiver handling steps and reduce the need to wipe or clean the inflatable bedpan 100 between uses.

In an exemplary embodiment, FIG. 12 further illustrates a tether closure strap 112 positioned at a lower region of the inflatable bedpan 100. The tether closure strap 112 can cooperate with other retention and installation features described elsewhere in this specification to maintain a controlled relationship between ring structures during use and handling, which can support repeatable bag positioning and predictable access to the cinch string 120 during closure. In this manner, FIG. 12 can illustrate a physically implemented, structured system in which the seat ring 102, seat air valve 108, tether closure strap 112, nested containment configuration 122/124/132, cinch string 120, and pulling action 402 can cooperate to provide an engineered bedside waste-management workflow that improves comfort, stability, and contamination control relative to prior approaches, through concrete structural elements and real-world mechanical interactions rather than an abstract concept.

Figure 13:
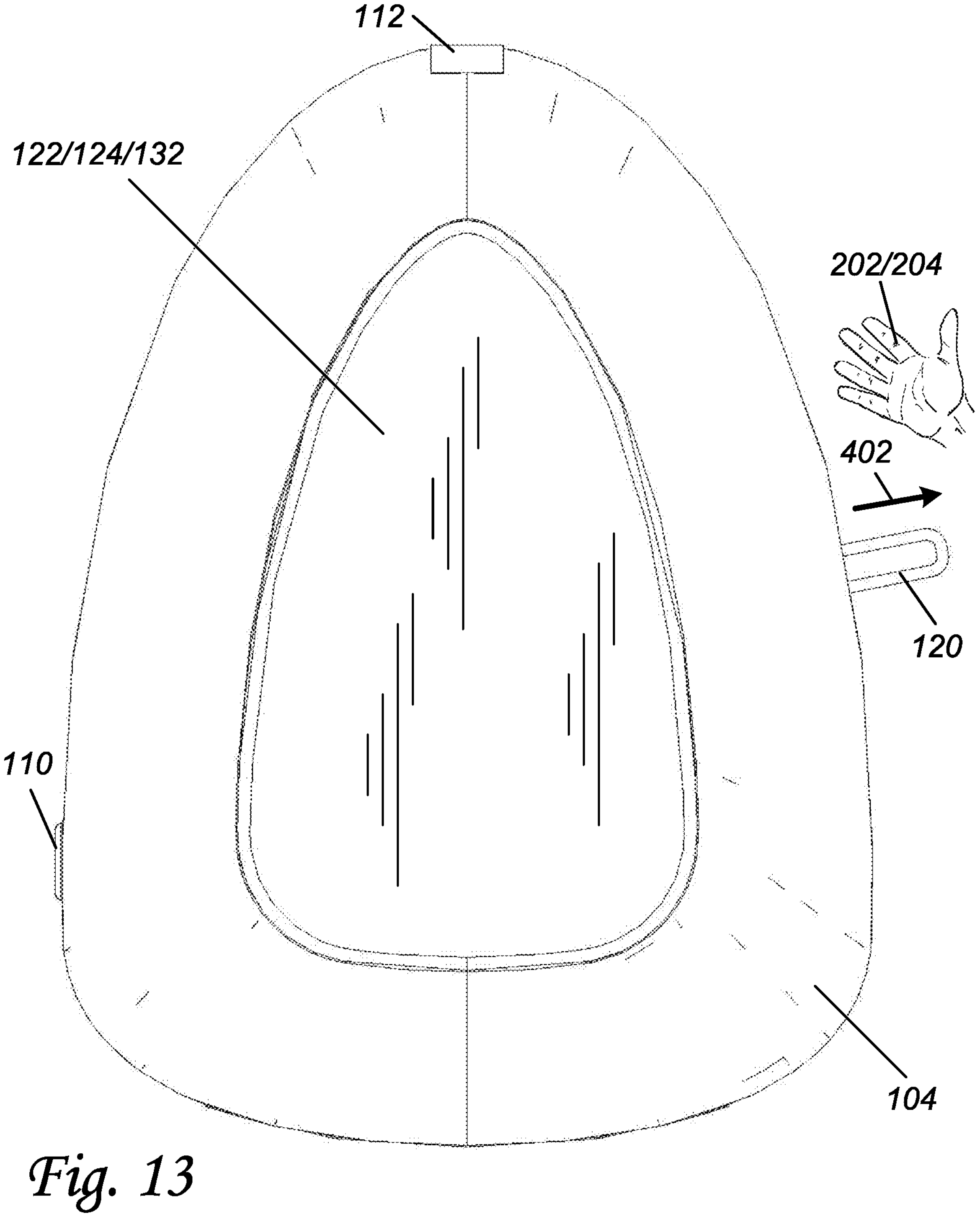
FIG. 13 illustrates one example of a top view of an inflatable bedpan.

Referring to FIG. 13, there is illustrated one example of a top view of an inflatable bedpan 100. In an exemplary embodiment, FIG. 13 illustrates a top-oriented operational view of the inflatable bedpan 100 that can emphasize a user-facing access geometry, an exterior-access cinch-closure workflow, and a supported containment configuration that can remain nested and stable during use. In an exemplary embodiment, the inflatable bedpan 100 can include a support ring 104 forming an outer perimeter that can contact bedding and provide lateral stability against roll and shift when a user is repositioned on a bed. The support ring 104 can define an outer footprint that can be sized to distribute load and increase frictional engagement with bedding, which can reduce "kick-out" and misalignment relative to certain prior approaches that use rigid bedpans that slide unpredictably or liners that lack a stabilizing structure.

In an exemplary embodiment, FIG. 13 depicts a nested containment configuration referenced as 122/124/132, which can represent an outer containment bag 122 and an inner containment bag 124 positioned within the inflatable bedpan 100 and supported by a bottom receptacle surface 132. Although the bottom receptacle surface 132 can be positioned below the top view plane, the combined reference 122/124/132 can indicate that the containment layers can occupy the interior volume beneath a waste-receiving opening and can remain supported by a defined lower surface, rather than sagging into bedding. This support relationship can be technically significant because it can constrain the waste load to remain within a predictable basin region, which can reduce smear pathways and wicking that can occur in prior approaches where the lowest point of a liner migrates and contacts bedding.

In an exemplary embodiment, FIG. 13 illustrates a tether closure strap 112 positioned along an upper region of the inflatable bedpan 100. The tether closure strap 112 can be coupled to ring structures described elsewhere in this specification and can constrain relative movement between an upper support region and a lower support region, such as during installation of the containment bags and during user shifting. By limiting unwanted separation of ring structures, the tether closure strap 112 can help maintain a repeatable spatial relationship between the interior containment region and exterior access points, improving setup reliability and improving the ability of a caregiver to locate and actuate closure elements quickly.

In an exemplary embodiment, FIG. 13 further illustrates a base air valve 110 positioned along a lateral exterior region of the inflatable bedpan 100. The base air valve 110 can be in fluid communication with the support ring 104 so that the support ring 104 can be inflated, deflated, or tuned in firmness without disturbing the nested containment configuration. Locating the base air valve 110 on an exterior perimeter can be advantageous because it can remain accessible to a caregiver during use, including after the inflatable bedpan 100 has been positioned beneath a user, thereby enabling staged placement and tuning. In some embodiments, a valve port associated with the base air valve 110 can have an effective port diameter in a broad operative range of about 8 mm to about 30 mm, in a more preferred range of about 10 mm to about 22 mm, and in an exemplary embodiment of about 16 mm, which can support inflation using common pumps while maintaining a low-profile geometry.

In an exemplary embodiment, FIG. 13 depicts an exterior-access cinch workflow by showing a cinch string 120 presented at an exterior region, with a pulling action 402 that can be applied by a user 202 and/or a caregiver 204. The cinch string 120 can originate from the inner containment bag 124 and can be routed such that portions of the cinch string 120 are accessible from outside the outer containment bag 122. In an exemplary embodiment, the cinch string 120 can traverse within a perimeter channel 138 of the inner containment bag 124 and can emerge through cinch string egress openings 136 of the inner containment bag 124, after which portions of the cinch string 120 proximate the cinch string egress openings 136 can be fed through cinch holes 126 of the outer containment bag 122 so that one or more graspable portions are presented externally. In this configuration, the user 202 or caregiver 204 can apply the pulling action 402 from outside the outer containment bag 122, thereby enabling cinch-closure of the inner containment bag 124 without inserting a hand through the waste-receiving opening. This can reduce contamination exposure, can reduce splashing risk during closure, and can improve closure repeatability compared to prior approaches in which a drawstring must be grasped from within a bag mouth or in which closure requires gathering and tying a soiled rim.

In an exemplary embodiment, the top-view orientation of FIG. 13 can also illustrate how the cinch string 120 can be positioned laterally outward of the central containment region so that the pull direction 402 is substantially tangential to the perimeter of the inflatable bedpan 100 rather than downward into the waste-receiving region. This tangential pull vector can be advantageous because it can reduce the tendency of the nested bag assembly to lift out of position during cinching, and it can allow cinch-closure to be performed while the outer containment bag 122 remains installed as a protective barrier layer. In an exemplary embodiment, after cinch-closure, the inner containment bag 124 can be removed for disposal while leaving the outer containment bag 122 in place, thereby reducing caregiver handling steps and maintaining the cleanliness of the inflatable bedpan 100 for subsequent use cycles.

Accordingly, FIG. 13 illustrates a cooperative, mechanically implemented bedside waste-management configuration in which the inflatable bedpan 100 provides stability via the support ring 104, inflation control via the base air valve 110, retention support via the tether closure strap 112, and controlled waste containment via the nested containment configuration 122/124/132, while also enabling external cinch-string access 120 and a pulling action 402 by a user 202 or caregiver 204. These features can provide real-world improvements in comfort, stability, closure hygiene, and disposal repeatability relative to prior approaches, and they do so through tangible structural elements and their physical interactions rather than an abstract concept.

An advantage of the present invention over prior approaches is that the cinch string 120 can be accessed and pulled from the inter-ring access region at the outer perimeter of the inflatable bedpan 100 to cinch closed the inner containment bag 124 without requiring the user 202 to get off the inflatable bedpan 100. In an exemplary embodiment, the cinch string 120 can originate from the inner containment bag 124 and can be routed through cinch holes 126 of the outer containment bag 122 to present one or more graspable portions on an exterior side of the outer containment bag 122, enabling the user 202 and/or a caregiver 204 to apply a pulling action 402 from outside the waste-receiving opening. This can reduce odor by allowing the inner containment bag 124 to be closed promptly after waste deposition, and can reduce the chance of spillage associated with repositioning, lifting, or shifting a waste-containing pan or receptacle during a closure step. In an exemplary embodiment, the exterior presentation of the graspable portions can also improve caregiver ergonomics and closure repeatability, because closure forces can be applied as lateral pulls at the outer perimeter rather than requiring reaching into or near a soiled opening region.

Figure 14:
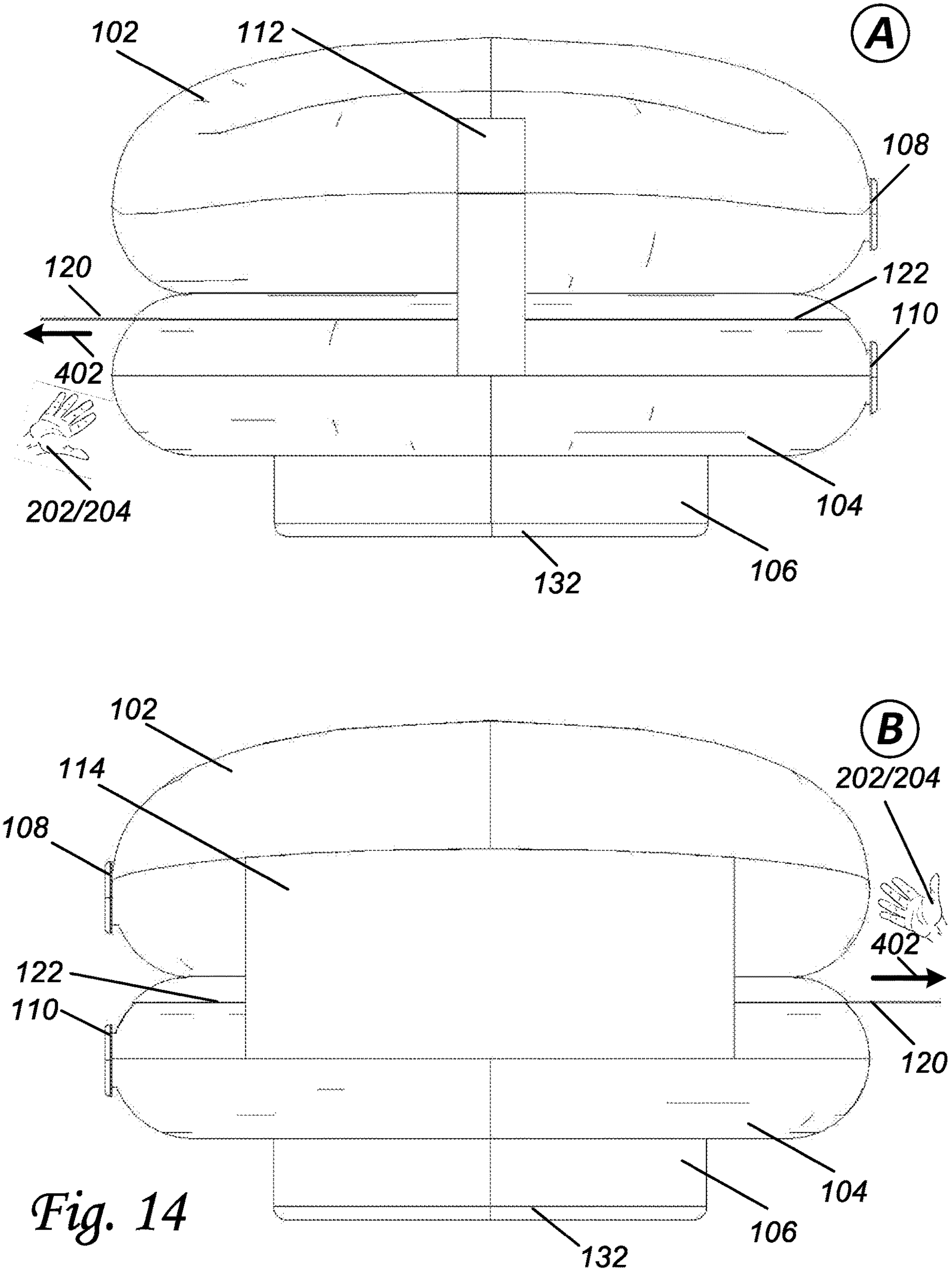
FIG. 14 illustrates one example of, in reference 'A', a front view of an inflatable bedpan, and in reference 'B', a back view of an inflatable bedpan.

Referring to FIG. 14, there is illustrated one example of, in reference ‘A’, a front view of the inflatable bedpan 100, and in reference ‘B’, a back view of the inflatable bedpan 100. In an exemplary embodiment, FIG. 14 illustrates the inflatable bedpan 100 in orthogonal views that can emphasize how the inflatable bedpan 100 can maintain a predictable vertical profile on bedding while supporting a nested containment configuration and preserving external access to inflation control and cinch-closure actuation. In an exemplary embodiment, the inflatable bedpan 100 can include a seat ring 102 positioned at an upper region, a support ring 104 positioned below the seat ring 102, and a receptacle ring 106 positioned to define a lower containment region. The receptacle ring 106 can support, define, or be coupled with a bottom receptacle surface 132 so that the receptacle region can remain leak-resistant and structurally bounded, which can reduce leakage pathways and uncontrolled “bag sag” that can occur in certain prior approaches where a liner collapses and contacts bedding at the lowest point.

In an exemplary embodiment, reference ‘A’ can illustrate a front-facing profile in which the seat ring 102 can present a compliant support interface configured to distribute user load. The seat ring 102 can define a waste-receiving opening positioned above the receptacle region so that waste can be directed downward into a nested containment arrangement rather than laterally toward a rim. The support ring 104 can provide a laterally stable base and a vertical stand-off height that maintains clearance between the waste-receiving region and bedding. For example, an overall inflated height of the inflatable bedpan 100, measured from a bottom region of the receptacle ring 106 to a top region of the seat ring 102, can be in a broad operative range of about 40 mm to about 140 mm, in a more preferred range of about 60 mm to about 110 mm, and in an exemplary embodiment of about 85 mm. This staged height can be technically significant because it can allow semi-inflated placement beneath the user and subsequent inflation to a stable operating condition without requiring the caregiver to lift the user vertically, which can reduce discomfort and reduce caregiver strain compared to certain prior approaches that require pushing a rigid bedpan under a user.

In an exemplary embodiment, reference ‘B’ can illustrate a back-facing profile in which inflation controls and retention structures can remain accessible to a caregiver while the inflatable bedpan 100 is positioned under a user. As shown, a seat air valve 108 can be in fluid communication with the seat ring 102, and a base air valve 110 can be in fluid communication with the support ring 104. Separate inflation control can allow the seat ring 102 to be tuned for comfort while the support ring 104 is tuned for stability and lift, enabling the inflatable bedpan 100 to accommodate different patient sizes and bedding thicknesses with a single device rather than requiring multiple rigid size variants. In an exemplary embodiment, each of the seat air valve 108 and the base air valve 110 can define a valve port having an effective port diameter in a broad operative range of about 8 mm to about 30 mm, in a more preferred range of about 10 mm to about 22 mm, and in an exemplary embodiment of about 16 mm, which can facilitate inflation using common hand pumps while maintaining a compact profile.

In an exemplary embodiment, FIG. 14 further depicts that the inflatable bedpan 100 can be used with a nested containment configuration referenced as 122/124/132, which can represent an outer containment bag 122 and an inner containment bag 124 positioned within the inflatable bedpan 100 and supported by the bottom receptacle surface 132. The outer containment bag 122 can function as a protective barrier layer between the inflatable bedpan 100 and the inner containment bag 124, and the inner containment bag 124 can function as the removable waste-capture component that can be cinched closed and discarded. Supporting the bag set on the bottom receptacle surface 132 can reduce uncontrolled sagging and reduce contact with bedding, which can be a practical hygiene advantage relative to prior approaches in which the liner’s lowest point collapses into bedding and becomes a smear surface during removal.

In an exemplary embodiment, FIG. 14 also illustrates a cinch string 120 presented at an exterior region of the installed configuration. The cinch string 120 can originate from the inner containment bag 124 and can be routed so that one or more graspable portions of the cinch string 120 can be accessible from outside the outer containment bag 122. In some embodiments, the cinch string 120 can traverse within a perimeter channel 138 of the inner containment bag 124 and exit through one or more cinch string egress openings 136 of the inner containment bag 124, after which portions of the cinch string 120 proximate the cinch string egress openings 136 can be fed through cinch holes 126 of the outer containment bag 122 so that the cinch string 120 is accessible from outside the outer containment bag 122. This exterior-access routing can be technically significant because the cinch string 120 can be pulled to cinch closed the inner containment bag 124 without requiring insertion of a hand through the waste-receiving opening, which can reduce contamination risk and improve closure repeatability compared to certain prior approaches in which a caregiver must reach into or near a soiled bag mouth to grasp and pull a drawstring.

In an exemplary embodiment, the exterior accessibility of the cinch string 120, as illustrated in the front and back views of FIG. 14, can also provide ergonomic advantages for a caregiver. For example, the cinch string 120 can be positioned at a lateral side region where a caregiver can apply an outward or tangential pull vector while maintaining the outer containment bag 122 as a barrier layer. This pull direction can reduce the tendency of the nested bag assembly to lift out of position during cinching, and it can help the inner containment bag 124 constrict uniformly around its opening. In an exemplary embodiment, after cinch-closure, the inner containment bag 124 can be removed for disposal while leaving the outer containment bag 122 installed on the inflatable bedpan 100, thereby reducing caregiver handling steps and preserving the protective barrier layer for subsequent use cycles.

Accordingly, FIG. 14 can illustrate how the inflatable bedpan 100 can present a stable vertical profile and accessible control features, while structurally supporting a nested containment configuration and an exterior-access cinch-closure. The cooperative physical relationships among the seat ring 102, support ring 104, receptacle ring 106, bottom receptacle surface 132, valves 108 and 110, outer containment bag 122, inner containment bag 124, and cinch string 120 can provide real-world improvements in comfort, stability, and hygiene relative to prior approaches, and these improvements are grounded in specific physical structure and operational interactions rather than an abstract concept.

Figure 15:
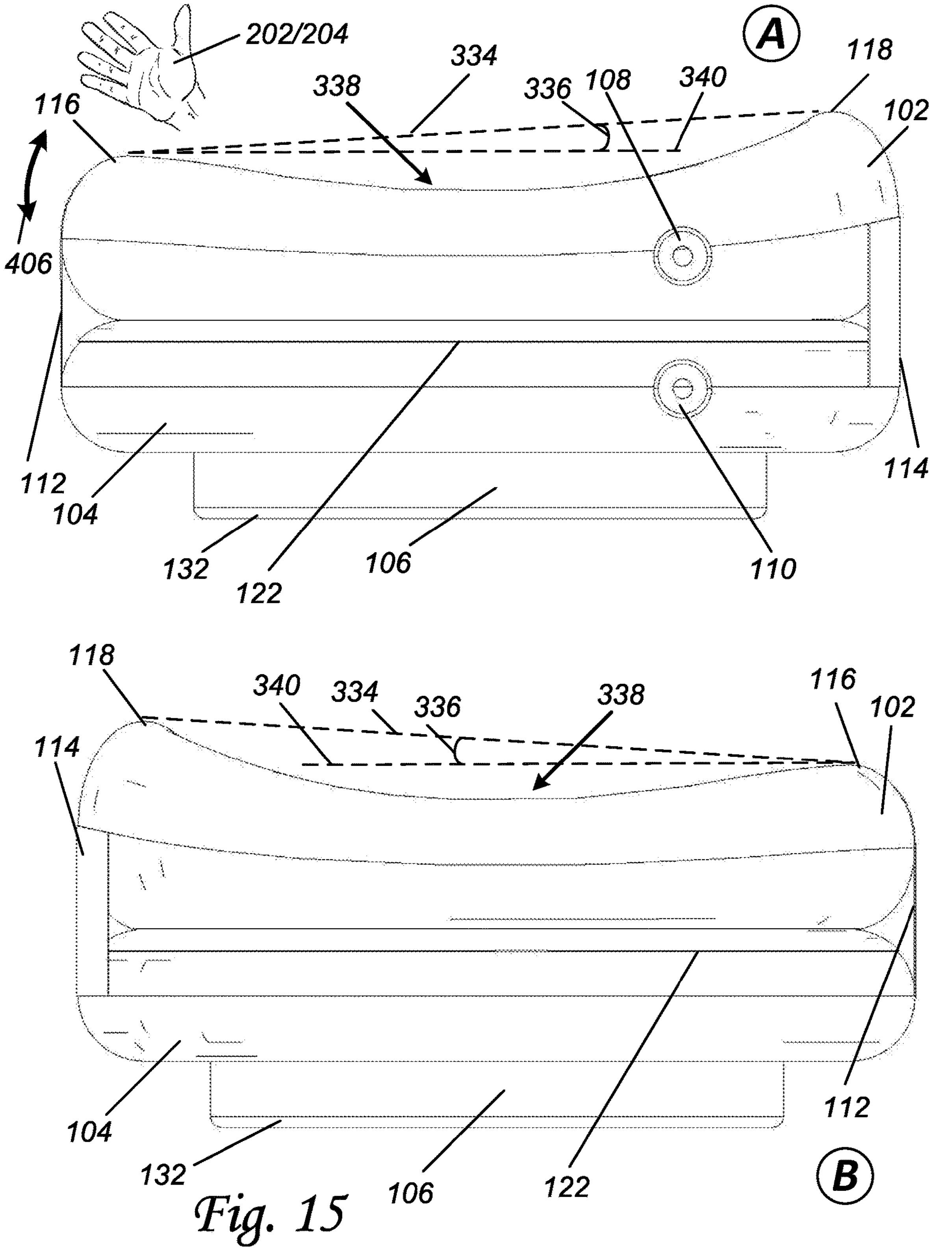
FIG. 15 illustrates one example of, in reference 'A', a right side view of an inflatable bedpan, and in reference 'B', a left side view of an inflatable bedpan.

Referring to FIG. 15, there is illustrated one example of, in reference 'A', a right side view of the inflatable bedpan 100, and in reference 'B' a left side view of the inflatable bedpan 100. In an exemplary embodiment, FIG. 15 illustrates the inflatable bedpan 100 in side-profile views that can emphasize a patient-positioning geometry formed on the seat ring 102 and the way that geometry can cooperate with the support ring 104, receptacle ring 106, and a supported containment configuration to provide stable use on bedding. In an exemplary embodiment, the seat ring 102 can be positioned above the support ring 104, and the receptacle ring 106 can be positioned below the support ring 104 such that the receptacle ring 106 supports or defines a bottom receptacle surface 132 that can provide a leak-resistant lower boundary for the waste-receiving region. In the illustrated configuration, an outer containment bag 122 can be present within the receptacle region and can be supported by the bottom receptacle surface 132, which can reduce uncontrolled sagging of a waste-containing region toward bedding and can reduce smear pathways that can occur in certain prior approaches where a liner collapses and contacts bedding at the lowest point.

In an exemplary embodiment, FIG. 15 further illustrates a seat-retention and installation architecture that can support repeatable setup of the bag system and predictable retention during use. A seat retainer hinge 114 can be positioned at a side region of the inflatable bedpan 100 and can allow controlled relative movement of the seat ring 102 with respect to the support ring 104, such as during installation of the outer containment bag 122 and an inner containment bag described elsewhere in this specification. A tether closure strap 112 can be coupled to the inflatable bedpan 100 and can constrain relative separation of the seat ring 102 and the support ring 104 during use and handling, which can reduce unintended lifting or misalignment that could otherwise disturb a nested bag configuration. The cooperative relationship between the seat retainer hinge 114 and the tether closure strap 112 can provide a guided, repeatable open-and-return behavior that improves setup reliability compared to certain prior approaches in which a liner is merely stretched over a rim without a controlled hinge-and-restraint structure.

In an exemplary embodiment, FIG. 15 highlights a crown-and-slope geometry on a top surface of the seat ring 102 that can promote user positioning and retention during use. A lower crown 116 can be configured near a top front edge of the seat ring 102, and a higher crown 118 can be configured near a top back edge of the seat ring 102, with the higher crown 118 being higher than the lower crown 116. In an exemplary embodiment, the differential height between the higher crown 118 and the lower crown 116 can be in a broad operative range of about 2 mm to about 40 mm, in a more preferred range of about 5 mm to about 25 mm, and in an exemplary embodiment of about 12 mm, although other values can be used depending on patient size class and bedding compliance. This crown differential can create a declining slope 408 along the top surface of the seat ring 102, with the declining slope 408 extending from the higher crown 118 toward the lower crown 116. In an exemplary embodiment, the declining slope 408 can define an angle 410, shown by the angle reference 336, relative to a reference plane, such as a horizontal plane, when the inflatable bedpan 100 is positioned on a bed. The angle 410 can be in a broad operative range of about 2 degrees to about 20 degrees, in a more preferred range of about 4 degrees to about 12 degrees, and in an exemplary embodiment of about 8 degrees. In the illustrated embodiment, a slope reference line 334 can represent the slope relationship between the seat ring 102 top surface, the higher crown 118, and the lower crown 116, thereby providing a geometric datum that can be used to locate and manufacture the slope consistently.

In an exemplary embodiment, the seat ring 102 can define a seat ring horizontal reference line 340 extending along the top surface of the seat ring 102, wherein the angle 410 and the declining slope 408 between the higher crown 118 and the lower crown 116 can be defined relative to the seat ring horizontal reference line 340.

In an exemplary embodiment, the declining slope 408 can cooperate with a concave curvature 412, indicated by the concave-curvature reference 338, so that the top surface of the seat ring 102 can define a shallow "cradle" that can help position a posterior region of the user on the seat ring 102 during use. This can be technically significant because, on bedding, lateral forces induced by rolling a patient, shifting bedding, or repositioning the user can otherwise cause the user to drift relative to the bedpan. Here, the crown-and-slope geometry can bias the user toward a more stable seated position and can reduce the likelihood of misalignment between the user and the waste-receiving opening. The motion indicator 406 shown adjacent the lower crown 116 can indicate that, in some use conditions, user movement or caregiver positioning can produce forces that would tend to slide the user, and the declining slope 408 and concave curvature 412 can counteract such movement by increasing positional stability on the seat ring 102. In this way, the seat ring 102 can provide a concrete mechanical positioning improvement relative to prior approaches that present a flat rim or uniform toroidal cushion that does not provide a directional retention geometry.

In an exemplary embodiment, the side views also illustrate that inflation controls can remain accessible while preserving the user-support geometry. A seat air valve 108 can be in fluid communication with the seat ring 102, and a base air valve 110 can be in fluid communication with the support ring 104. Independent inflation via the valves 108 and 110 can allow a caregiver to tune the compliance of the seat ring 102 while maintaining the support ring 104 at a firmness that resists roll, thereby preserving the slope 408 and concave curvature 412 under load. In some embodiments, the crown-and-slope geometry can be maintained across a range of inflation pressures by shaping seam lines, reinforcing selected regions, or controlling chamber geometry, which can allow the seat ring 102 to exhibit the intended top-surface profile even as bedding compresses.

In an exemplary embodiment, FIG. 15 further depicts a user 202 and/or caregiver 204 positioned to interact with the inflatable bedpan 100 during setup or use, emphasizing that the present invention can be implemented in a real-world care setting with practical handling. The cooperative arrangement among the seat ring 102, support ring 104, receptacle ring 106, bottom receptacle surface 132, outer containment bag 122, valves 108 and 110, tether closure strap 112, and seat retainer hinge 114 can provide a structured bedside toileting platform that improves comfort, stability, and handling predictability. These improvements are rooted in specific physical structures and their interactions, including the crown differential between the higher crown 118 and lower crown 116, the resulting declining slope 408 and angle 410, and the concave curvature 412 that aids user positioning, thereby providing a concrete technological solution over prior approaches rather than an abstract idea.

In operation, in an exemplary embodiment, user 202 can use an inflatable bedpan waste-management system while positioned on a bed, a wheelchair, or another support surface, wherein the inflatable bedpan waste-management system can be configured to support the user 202 during toileting and to permit cinch-closure of an inner containment bag 124 from an inter-ring access region of an inflatable bedpan 100 located between a seat ring 102 and a support ring 104 at an outer perimeter of the inflatable bedpan 100. In an exemplary embodiment, the inflatable bedpan 100 can comprise the seat ring 102 and the support ring 104, the inflatable bedpan 100 defining a waste-receiving opening, wherein the waste-receiving opening can be defined by at least one of the seat ring 102 and the support ring 104. In an exemplary embodiment, the inflatable bedpan 100 can further comprise a seat air valve 108 in fluid communication with the seat ring 102. In an exemplary embodiment, the seat air valve 108 can be configured to enable staged inflation such that the seat ring 102 can be inflated to a comfort-oriented compliance after the inflatable bedpan 100 is positioned beneath the user 202, while still allowing the seat ring 102 to be in a semi-inflated state during placement to reduce insertion resistance against the support surface. In some embodiments, an effective port diameter of the seat air valve 108 can be in a range of about 8 mm to about 30 mm, in a more preferred range of about 10 mm to about 22 mm, and in an exemplary embodiment of about 16 mm, thereby supporting inflation using common hand pumps while maintaining a low-profile structure that reduces snagging and pressure points.

In an exemplary embodiment, the inflatable bedpan 100 can further comprise a base air valve 110 in fluid communication with the support ring 104. In an exemplary embodiment, the base air valve 110 can allow the support ring 104 to be inflated to provide stability and lift, while the seat air valve 108 can independently control the compliance of the seat ring 102. In some embodiments, an effective port diameter of the base air valve 110 can be in a range of about 8 mm to about 30 mm, in a more preferred range of about 10 mm to about 22 mm, and in an exemplary embodiment of about 16 mm. In an exemplary embodiment, independent inflation control of the seat ring 102 and the support ring 104 can allow a caregiver 204 to partially inflate one or both rings for placement and then increase inflation after positioning beneath the user 202, thereby reducing the need for the user 202 to arch or lift the pelvis to slide a rigid pan into place.

In an exemplary embodiment, the inflatable bedpan 100 can be configured to be transitioned between the semi-inflated state and an inflated state via operation of the seat air valve 108 and the base air valve 110. In an exemplary embodiment, the inflatable bedpan 100 can further be configured to be collapsed after use by venting an inflation fluid through at least one of the seat air valve 108 and the base air valve 110, thereby deflating one or both of the seat ring 102 and the support ring 104. In an exemplary embodiment, venting can be performed by opening a release feature, removing a plug, depressing a valve core, unthreading a cap, or otherwise placing the seat air valve 108 and/or the base air valve 110 in a venting configuration such that internal pressure decreases and the inflatable bedpan 100 can be folded, rolled, or compacted for storage. In some embodiments, the inflation fluid can be introduced using a hand pump, a bulb pump, a foot pump, an electric pump, a battery-powered pump, a syringe-type inflator, a portable compressor, or a facility-provided compressed-air source, and the inflation fluid can include ambient air, medical-grade air, another gas, or a liquid.

In an exemplary embodiment, the inflatable bedpan waste-management system can include an outer containment bag 122 configured to be removably installed on the inflatable bedpan 100 and having a plurality of cinch holes 126. In an exemplary embodiment, the outer containment bag 122 can be removably installed such that a user 202 or caregiver 204 can install, remove, and replace the outer containment bag 122 without disassembling the inflatable bedpan 100. In some embodiments, the outer containment bag 122 can include a top non-sealable opening 128 to facilitate insertion of the inner containment bag 124 and to maintain an open reception path aligned with the waste-receiving opening. In an exemplary embodiment, the plurality of cinch holes 126 can be formed through the outer containment bag 122 such that the cinch holes 126 remain accessible from outside the outer containment bag 122 after installation, including while the inflatable bedpan 100 is positioned beneath the user 202. In some embodiments, an effective diameter of each cinch hole 126 can be in a range of about 2 mm to about 12 mm, in a more preferred range of about 3 mm to about 8 mm, and in an exemplary embodiment of about 5 mm, thereby allowing cinch string segments to pass through while resisting tearing under pulling forces.

In an exemplary embodiment, the inflatable bedpan waste-management system can include an inner containment bag 124 configured to be positioned within the outer containment bag 122. In an exemplary embodiment, the inner containment bag 124 can be configured to receive human waste through the waste-receiving opening and can be configured to be cinched closed after use for removal and disposal. In some embodiments, the inner containment bag 124 can define an inner bag effective diameter 308 in a range of about 450 mm to about 900 mm, in a more preferred range of about 550 mm to about 800 mm, and in an exemplary embodiment of about 700 mm, and can define an inner bag height 312 in a range of about 300 mm to about 800 mm, in a more preferred range of about 400 mm to about 650 mm, and in an exemplary embodiment of about 525 mm, thereby providing sufficient volume and drape for containment while reducing uncontrolled bunching that can disrupt closure.

In an exemplary embodiment, the inflatable bedpan waste-management system can include a cinch string 120 threaded through the plurality of cinch holes 126 of the outer containment bag 122 to present one or more graspable portions of the cinch string 120 on an exterior side of the outer containment bag 122. In an exemplary embodiment, the cinch string 120 can be configured to cinch closed the inner containment bag 124 after receipt of human waste, such as by constricting an opening region of the inner containment bag 124, thereby forming a closed, portable waste package for disposal. In an exemplary embodiment, the one or more graspable portions can be accessible from an exterior region of the installed outer containment bag 122 and, in some embodiments, from the inter-ring access region between the seat ring 102 and the support ring 104 at the outer perimeter of the inflatable bedpan 100, wherein the inter-ring access region is outwardly facing and accessible from outside the inflatable bedpan 100. In some embodiments, the cinch string 120 can have a diameter in a range of about 0.8 mm to about 6 mm, in a more preferred range of about 1.5 mm to about 4 mm, and in an exemplary embodiment of about 2.5 mm, and a length of a graspable portion accessible from outside the outer containment bag 122 can be in a range of about 75 mm to about 450 mm, in a more preferred range of about 120 mm to about 300 mm, and in an exemplary embodiment of about 200 mm, thereby supporting gloved handling and reducing the likelihood of string loss into the waste-receiving region.

In an exemplary embodiment, the outer containment bag 122 can be configured to remain installed on the inflatable bedpan 100 after the inner containment bag 124 is cinched closed and removed for disposal. In an exemplary embodiment, retaining the outer containment bag 122 in the installed position can maintain a protective barrier layer on the inflatable bedpan 100 so that the inflatable bedpan 100 can be prepared for a subsequent use cycle without requiring the caregiver to handle, transport, and clean a waste-filled rigid pan, and without requiring the inflatable bedpan 100 itself to be wiped between each removal cycle. In an exemplary embodiment, the inner containment bag 124 can be removed upward through the top non-sealable opening 128 of the outer containment bag 122 while the cinch string 120 remains accessible from outside the outer containment bag 122, thereby reducing handling steps and reducing contamination exposure.

In an exemplary embodiment, the inflatable bedpan 100 can further comprise a seat retainer hinge 114 configured to permit the seat ring 102 to be lifted relative to the support ring 104 to facilitate installation of the outer containment bag 122 and the inner containment bag 124. In an exemplary embodiment, the inflatable bedpan 100 can further comprise a tether closure strap 112 configured to retain the seat ring 102 in a closed position relative to the support ring 104 during use. In an exemplary embodiment, the seat retainer hinge 114 and tether closure strap 112 can cooperate to enable controlled opening for installation and controlled retention during toileting while maintaining the inter-ring access region as an outwardly facing exterior access zone for grasping and pulling the cinch string 120.

In an exemplary embodiment, the cinch string 120 can be configured to present opposing graspable portions on opposing lateral sides of the outer containment bag 122 such that the inner containment bag 124 is cinched closed by opposing-direction pulls applied from the inter-ring access region without inserting a hand through the waste-receiving opening. In an exemplary embodiment, applying opposing-direction pulls can promote more symmetric constriction and can reduce uneven puckering that can leave leakage gaps during handling.

In an exemplary embodiment, the outer containment bag 122 can comprise the top non-sealable opening 128 and a tapered bottom portion defining a bottom effective diameter 330 that is less than a top effective diameter 322. In an exemplary embodiment, the tapered bottom portion can be configured to bias the inner containment bag 124 toward a center region of a bottom receptacle surface 132 of the inflatable bedpan 100 during use, thereby reducing lateral migration of waste contents and reducing contact with sidewall regions that can increase smearing and leakage risk.

In an exemplary embodiment, the foregoing structures and relationships can cooperate to provide a practical waste-management workflow that reduces handling of a waste-filled pan and reduces the need for subsequent cleaning operations by enabling selective removal and disposal of a cinched inner containment bag 124 while maintaining the outer containment bag 122 installed on the inflatable bedpan 100. In an exemplary embodiment, the staged inflation and deflation enabled by the seat air valve 108 and the base air valve 110 can further reduce user exertion and caregiver strain during placement and removal, and can enable the inflatable bedpan 100 to be collapsed after use for compact storage.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. An inflatable bedpan waste-management system configured to support a user during toileting and configured to permit cinch-closure of an inner containment bag from an inter-ring access region located between a seat ring and a support ring of an inflatable bedpan at an outer perimeter of the inflatable bedpan, the inflatable bedpan waste-management system comprising:

an inflatable bedpan comprising the seat ring and the support ring, the inflatable bedpan defining a waste-receiving opening, wherein the waste-receiving opening is defined by at least one of the seat ring and the support ring;

the inter-ring access region located along an outer perimeter of and between the seat ring and the support ring, wherein the inter-ring access region is outwardly facing and accessible from outside the inflatable bedpan;

an outer containment bag comprising an upper perimeter portion configured to be positioned over the seat ring or over the support ring;

a plurality of cinch holes formed through the outer containment bag at one or more central locations spaced from the upper perimeter portion, the plurality of cinch holes being positioned to align with the inter-ring access region when the outer containment bag is installed on the inflatable bedpan;

the inner containment bag configured to be positioned within the outer containment bag to receive human waste through the waste-receiving opening; and a cinch string threaded through the plurality of cinch holes of the outer containment bag to present one or more graspable portions of the cinch string on an exterior side of the outer containment bag;

wherein the inner containment bag is configured to be cinched closed by pulling the cinch string;

wherein the one or more graspable portions are accessible from the inter-ring access region while the inner containment bag is positioned within the outer containment bag; and wherein the inner containment bag is removable from the outer containment bag after being cinched closed.

2. The inflatable bedpan waste-management system of claim 1, wherein the inflatable bedpan further comprises a seat air valve in fluid communication with the seat ring and a base air valve in fluid communication with the support ring.

3. The inflatable bedpan waste-management system of claim 1, wherein the waste-receiving opening is defined by the seat ring in a first use configuration and is defined by the support ring in a second use configuration.

4. The inflatable bedpan waste-management system of claim 1, wherein the inner containment bag further comprises one or more cinch string egress openings configured to guide the cinch string to present one or more graspable portions of the cinch string at the inter-ring access region.

5. The inflatable bedpan waste-management system of claim 1, wherein the upper perimeter portion of the outer containment bag is configured to be repositioned between a first installed configuration positioned over the seat ring and a second installed configuration positioned over the support ring, wherein, in the second installed configuration, the upper perimeter portion is configured to be compressively captured between the seat ring and the support ring when the seat ring is lowered toward the support ring to retain the outer containment bag during pulling of the cinch string.

6. The inflatable bedpan waste-management system of claim 1, wherein, after the inner containment bag is cinched closed, the inner containment bag is removable upward through a top opening of the outer containment bag for disposal while the outer containment bag remains installed on the inflatable bedpan with the plurality of cinch holes retained in position along the outer perimeter of the inflatable bedpan for a subsequent inner containment bag installation.

7. The inflatable bedpan waste-management system of claim 1, wherein the plurality of cinch holes comprise at least two cinch holes positioned on opposing lateral sides of the outer containment bag such that opposing graspable portions of the cinch string are presented on opposing sides of the outer containment bag and extend through the inter-ring access region between the seat ring and the support ring at the outer perimeter of the inflatable bedpan for opposing-direction pulls from the inter-ring access region.

8. The inflatable bedpan waste-management system of claim 1, wherein the seat ring further comprises a higher crown and a lower crown, wherein the higher crown is taller than the lower crown to create a declining slope therebetween, and wherein the higher crown and the lower crown collectively define a concave curvature on a top surface of the seat ring configured to at least partially cradle a posterior region of the user during use.

9. The inflatable bedpan waste-management system of claim 1, wherein the inflatable bedpan further comprises a receptacle ring positioned below the support ring and comprising a bottom receptacle surface configured to support the inner containment bag and inhibit leakage from the receptacle region.

10. A method of using the inflatable bedpan waste-management system of claim 1, the method comprising the steps of:

positioning the inflatable bedpan adjacent to the user while the inflatable bedpan is in an inflated state or a semi-inflated state;

positioning the outer containment bag such that the upper perimeter portion of the outer containment bag is positioned over the seat ring or the support ring;

positioning the inner containment bag within the outer containment bag;

arranging the cinch string such that one or more graspable portions of the cinch string are accessible from the inter-ring access region;

after the user deposits human waste into the inner containment bag through the waste-receiving opening, pulling the cinch string to cinch closed the inner containment bag; and removing the cinched closed inner containment bag from the inflatable bedpan for disposal.

11. An inflatable bedpan waste-management system configured to be installed on an inflatable bedpan that supports a user during toileting and configured to permit cinch-closure of an inner containment bag from an inter-ring access region located between a seat ring and a support ring of the inflatable bedpan at an outer perimeter of the inflatable bedpan, the inflatable bedpan waste-management system comprising:

an outer containment bag comprising an upper perimeter portion configured to be positioned over the seat ring or over the support ring of the inflatable bedpan;

a plurality of cinch holes formed through the outer containment bag at one or more intermediate locations between the upper perimeter portion and a bottom of the outer containment bag;

the inner containment bag configured to be positioned within the outer containment bag; and a cinch string configured to be threaded through the plurality of cinch holes of the outer containment bag to present one or more graspable portions of the cinch string on an exterior side of the outer containment bag when the inner containment bag is positioned within the outer containment bag;

wherein the inflatable bedpan waste-management system is specially adapted such that, when the outer containment bag is installed on the inflatable bedpan and the inner containment bag is positioned within the outer containment bag, the one or more graspable portions are presented adjacent to the inter-ring access region and are accessible from the inter-ring access region, the inter-ring access region being outwardly facing and accessible from outside the inflatable bedpan.

12. The inflatable bedpan waste-management system of claim 11, wherein the outer containment bag further comprises one or more cinch string egress openings positioned to guide the one or more graspable portions of the cinch string to the inter-ring access region.

13. The inflatable bedpan waste-management system of claim 11, wherein the plurality of cinch holes comprise at least two cinch holes positioned on opposing lateral sides of the outer containment bag such that opposing graspable portions of the cinch string are presented on opposing sides of the outer containment bag for opposing-direction pulls from the inter-ring access region.

14. The inflatable bedpan waste-management system of claim 11, wherein the inner containment bag comprises a perimeter channel extending along an upper perimeter portion of the inner containment bag and one or more cinch string egress openings in communication with the perimeter channel, wherein the cinch string traverses within the perimeter channel and exits through the one or more cinch string egress openings, and wherein portions of the cinch string proximate the one or more cinch string egress openings are configured to be fed through the plurality of cinch holes to present the one or more graspable portions on the exterior side of the outer containment bag.

15. The method of using the inflatable bedpan waste-management system of claim 11, the method comprising the steps of:

positioning the outer containment bag over the seat ring or the support ring of the inflatable bedpan;

positioning the inner containment bag within the outer containment bag;

threading the cinch string through the plurality of cinch holes to present one or more graspable portions of the cinch string on an exterior side of the outer containment bag;

positioning the outer containment bag on the inflatable bedpan such that the one or more graspable portions are accessible from the inter-ring access region; and pulling the cinch string from the inter-ring access region to cinch closed the inner containment bag for disposal.

16. An inflatable bedpan waste-management system configured to support a user during toileting and configured to permit cinch-closure of an inner containment bag from an inter-ring access region located between a seat ring and a support ring of an inflatable bedpan at an outer perimeter of the inflatable bedpan, the inflatable bedpan waste-management system comprising:

an inflatable bedpan comprising the seat ring and the support ring, the inflatable bedpan defining a waste-receiving opening, wherein the waste-receiving opening is defined by at least one of the seat ring and the support ring;

a seat air valve in fluid communication with the seat ring;

a base air valve in fluid communication with the support ring;

an outer containment bag configured to be removably installed on the inflatable bedpan;

a plurality of cinch holes formed through the outer containment bag;

an inner containment bag configured to be positioned within the outer containment bag; and a cinch string threaded through the plurality of cinch holes of the outer containment bag to present one or more graspable portions of the cinch string on an exterior side of the outer containment bag;

wherein the inter-ring access region is outwardly facing and accessible from outside the inflatable bedpan;

wherein the cinch string is configured to cinch closed the inner containment bag after receipt of human waste;

wherein the outer containment bag is configured to remain installed on the inflatable bedpan after the inner containment bag is cinched closed and removed for disposal; and wherein the inflatable bedpan is configured to be transitioned between a semi-inflated state and an inflated state via the seat air valve and the base air valve, and is configured to be collapsed by venting an inflation fluid through at least one of the seat air valve and the base air valve.

17. The inflatable bedpan waste-management system of claim 16, wherein the inflatable bedpan further comprises a seat retainer hinge configured to permit the seat ring to be lifted relative to the support ring to facilitate installation of the outer containment bag and the inner containment bag, and further comprises a tether closure strap configured to retain the seat ring in a closed position relative to the support ring during use.

18. The inflatable bedpan waste-management system of claim 16, wherein the cinch string is configured to present opposing graspable portions on opposing lateral sides of the outer containment bag such that the inner containment bag is cinched closed by opposing-direction pulls applied from the inter-ring access region without inserting a hand through the waste-receiving opening.

19. The inflatable bedpan waste-management system of claim 16, wherein the outer containment bag comprises a top non-sealable opening and a tapered bottom portion defining a bottom effective diameter that is less than a top effective diameter, the tapered bottom portion being configured to bias the inner containment bag toward a center region of a bottom receptacle surface of the inflatable bedpan during use.

20. A method of using the inflatable bedpan waste-management system of claim 16, the method comprising the steps of:

partially inflating the inflatable bedpan via at least one of the seat air valve and the base air valve to place the inflatable bedpan in the semi-inflated state;

positioning the inflatable bedpan beneath the user;

inflating the inflatable bedpan via the seat air valve and the base air valve to place the inflatable bedpan in the inflated state;

after the user deposits human waste into the inner containment bag through the waste-receiving opening, pulling the one or more graspable portions from the inter-ring access region to cinch closed the inner containment bag;

removing the cinched closed inner containment bag for disposal while the outer containment bag remains installed on the inflatable bedpan; and venting the inflation fluid through at least one of the seat air valve and the base air valve to collapse the inflatable bedpan after use.

* * * * *